United States Patent
Lee et al.

(10) Patent No.: US 11,733,445 B2
(45) Date of Patent: Aug. 22, 2023

(54) OPTICAL ELEMENT HAVING MULTIPLE LAYERS FOR REDUCING DIFFRACTION ARTIFACTS

(71) Applicant: Meta Platforms Technologies, LLC, Menlo Park, CA (US)

(72) Inventors: Yun-Han Lee, Redmond, WA (US); Junren Wang, Mercer Island, WA (US); Mengfei Wang, Seattle, WA (US); Babak Amirsolaimani, Redmond, WA (US); Lu Lu, Kirkland, WA (US); Scott Charles McEldowney, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 223 days.

(21) Appl. No.: 17/083,370

(22) Filed: Oct. 29, 2020

(65) Prior Publication Data

US 2022/0137278 A1   May 5, 2022

(51) Int. Cl.
  *G02B 5/30* (2006.01)
  *G02B 27/01* (2006.01)
  *F21V 8/00* (2006.01)

(52) U.S. Cl.
  CPC ......... *G02B 5/3083* (2013.01); *G02B 5/3016* (2013.01); *G02B 6/005* (2013.01); *G02B 27/0172* (2013.01)

(58) Field of Classification Search
  CPC .... G02B 5/3083; G02B 5/3016; G02B 6/005; G02B 27/0172

(Continued)

(56) References Cited

U.S. PATENT DOCUMENTS

2005/0140880 A1  6/2005  Lee et al.
2015/0116648 A1  4/2015  Shin et al.
(Continued)

FOREIGN PATENT DOCUMENTS

WO         0120406 A1   3/2001
WO      2011028018 A2   3/2011
(Continued)

OTHER PUBLICATIONS

Invitation to Pay Additional Fees and Communication Relating to the Results of the Partial International Search issued in International Application No. PCT/US2021/049984, dated Dec. 22, 2021, 10 pages.

(Continued)

*Primary Examiner* — Collin X Beatty
*Assistant Examiner* — Grant A Gagnon
(74) *Attorney, Agent, or Firm* — Millburn IP PLLC

(57) ABSTRACT

An optical element includes a first birefringent medium layer with orientations of directors of first optically anisotropic molecules spatially varying with a first in-plane pitch and a first vertical pitch. The optical element also includes a second birefringent medium layer with orientations of directors of second optically anisotropic molecules spatially varying with a second in-plane pitch and a second vertical pitch. The second birefringent medium layer is optically coupled with the first birefringent medium layer and configured to reduce a diffraction of a light by the first birefringent medium layer. The first in-plane pitch is substantially the same as the second in-plane pitch, and the second vertical pitch is smaller than the first vertical pitch.

20 Claims, 22 Drawing Sheets

(58) Field of Classification Search
USPC .......................................................... 359/489
See application file for complete search history.

(56) References Cited

U.S. PATENT DOCUMENTS

2016/0033698 A1     2/2016   Escuti et al.
2021/0011300 A1     1/2021   Leister et al.

FOREIGN PATENT DOCUMENTS

WO          2013052834 A1     4/2013
WO          2019185510 A1    10/2019

OTHER PUBLICATIONS

Xiang X., et al., "Nanoscale Liquid Crystal Polymer Bragg Polarization Gratings," Optics Express, vol. 25, No. 16, Aug. 7, 2017, 11 pages.

International Search Report and Written Opinion for International Application No. PCT/US2021/049984 dated Feb. 28, 2022, 16 pages.

International Preliminary Report on Patentability for International Application No. PCT/US2021/049984, dated May 11, 2023, 11 pages.

US 11,733,445 B2

OPTICAL ELEMENT HAVING MULTIPLE LAYERS FOR REDUCING DIFFRACTION ARTIFACTS

TECHNICAL FIELD

The present disclosure relates generally to optical devices and, more specifically, to an optical element having multiple layers for reducing diffraction artifacts.

BACKGROUND

Polarization selective elements have gained increasing interests in optical device and system applications, for example, in beam steering devices, waveguides, and displays. Polarization selective elements may be fabricated based on optically isotropic or anisotropic materials, and may include suitable sub-wavelength structures, liquid crystals, photo-refractive holographic materials, or any combination thereof. Polarization volume holograms ("PVHs") are a type of polarization selective elements. An optic axis of a PVH has a spatially varying orientation in both an in-plane direction and an out-of-plane direction to provide a polarization sensitive holographic response. PVHs or PVH elements have features of compactness, polarization selectivity, high diffraction efficiency, large diffraction efficiency, etc. Thus, PVHs can be implemented in various applications in a variety of technical fields. PVH elements can be fabricated using various methods, e.g., holographic interference or holography, laser direct writing, and various other forms of lithography.

SUMMARY OF THE DISCLOSURE

Consistent with an aspect of the present disclosure, an optical element is provided. The optical element includes a first birefringent medium layer with orientations of directors of first optically anisotropic molecules spatially varying with a first in-plane pitch and a first vertical pitch. The optical element includes a second birefringent medium layer with orientations of directors of second optically anisotropic molecules spatially varying with a second in-plane pitch and a second vertical pitch. The second birefringent medium layer is optically coupled with the first birefringent medium layer and configured to reduce a diffraction of a light by the first birefringent medium layer. The first in-plane pitch is substantially the same as the second in-plane pitch, and the second vertical pitch is smaller than the first vertical pitch.

Consistent with an aspect of the present disclosure, a device is provided. The device includes a first polarization selective element having a first in-plane pitch and a first vertical pitch, and configured to diffract a light. The device includes a second polarization selective element optically coupled with the first polarization selective element. The second polarization selective element has a second in-plane pitch and a second vertical pitch, and is configured to reduce a diffraction of the light by the first polarization selective element. The first in-plane pitch is substantially the same as the second in-plane pitch, and the second vertical pitch is smaller than the first vertical pitch.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
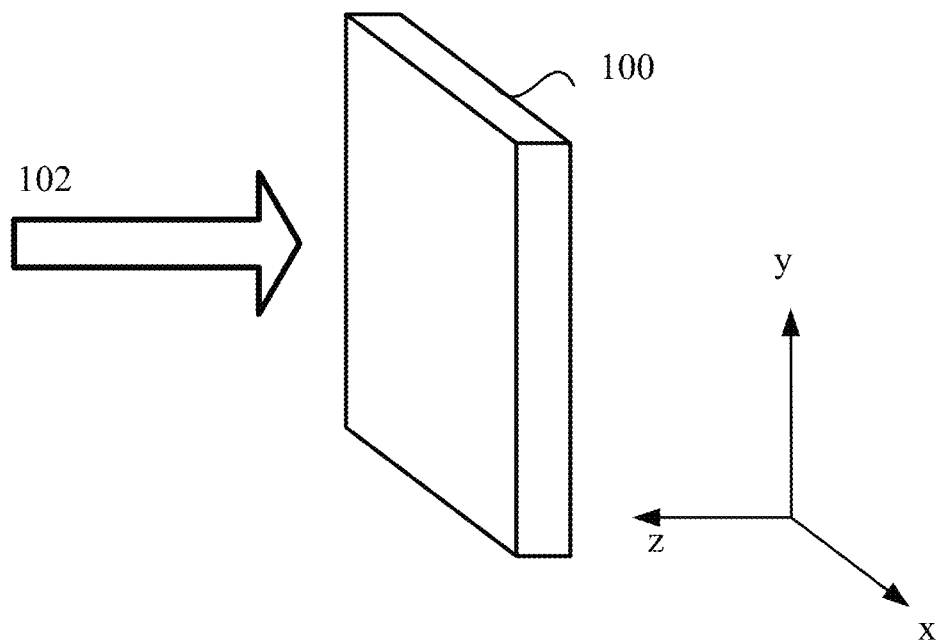
FIG. 1A illustrates a schematic three-dimensional ("3D") view of a polarization volume hologram ("PVH"), according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light beam output from one optical element may be directly or indirectly received by the other optical element. An optical series refers to optical positioning of a plurality of optical elements in a light beam path, such that a light beam output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "communicatively coupled" or "communicatively connected" indicates that related items are coupled or connected through an electrical and/or electromagnetic coupling or connection, such as a wired or wireless communication connection, channel, or network.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared ("IR") wavelength range, or a combination thereof.

The term "film" and "layer" may include rigid or flexible, self-supporting or free-standing film, coating, or layer, which may be disposed on a supporting substrate or between substrates. The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" indicates a direction that is non-parallel to the plane of the film or layer (e.g., perpendicular to the surface plane of the film or layer, e.g., perpendicular to a plane parallel to the surface plane). For example, when an "in-plane" direction refers to a direction within a surface plane, an "out-of-plane" direction may refer to a thickness direction perpendicular to the surface plane, or a direction that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights with orthogonal polarizations or two orthogonally polarized lights may be two linearly polarized lights with polarizations in two orthogonal directions (e.g., an x-axis direction and a y-axis direction in a Cartesian coordinate system) or two circularly polarized lights with opposite handednesses (e.g., a left-handed circularly polarized light and a right-handed circularly polarized light).

Near-eye displays ("NEDs") have been widely implemented in a variety of applications, such as video playback, gaming, and sports. NEDs have been used to realize virtual reality ("VR"), augmented reality ("AR"), or mixed reality ("MR"). NEDs for AR and/or MR applications may display a virtual image overlapping with real-world images or see-through images. Pupil-expansion light guide display systems or assemblies with diffractive structures are promising designs for NEDs, which can potentially offer sun/eye-glasses form factors, a moderately large field of view ("FOV"), a high transmittance, and a large eye-box. In addition, NEDs for VR, AR and/or MR applications may provide an eye tracking function that monitors the eyes of a user and/or the region surrounding the eyes of a user. By monitoring the eyes and/or the surrounding region, the NED can determine a gaze direction of the user, which can be used for improving display quality, performance, and user experience, and addressing vergence-accommodation conflict. Further, by monitoring the eyes and/or the surrounding region, the NED can estimate the psychological state and/or changes in the psychological state of the user, as well as physical characteristics of the user.

Diffractive structures included in NEDs for AR or MR applications, such as a light guide display, an eye-tracking combiner, may diffract a visible polychromatic light coming from a real world environment causing a multicolored glare in a see-through view, especially when a user wearing the NED looks at a bright light source from certain angles. Such a see-through artifact is referred to as a "rainbow effect", which may degrade the image quality of the see-through view. The rainbow effect may result from a light dispersion caused by the diffractive structures. For example, a grating may spatially separate an incident polychromatic light (e.g., a white light from a real world environment) into constituent wavelength components, i.e., the polychromatic light may be dispersed by the grating. Each wavelength of the incident light spectrum may be diffracted to a different direction, producing a rainbow of colors under a white light illumination. A lower diffraction order may have a weaker (or less perceivable) dispersion in terms of a spatial separation of constituent wavelength components of the polychromatic light, and hence a weaker rainbow effect, whereas a higher diffraction order may have a stronger (or more perceivable) dispersion, and hence a stronger rainbow effect. In addition, a lower diffraction order may have in a higher light intensity, whereas a higher diffraction order may have a lower light intensity. To reduce the rainbow effect, conventional dimming elements have been used to dim a light from the real-world environment that is incident onto display windows at different incidence angles, thereby dimming an overall light intensity of the dispersion. That is, the light intensity of all the diffraction orders may be reduced. However, the brightness of the desirable see-through image may also be reduced correspondingly.

The present disclosure provides a device configured to reduce the rainbow effect through suppressing undesirable diffraction orders of a visible light (e.g., a visible polychromatic light from a real world environment), such as diffraction orders higher than a predetermined diffraction order, e.g., higher than the first diffraction order (+1st diffraction order and/or $-1^{st}$ diffraction order). Thus, the undesirable diffraction orders may not be perceivable or may become less perceivable by eyes. The device may be implemented in NEDs, serving as or included in a light guide display, an eye-tracking combiner, etc., to reduce the rainbow effect in the see-through views and improve the image quality of the see-through views. The device may include a first birefringent medium layer, and a second birefringent medium layer optically coupled to the first birefringent medium layer. Orientations of directors of first optically anisotropic molecules in the first birefringent medium layer may spatially vary with a first in-plane pitch and a first vertical pitch. Orientations of directors of second optically anisotropic molecules in the second birefringent medium layer may spatially vary with a second in-plane pitch and a second vertical pitch. The first in-plane pitch may be configured to be substantially the same as the second in-plane pitch. The term "substantially the same" may be defined based on specific implementations. For example, when a difference between two numerical values is within a predetermined range, such as [−20%, +20%], [−10%, +10%], or [−5%, +5%], the two numerical values may be regarded as "substantially the same." The second vertical pitch may be configured to be smaller than the first vertical pitch. For example, the second vertical pitch may be about 20%-80% of the first vertical pitch. That is, the ratio between the second vertical pitch and the first vertical pitch may be within a range of 0.2-0.8. In some embodiments, the ratio may be within a range of about 0.2-0.75, 0.2-0.7, 0.2-0.65, 0.2-0.6, 0.2-0.55, 0.2-0.5, 0.2-0.45, 0.2-0.4, 0.2-0.35, 0.2-0.3, or 0.2-0.25. In some embodiments, the ratio may be within a range of about 0.25-0.3, 0.25-0.35, 0.25-0.4, 0.25-0.45, 0.25-0.5, 0.25-0.55, 0.25-0.6, 0.25-0.65, 0.25-0.7, or 0.25-0.8. In some embodiments, the ratio may be within a range of about 0.3-0.35, 0.3-0.4, 0.3-0.45, 0.3-0.5, 0.3-0.55, 0.3-0.6, 0.3-0.65, 0.3-0.7, 0.3-0.75, or 0.3-0.8. In some embodiments, the ratio may be within a range of about 0.35-0.4, 0.35-0.45, 0.35-0.5, 0.35-0.55, 0.35-0.6, 0.35-0.65, 0.35-0.7, 0.35-0.75, or 0.35-0.8. In some embodiments, the ratio may be within a range of about 0.4-0.45, 0.4-0.5, 0.4-0.55, 0.4-0.6, 0.4-0.65, 0.4-0.7, 0.4-0.75, or 0.4-0.8. In some embodiments, the ratio may be within a range of about 0.45-0.5, 0.45-0.55, 0.45-0.6, 0.45-0.65, 0.45-0.7, 0.45-0.75, or 0.45-0.8. In some embodiments, the ratio may be within a range of about 0.5-0.55, 0.5-0.6, 0.5-0.65, 0.5-0.7, 0.5-0.75, or 0.5-0.8. In some embodiments, the ratio may be within a range of about 0.55-0.6, 0.55-0.65, 0.55-0.7, 0.55-0.75, or 0.55-0.8. In some embodiments, the ratio may be within a range of about 0.6-0.65, 0.6-0.7, 0.6-0.75, or 0.6-0.8. In some embodiments, the ratio may be within a range of about 0.65-0.7, 0.65-0.75, or 0.65-0.8. In some embodiments, the ratio may be within a range of about 0.7-0.75, or 0.7-0.8. In some embodiments, the ratio may be within a range of about 0.75-0.8. In some embodiments, the ratio may be about 0.2, 0.3, 0.4, 0.5, 0.6, 0.7, or 0.8. In some embodiments, the ratio may be about 0.25, 0.35, 0.45, 0.55, 0.65, or 0.75. For example, in one embodiment, the ratio may be about 0.5. That is, the second vertical pitch may be about half of the first vertical pitch. In some embodiments, the second vertical pitch may be configured to be slightly less than or slightly greater than half of the first vertical pitch. In some embodiments, a thickness of the second birefringent medium layer may be significantly smaller than a thickness of the first birefringent medium layer. A ratio between the thickness of the second birefringent medium layer and the thickness of the first birefringent medium layer may be less than a predetermined percentage, for example, 5%, 10%, 15%, 20%, 25%, 30%, 35%, 40%, 45%, or 50%.

The second birefringent medium layer may be configured to reduce the diffraction caused by the first birefringent medium layer. The transmissive diffraction of one birefringent medium layer (e.g., the first birefringent medium layer or the second birefringent medium layer) or a stack of birefringent medium layers (e.g., a stack of the first birefringent medium layer and the second birefringent medium layer) may be a behavior similar to that of a multi-layer interference. By designing in-plane pitches and vertical pitches of the first birefringent medium layer and the second birefringent medium layer, for the visible polychromatic light (e.g., the white light) from the real world environment, the diffraction by the combination of the first birefringent medium layer and the second birefringent medium layer may be reduced as compared to the diffraction by the first birefringent medium layer only, as a result of layer interference. For example, for the visible polychromatic light (e.g., the white light) from the real world environment, the diffraction efficiency of the combination of the first birefringent medium layer and the second birefringent medium layer may be reduced as compared to the diffraction efficiency of the first birefringent medium layer only. In some embodiments, the first birefringent medium layer may be configured to at least partially diffract a visible polychromatic light (e.g., a white light) from a real world environment as a first light. The first light may at least include a forwardly diffracted portion of the visible polychromatic light (e.g., the white light) from the real world environment. In some embodiments, the first light may also include a directly transmitted portion of the visible polychromatic light (e.g., the white light) from the real world environment. The first light may include a first number of perceivable diffraction orders. The second birefringent medium layer may be configured to receive the first light from the first birefringent medium layer, and at least partially diffract the first light as a second light. The second light may at least include a forwardly diffracted portion of the first light. In some embodiments, the second light may also include a directly transmitted portion of the first light. The second light may include a second number of perceivable diffraction orders. In some embodiments, the second birefringent medium layer may be configured to suppress undesirable diffraction orders caused by the first birefringent medium layer, such as diffraction orders higher than a predetermined diffraction order, e.g., higher than the first diffraction order (+1st diffraction order and/or $-1^{st}$ diffraction order). For example, the second number of perceivable diffraction orders may be fewer than the first number of perceivable diffraction orders. Thus, the rainbow effect caused by the first birefringent medium layer may be reduced by the second birefringent medium layer. In other words, the rainbow effect caused by a combination of the first birefringent medium layer and the second birefringent medium layer may be weaker (or less perceivable) than the rainbow effect caused by the first birefringent medium layer only.

In some embodiments, at least one (e.g., each) of the first birefringent film or the second birefringent film may include a birefringent medium having an optic axis configured with an orientation spatially varying in both an in-plane direction and an out-of-plane direction. The term "optic axis" may refer to a direction in a crystal. A light propagating in the optic axis direction may not experience birefringence (or double refraction). An optic axis may be a direction rather than a single line: lights that are parallel to that direction may experience no birefringence. In some embodiments, the birefringent medium may include at least one of polymerized liquid crystals ("LCs"), polymer-stabilized LCs, or a photopolymer. In some embodiments, the birefringent medium may include at least one of nematic LCs, twist-bend LCs, chiral nematic LCs, or smectic LCs. The optic axis of a birefringent medium included in a birefringent film may also be referred to as an optic axis of the birefringent film. In some embodiments, the optic axis of the birefringent medium may be configured with a spatially varying orientation in both the in-plane direction and the out-of-plane direction to provide a polarization selective holographic response. In some embodiments, the birefringent film or birefringent medium including an optical axis configured with such a spatially varying orientation may form a polarization volume hologram ("PVH") or a PVH element. The disclosed device configured to reduce the rainbow effect may also be referred to as a multi-layer PVH or a multi-layer PVH element.

In some embodiments, the device may further include a third birefringent medium layer optically coupled to the second birefringent medium layer. The third birefringent medium layer may receive the second light output from the second birefringent medium layer, and may at least partially diffract the second light as a third light. The third light may at least include a forwardly diffracted portion of the second light. In some embodiments, the third light may also include a directly transmitted portion of the second light. The third birefringent medium layer may be configured to reduce the diffraction by the first and second birefringent medium layers. For example, for the visible polychromatic light (e.g., the white light) from the real world environment, the diffraction efficiency of the combination of the first to third birefringent medium layers may be reduced as compared to the diffraction efficiency of the combination of the first and second birefringent medium layers only. In some embodiments, the third birefringent medium layer may be configured to suppress undesirable diffraction orders of the second light output from the second birefringent medium layer.

Orientations of directors of third optically anisotropic molecules in the third birefringent medium layer may spatially vary with a third in-plane pitch and a third vertical pitch. In some embodiments, the first in-plane pitch may be configured to be substantially the same as the third in-plane pitch. In some embodiments, the third vertical pitch may be configured to be smaller than the first vertical pitch. The ratio between the third vertical pitch and the first vertical pitch may be within a suitable range or be a suitable number, similar to the ranges or numbers (e.g., 0.2-0.8) discussed above in connection with the ratio between the second vertical pitch and the first vertical pitch. In one embodiment, the third vertical pitch may be about half of the first vertical pitch.

In some embodiments, the third vertical pitch may be substantially the same as the second vertical pitch. In some embodiments, the third vertical pitch may be smaller than the second vertical pitch. A ratio between the third vertical pitch and the second vertical pitch may be in a suitable range or be a suitable number, similar to the ranges or numbers discussed above in connection with the ratio between the second vertical pitch and the first vertical pitch. For example, in one embodiment, the third vertical pitch may be about half of the second vertical pitch. In some embodiments, the third in-plane pitch may be substantially the same as the second in-plane pitch and the first in-plane pitch.

In some embodiments, the thickness of the third birefringent medium layer may be configured to be significantly smaller than the thickness of the first birefringent medium layer. A ratio between the thickness of the third birefringent medium layer and the thickness of the first birefringent medium layer may be less than a predetermined percentage, for example, 5%, 10%, 15%, 20%, 25%, 30%, 35%, 40%, 45%, or 50%. In some embodiments, the thickness of the third birefringent medium layer may be substantially the same as the thickness of the second birefringent medium layer. In some embodiments, the thickness of the third birefringent medium layer may be significantly smaller than the thickness of the second birefringent medium layer. For example, the thickness of the third birefringent medium layer may be about 5%, 10%, 15%, 20%, 25%, 30%, 35%, 40%, 45%, or 50% of the thickness of the second birefringent medium layer.

In some embodiments, the device may further include a fourth birefringent medium layer optically coupled to the third birefringent medium layer. The fourth birefringent medium layer may receive the third light output from the third birefringent medium layer, and may at least partially diffract the third light as a fourth light. The fourth light may at least include a forwardly diffracted portion of the third light. In some embodiments, the fourth light may also include a directly transmitted portion of the third light. The fourth birefringent medium layer may be configured to reduce the diffraction by the first to third birefringent medium layer. For example, for the visible polychromatic light (e.g., the white light) from the real world environment, the diffraction efficiency of the combination of the first to fourth birefringent medium layers may be reduced as compared to the diffraction efficiency of the combination of the first to third birefringent medium layers only. In some embodiments, the fourth birefringent medium layer may be configured to may be configured to suppress undesirable diffraction orders of the light output from the third birefringent medium layer. Orientations of directors of fourth optically anisotropic molecules in the fourth birefringent medium layer may spatially vary with a fourth in-plane pitch and a fourth vertical pitch. In some embodiments, the third in-plane pitch may be configured to be substantially the same as the fourth in-plane pitch. In some embodiments, the fourth in-plane pitch may be substantially the same as the first in-plane pitch. In some embodiments, the fourth in-plane pitch, the third in-plane pitch, the second in-plane pitch, and the first in-plane pitch may be substantially the same.

In some embodiments, the fourth vertical pitch may be configured to be smaller than the third vertical pitch. The ratio between the fourth vertical pitch and the third vertical pitch may be within a suitable range or be a suitable number, similar to the ranges or numbers (e.g., 0.2-0.8) discussed above in connection with the ratio between the second vertical pitch and the first vertical pitch. In some embodiments, the ratio between the fourth vertical pitch and the first vertical pitch may be within a suitable range or be a suitable number, similar to the ranges or numbers (e.g., 0.2-0.8) discussed above in connection with the ratio between the second vertical pitch and the first vertical pitch. In some embodiments, the fourth vertical pitch may be about half of the third vertical pitch. In some embodiments, the fourth vertical pitch may be about half of the first vertical pitch.

In some embodiments, a thickness of the fourth birefringent medium layer may be configured to be significantly smaller than a thickness of the third birefringent medium layer. A ratio between the thickness of the fourth birefringent medium layer and the thickness of the third birefringent medium layer may be less than a predetermined percentage, for example, 5%, 10%, 15%, 20%, 25%, 30%, 35%, 40%, 45%, or 50%. In some embodiments, the fourth in-plane pitch may be configured to be substantially the same as or different from the third in-plane pitch, and the fourth vertical pitch may be configured to be substantially the same as or different from the third vertical pitch or the first vertical pitch. Each of the third birefringent medium layer and the fourth birefringent medium layer may be a PVH or a PVH element. In some embodiments, the fourth vertical pitch may be the same as the second vertical pitch, and the first vertical pitch may be the same as the third vertical pitch. In some embodiments, the second vertical pitch may be about 20%-80% of the first vertical pitch, the third vertical pitch may be about 20%-80% of the second vertical pitch, and the fourth vertical pitch may be about 20%-80% of the third vertical pitch. In some embodiments, the second vertical pitch may be about 50% of the first vertical pitch, the third vertical pitch may be about 50% of the second vertical pitch, and the fourth vertical pitch may be about 50% of the third vertical pitch. In some embodiments, the second, third, and fourth vertical pitches may be substantially the same. In some embodiments, the same vertical pitch may be about 50% of the first vertical pitch.

In the following descriptions, for illustrative purposes, polarization selective gratings including PVHs may be used as examples to reduce the rainbow effect, e.g., in see-through images. PVH is a type of polarization selective elements. In some embodiments, other suitable polarization selective elements may also be used and configured to reduce the rainbow effect, e.g., in see-through images, following the same or similar design principles described herein with respect to polarization selective gratings including PVHs. For example, the device may include a first polarization selective element and a second polarization selective element optically coupled to the first polarization selective element. At least one (e.g., each) of the first polarization selective element or the second polarization selective element may include a polarization selective grating or a holographic element that includes at least one of sub-wavelength structures, liquid crystals, or a photo-refractive holographic material. For example, sub-wavelength structures or optically anisotropic molecules in the first polarization selective element may be configured with orientations that spatially vary with a first in-plane pitch and a first vertical pitch. Sub-wavelength structures or optically anisotropic molecules in the second polarization selective element may be configured with orientations that spatially vary with a second in-plane pitch and a second vertical pitch. The first in-plane pitch may be substantially the same as the second in-plane pitch. The second vertical pitch may be smaller than the first vertical pitch. In some embodiments, the ratio between the second vertical pitch and the first vertical pitch may be within a suitable range or be a suitable number, as described above. For example, in one embodiment, the second vertical pitch may be about half of the first vertical pitch of the first birefringent film. In some embodiments, the thickness of the second polarization selective element may be significantly smaller than a thickness of the first polarization selective element. A ratio between the thickness of the second polarization selective element and the thickness of the first polarization selective element may be less than a predetermined percentage, for example, 5%, 10%, 15%, 20%, 25%, 30%, 35%, 40%, 45%, or 50%.

FIG. 1A illustrates a schematic three-dimensional ("3D") view of a polarization selective optical element 100, such as a PVH, according to an embodiment of the present disclosure. For discussion purposes, the PVH is used as an example of the birefringent optical element, and the birefringent optical element 100 may be referred to as the PVH 100. As shown in FIG. 1A, an incident light beam 102 may be incident onto the PVH 100 along a −z-axis. The PVH 100 may include a birefringent medium in a form of a layer (or a film, a plate). The layer is also referred to as a birefringent film. The birefringent film may include optically anisotropic molecules configured in a three-dimensional ("3D") orientational pattern to provide an optical function of the PVH 100.

In some embodiments, the PVH 100 may be fabricated based on a birefringent material including optically anisotropic molecules having an intrinsic orientational order that can be locally controlled. The birefringent material may exhibit a chirality. In some embodiments, the chirality of the birefringent material may be introduced by chiral dopants doped into a host birefringent material, e.g., introduced by chiral dopants doped into achiral nematic liquid crystals ("LCs"), or introduced by chiral reactive mesogens ("RMs") doped into achiral RMs. In some embodiments, the chirality of the birefringent material may be a property of the birefringent material, such as an intrinsic molecular chirality. For example, the birefringent material may include chiral liquid crystal molecules, or the birefringent material may include molecules having one or more chiral functional groups. In some embodiments, the birefringent material with a chirality may include twist-bend nematic LCs (or LCs in twist-bend nematic phase), in which liquid crystal ("LC") directors may exhibit periodic twist and bend deformations forming a conical helix with doubly degenerate domains having opposite handednesses. The LC directors of twist-bend nematic LCs may be tilted with respect to the helical axis. Thus, the twist-bend nematic phase may be considered as the generalized case of the conventional nematic phase in which the LC directors are orthogonal with respect to the helical axis. In some embodiments, the PVH 100 may be fabricated based on photosensitive polymers, such as amorphous polymers, liquid crystal ("LC") polymers, etc., which may generate an induced (e.g., photo-induced) optical anisotropy and induced (e.g., photo-induced) local optic axis orientations when subjected to a polarized light irradiation. When subjected to a polarized light irradiation, the efficiency of photochemical reaction in the photosensitive polymers may depend on a polarization of an exciting light beam that results in a photo-induced orientation. When exposed to a polarization interference formed by two coherent circularly polarized light beams with opposite handednesses, a 3D polarization field may be recorded into the volume of the photosensitive polymers. PVHs or PVH elements as described herein can also be fabricated by various other methods, such as holographic interference, laser direct writing, and various other forms of lithography. Thus, a "hologram" as described herein is not limited to creation by holographic interference, or "holography."

Figure 1B:
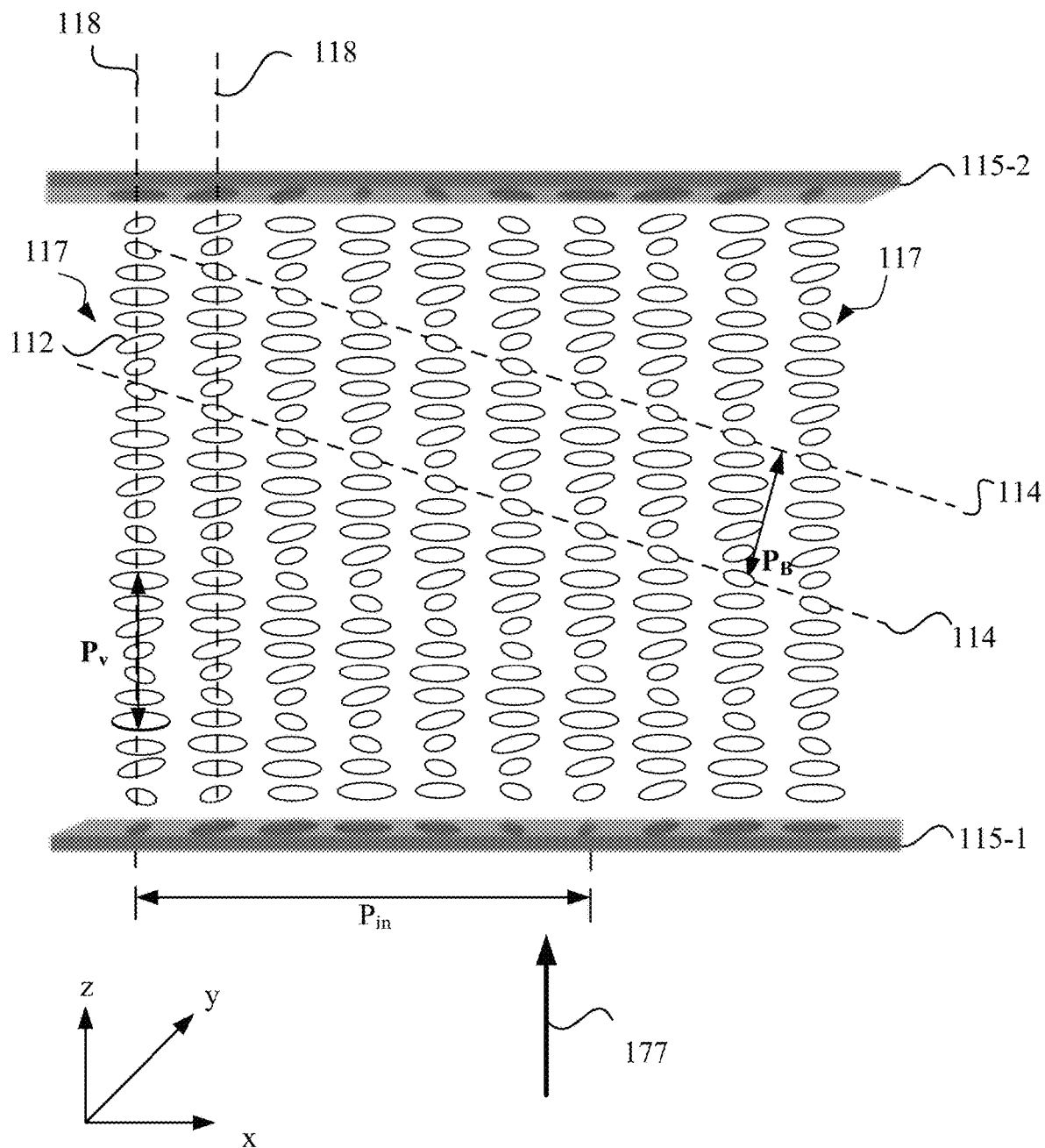
FIG. 1B illustrates a portion of a schematic 3D orientational pattern of optically anisotropic molecules included in a PVH, according to an embodiment of the present disclosure.
Figure 1C:
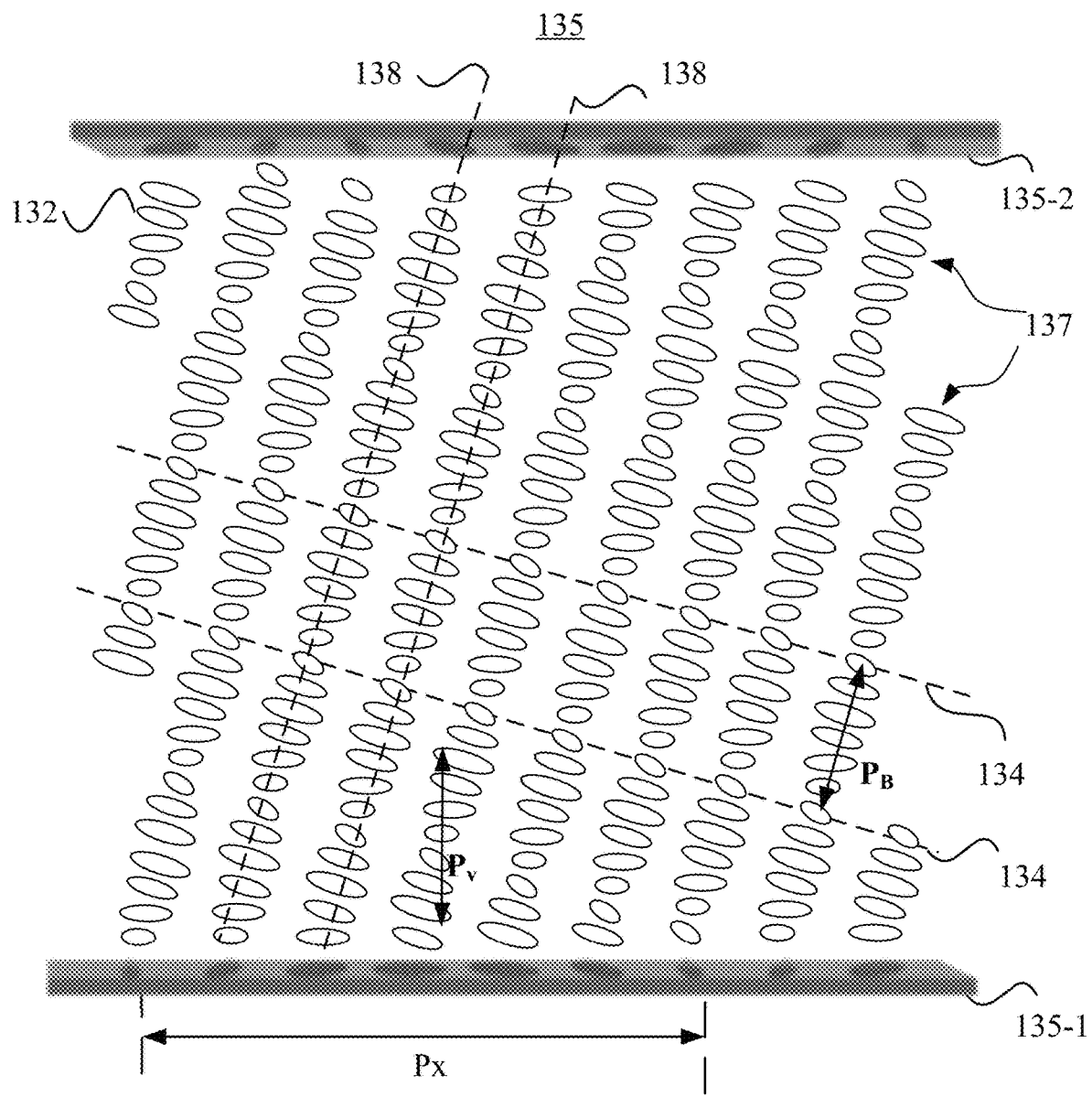
FIG. 1C illustrates a portion of a schematic 3D orientational pattern of optically anisotropic molecules included in a PVH, according to another embodiment of the present disclosure.
Figure 1D:
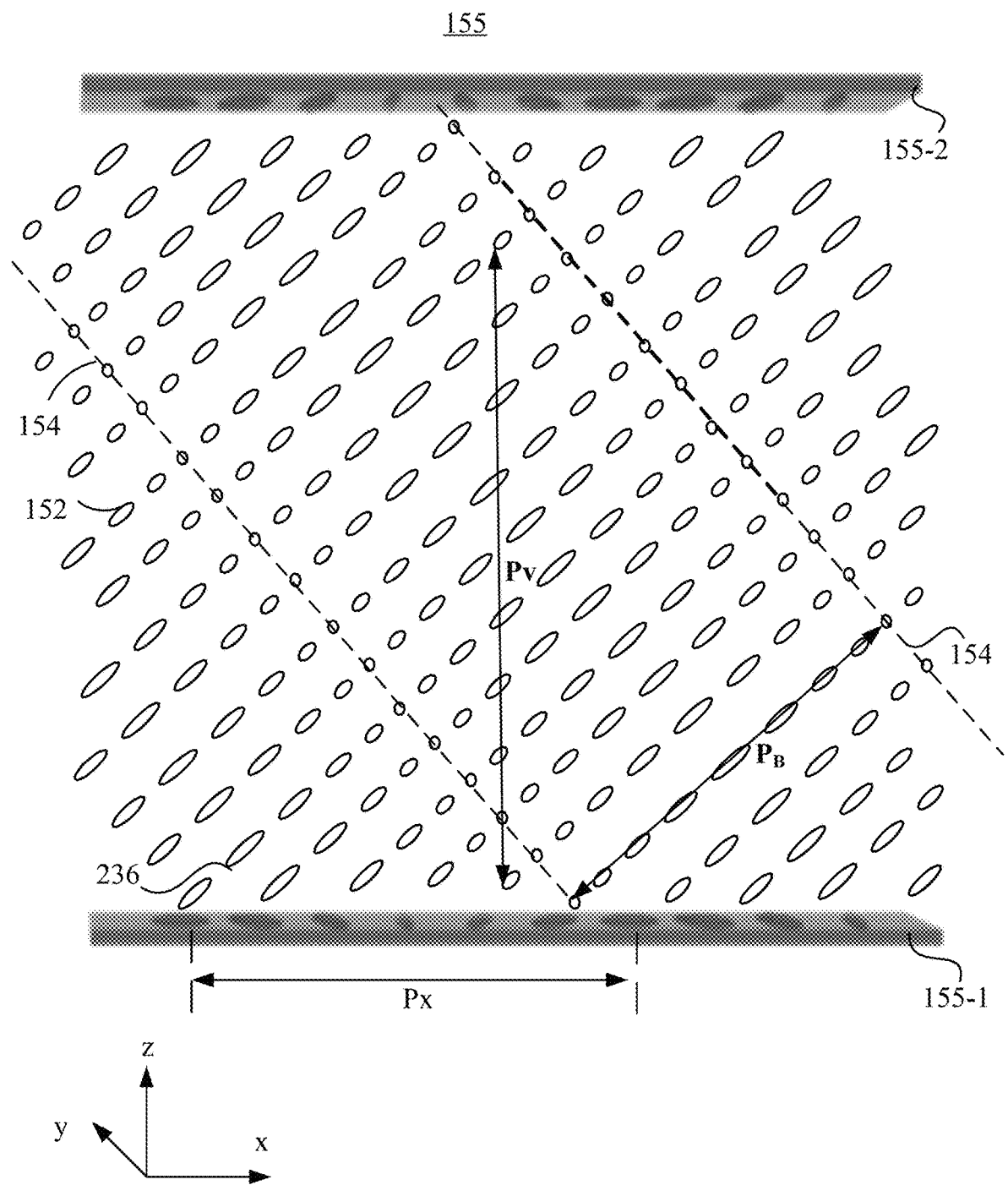
FIG. 1D illustrates a portion of a schematic 3D orientational pattern of optically anisotropic molecules included in a PVH, according to another embodiment of the present disclosure.
Figure 1E:
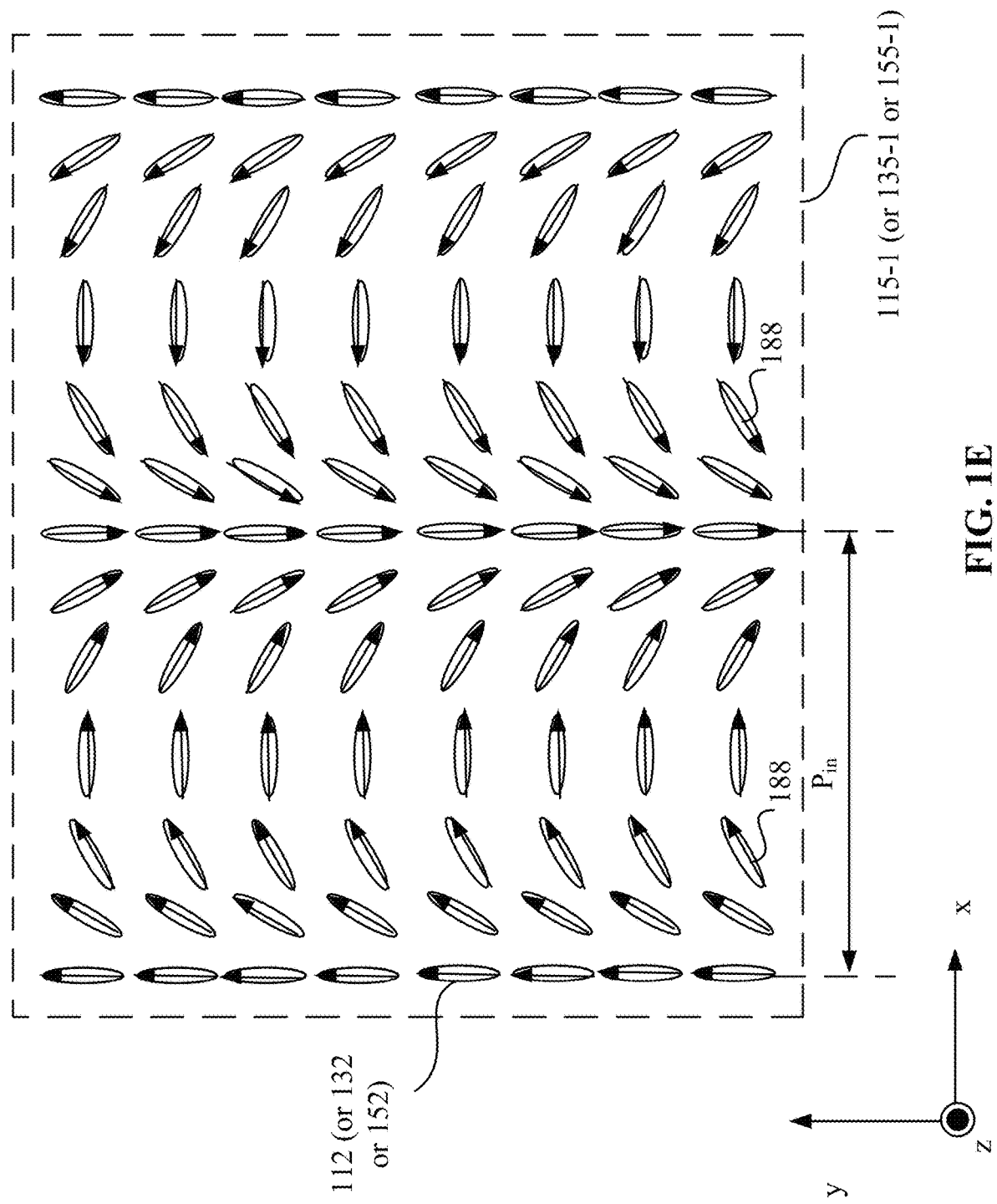
FIG. 1E illustrates a portion of a schematic in-plane orientational pattern of optically anisotropic molecules included in the PVH shown in FIGS. 1B-1D, according to an embodiment of the present disclosure.
Figure 1F:
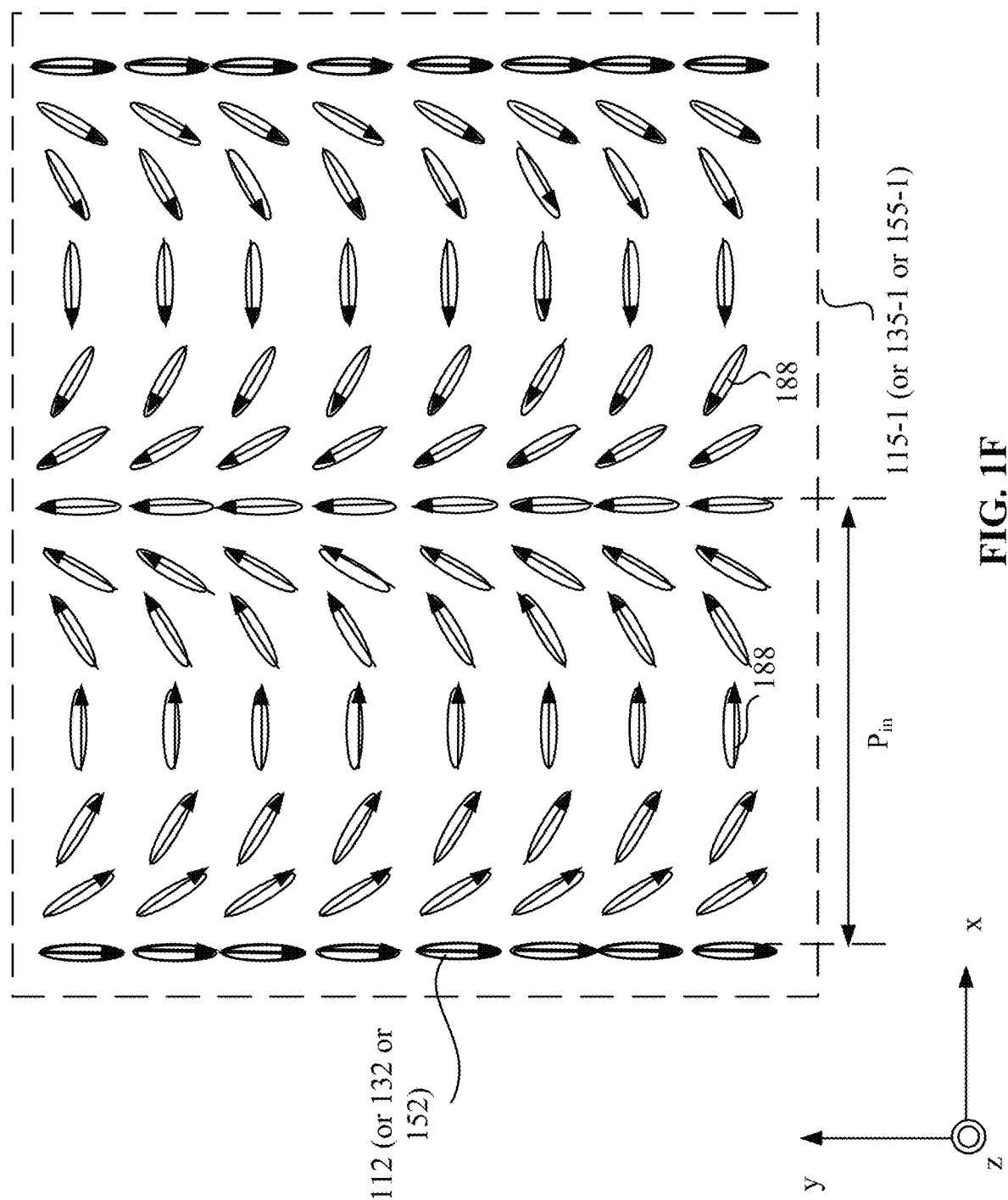
FIG. 1F illustrates a portion of a schematic in-plane orientational pattern of optically anisotropic molecules included in the PVH shown in FIGS. 1B-1D, according to another embodiment of the present disclosure.
Figure 1G:
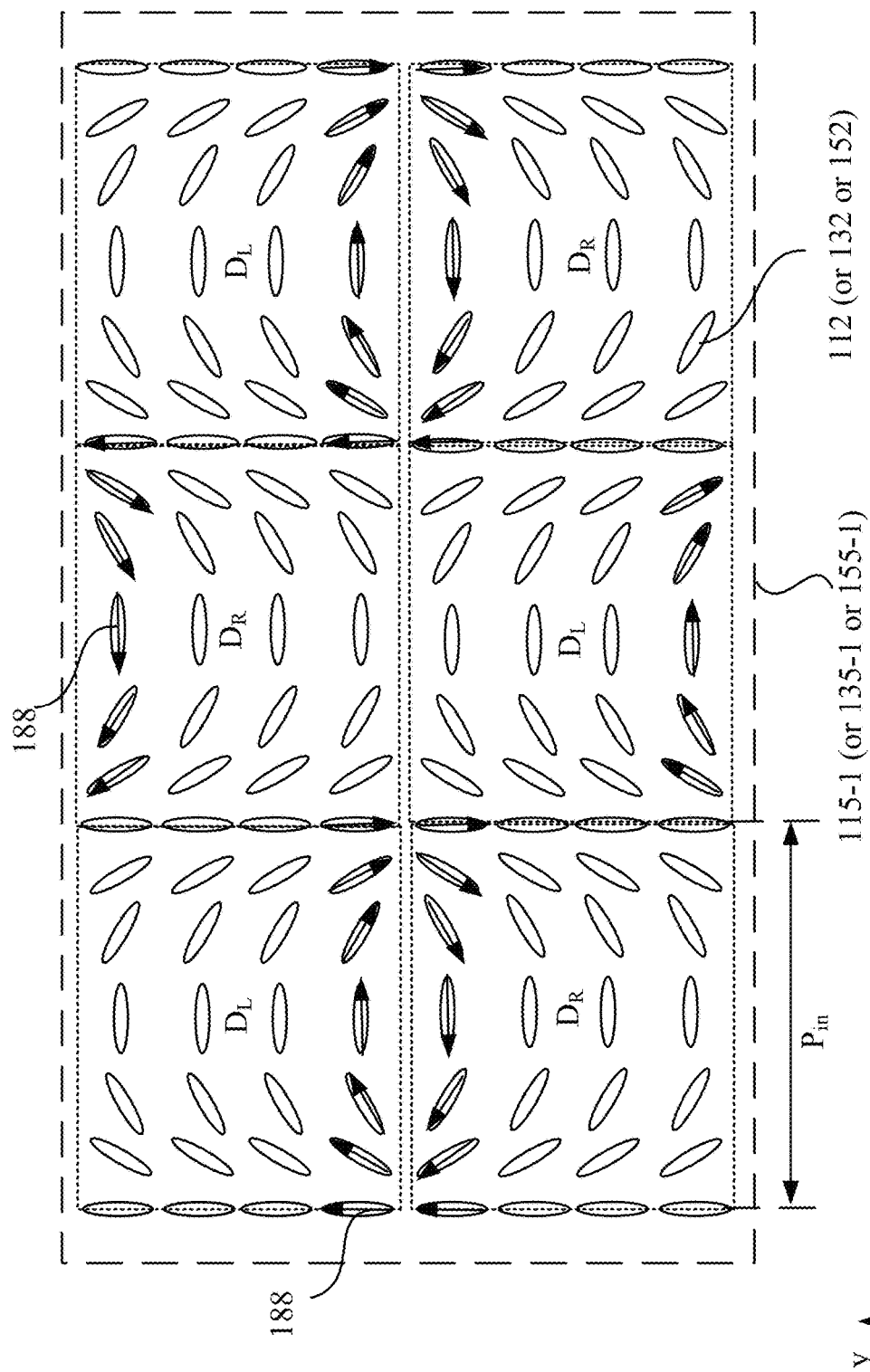
FIG. 1G illustrates a portion of a schematic in-plane orientational pattern of optically anisotropic molecules included in the PVH shown in FIGS. 1B-1D, according to another embodiment of the present disclosure.

FIGS. 1B-1D schematically illustrate portions of 3D orientational patterns of optically anisotropic molecules included in a birefringent film of the PVH 100, according to various embodiments of the present disclosure. FIGS. 1E-1G schematically illustrate portions of periodic in-plane orientation patterns of the optically anisotropic molecules located in close proximity to (including those at) at least one of a first surface or a second surface of the birefringent film shown in FIGS. 1B-1D, according to various embodiments of the present disclosure. For discussion purposes, LC molecules are used as examples of the optically anisotropic molecules of the birefringent film. Each LC molecule in FIGS. 1B-1G is depicted as having a longitudinal direction (or a length direction) and a lateral direction (or a width direction). The longitudinal direction of the LC molecule is referred to as a director of the LC molecule or an LC director.

FIG. 1B schematically illustrates a portion of a 3D orientational pattern of LC molecules 112 included in a birefringent film 115 of the PVH 100. As shown in FIG. 1B, the birefringent film 115 may have a first surface 115-1 and a second surface 115-2 facing the first surface 115-1. Although the birefringent film 115 is shown as flat for illustrative purposes, the birefringent film 115 may have a non-flat shape (e.g., a curved shape). In a volume of the birefringent film 115, the LC molecules 112 may be arranged in a plurality of helical structures 117 with a plurality of helical axes 118 and a helical pitch $P_h$. Directors of the LC molecules 112 included in a same helical structure 117 along a helical axis 118 may continuously rotate spatially around the helical axis 118 in a predetermined rotation direction (e.g., clockwise direction or counter-clockwise direction). Accordingly, the helical structure 117 may exhibit a handedness, e.g., right handedness or left handedness. The helical pitch $P_h$ is defined as a distance along the helical axis 118 over which the LC directors (or azimuthal angles of the LC molecules) rotate by 360°. The azimuthal angle of the LC molecules 112 is defined as an angle between the LC director and a direction (e.g., a +x-axis direction) in a plane parallel with a surface of the birefringent film 115.

In the embodiment shown in FIG. 1B, the helical axes 118 of the helical structures 117 may be parallel with one another. The helical axes 118 may have a direction that is substantially perpendicular to the first surface 115-1 and/or the second surface 115-2 of the birefringent film 115. In other words, the helical axes 118 of the helical structures 117 may have a direction along a thickness direction (e.g., a z-axis direction) of the birefringent film 115. In some embodiments, the LC molecules 112 may be aligned to have substantially small pretilt angles (including zero degree pretilt angle), and the LC directors of the LC molecules 112 may be regarded as substantially orthogonal to the helical axis 118. The birefringent film 115 (or the PVH 100 including the birefringent film 115) may have a vertical pitch $P_v$, which is defined as a distance along the thickness direction of the birefringent film 115 over which the LC directors rotate by 180°. The vertical pitch $P_v$ shown in FIG. 1B may be half of the helical pitch $P_h$.

In some embodiments, the LC molecules 112 located in close proximity to or at a surface (e.g., at least one of the first surface 115-1 or the second surface 115-2) of the birefringent film 115, may be configured with LC directors continuously rotating in a predetermined direction (e.g., an x-axis direction) along the surface (or in a plane parallel with the surface). The continuous rotation of the LC directors may form a periodic rotation pattern with a uniform (e.g., same) in-plane pitch $P_{in}$. The predetermined direction may be any suitable direction along the surface (or in a plane parallel with the surface) of the birefringent film 115. For illustrative purposes, FIG. 1B shows that the predetermined direction is the x-axis direction. The predetermined direction may be referred to as an in-plane direction, the pitch $P_{in}$ along the in-plane direction may be referred to as an in-plane pitch or a horizontal pitch. The pattern with the uniform (or same) in-plane pitch $P_{in}$ may be referred to as a periodic LC director in-plane orientation pattern.

FIG. 1E schematically illustrates a portion of the periodic in-plane orientation pattern of the directors (indicated by arrows 188 in FIG. 1E) of the LC molecules 112 located in close proximity to or at a surface (e.g., at least one of the first surface 115-1 or the second surface 115-2) of the birefringent film 115, according to an embedment of the present disclosure. The in-plane pitch $P_{in}$ is defined as a distance along the in-plane direction (e.g., the x-axis direction) over which the LC directors rotate by 180°. In other words, in a region substantially close to (including at) the surface of the birefringent film 115, local optic axis orientations of the birefringent film 115 may vary periodically in the in-plane direction (e.g., the x-axis direction) with a pattern having the uniform (or same) in-plane pitch $P_{in}$. In addition, at a surface (e.g., at least one of the first surface 115-1 or the second surface 115-2) of the birefringent film 115, the directors of the LC molecules 112 may rotate in a predetermined rotation direction, e.g., a clockwise direction or a counter-clockwise direction. Accordingly, the rotation of the directors of the LC molecules 112 at the surface of the birefringent film 115 may exhibit a handedness, e.g., right handedness or left handedness. In some embodiments, the periodic LC director in-plane orientation pattern or the periodic local optic axis orientation pattern of the birefringent film 115 may be obtained by patterning a recording medium or an alignment surface using various techniques, such as holography techniques. In the embodiment shown in FIG. 1E, at the surface (e.g., at least one of the first surface 115-1 or the second surface 115-2) of the birefringent film 115, the directors of the LC molecules 112 may rotate in a clockwise direction. Accordingly, the rotation of the directors of the LC molecules 112 at the surface of the birefringent film 115 may exhibit a left handedness.

FIG. 1F schematically illustrates a portion of the periodic in-plane orientation pattern of the directors (indicated by arrows 188 in FIG. 1F) of the LC molecules 112 located in close proximity to or at a surface (e.g., at least one of the first surface 115-1 or the second surface 115-2) of the birefringent film 115, according to another embedment of the present disclosure. In the embodiment shown in FIG. 1F, at the surface (e.g., at least one of the first surface 115-1 or the second surface 115-2) of the birefringent film 115, the directors of the LC molecules 112 may rotate in a counter-clockwise direction. Accordingly, the rotation of the directors of the LC molecules 112 at the surface of the birefringent film 115 may exhibit a right handedness. The directors of the LC molecules 112 located in close proximity to or at a surface of the birefringent film 115 shown in FIG. 1E and the directors of the LC molecules 112 located in close proximity to or at a surface of the birefringent film 115 shown in FIG. 1F may be mirror symmetric orientation patterns.

FIG. 1G schematically illustrates a portion of the periodic in-plane orientation pattern of the directors (indicated by arrows 188 in FIG. 1G) of the LC molecules 112 located in close proximity to or at a surface (e.g., at least one of the first surface 115-1 or the second surface 115-2) of the birefringent film 115, according to another embedment of the present disclosure. It is noted that in FIG. 1G, only some directors are indicated by arrows 188. Arrows are not shown for all directors for the simplicity of illustration. In the embodiment shown in FIG. 1G, at the surface (e.g., at least one of the first surface 115-1 or the second surface 115-2) of the birefringent film 115, domains in which the directors of the LC molecules 112 may rotate in a clockwise direction (referred to as domains DL) and domains in which the directors of the LC molecules 112 may rotate in a counter-clockwise direction (referred to as domains DR) may be alternatingly arranged in both x-axis and y-axis direction. The domains DL and the domains DR are schematically enclosed by dotted squares. In some embodiments, the DL and the domains DR may have substantially the same size. The width of each domain may be substantially equal to the value of the in-plane pitch $P_{in}$. Although not shown, in some embodiments, the domains DL and the domains DR may be alternatingly arranged in at least one direction along the surface of the (e.g., at least one of the first surface 115-1 or the second surface 115-2) of the birefringent film 115. In some embodiments, the width of each domain may be an integer multiple of the values of the in-plane pitch Pin. In some embodiments, the domains DL and the domains DR may have different sizes.

Referring back to FIG. 1B, in a volume of the birefringent medium layer 115, the LC molecules 112 may be arranged in a plurality of helical structures 117 with a plurality of helical axes 118 and a helical pitch $P_h$ along the helical axes. The azimuthal angles of the LC molecules 112 arranged along a single helical structure 117 may continuously vary around a helical axis 118 in a predetermined rotation direction, e.g., clockwise direction or counter-clockwise direction. In other words, the LC directors of the LC molecules 112 arranged along a single helical structure 117 may continuously rotate around the helical axis 118 in a predetermined rotation direction to continuously change the azimuthal angle. Accordingly, the helical structure 117 may exhibit a handedness, e.g., right handedness or left handedness. The helical pitch $P_h$ may be defined as a distance along the helical axis 118 over which the LC directors rotate around the helical axis 118 by 360°, or the azimuthal angles of the LC molecules vary by 360°.

In the embodiment shown in FIG. 1B, the helical axes 118 may be substantially perpendicular to the first surface 115-1 and/or the second surface 115-2 of the birefringent medium layer 115. In other words, the helical axes 118 of the helical structures 117 may be in a thickness direction (e.g., a z-axis direction) of the birefringent medium layer 115. That is, the LC molecules 112 may have substantially small tilt angles (including zero degree tilt angles), and the LC directors of the LC molecules 112 may be substantially orthogonal to the helical axis 118. The birefringent medium layer 115 (or the PVH 100 including the birefringent medium layer 115) may have a vertical pitch $P_v$, which may be defined as a distance along the thickness direction of the birefringent medium layer 115 over which the LC directors of the LC molecules 112 rotate around the helical axis 118 by 180° (or the azimuthal angles of the LC directors vary by 180°).

As shown in FIG. 1B, the LC molecules 112 from the plurality of helical structures 117 having a first same orientation (e.g., same tilt angle and azimuthal angle) may form a first series of slanted and parallel refractive index planes 114 periodically distributed within the volume of the birefringent medium layer 115. Although not labeled, the LC molecules 112 with a second same orientation (e.g., same tilt angle and azimuthal angle) different from the first same orientation may form a second series of slanted and parallel refractive index planes periodically distributed within the volume of the birefringent medium layer 115. Different series of slanted and parallel refractive index planes may be formed by LC molecules 112 having different orientations. In the same series of parallel and periodically distributed, slanted refractive index planes 114, the LC molecules 112 may have the same orientation and the refractive index may be the same. Different series of slanted refractive index planes may correspond to different refractive indices. When the number of the slanted refractive index planes (or the thickness of the birefringent film) increases to a sufficient value, Bragg diffraction may be established according to the principles of volume gratings. Thus, the slanted and periodically distributed refractive index planes 114 may also be referred to as Bragg planes 114. Thus, within the birefringent medium layer 115, there exist different series of Bragg planes.

A distance (or a period) between adjacent Bragg planes 114 of the same series may be referred to as a Bragg period PB. The different series of Bragg planes formed within the volume of the birefringent medium layer 115 (or the volume of the PVH 100) may produce a varying refractive index profile that is periodically distributed in the volume of the birefringent medium layer 115. The birefringent medium layer 115 (or the PVH 100) may diffract an input light satisfying a Bragg condition through Bragg diffraction. A slant angle α of the PVH 100 including the birefringent medium layer 115 may be defined as α=90°−β, where β=arctan ($P_v/P_x$). That is, the slant angle may be a function of the vertical pitch and the horizontal in-plane pitch. Specifically, the slant angle may be a function of a ratio between the vertical pitch and the horizontal in-plane pitch. In some embodiments, the PVH 100 including the birefringent medium layer 115 shown in FIG. 1B with a tilt angle 0°<α<45°, may function as a transmissive PVH.

FIG. 1C illustrates a portion of a 3D orientational pattern of LC molecules 132 included in a birefringent medium layer 135, according to another embodiment of the present discourse. Similar to the LC molecules 112 located in close proximity to or at a surface (at least one of the first surface 115-1 or the second surface 115-2) of the birefringent medium layer 115 shown in FIG. 1B and FIGS. 1E-1G, the LC molecules 132 located in close proximity to or at a surface (at least one of a first surface 135-1 or a second surface 135-2) of the birefringent medium layer 135 may be configured with LC directors rotating continuously and periodically in a predetermined rotation direction (e.g., clockwise or counter-clockwise) along a predetermined in-plane direction (e.g., an x-axis direction) at the surface or in a plane parallel with the surface. That is, orientations of LC directors may vary continuously and periodically in the predetermined in-plane direction (e.g., an x-axis direction) along the surface or the plane parallel with the surface. The continuous rotation may have an in-plane rotation pattern with an in-plane pitch $P_x$. In some embodiments, the in-plane pitch $P_x$ may be uniform (or same). The LC molecules may form a plurality of Bragg planes 134 similar to the Bragg planes 114 shown in FIG. 1B. FIGS. 1E-1G show the periodic in-plane rotation pattern of LC directors of the LC molecules 132 located in close proximity to or at a surface (e.g., 135-1 or 135-2) of the birefringent medium layer 135.

In the embodiment shown in FIG. 1C, helical axes 138 of helical structures 137 may be tilted with respect to a first surface 135-1 and/or a second surface 135-2 of the birefringent medium layer 135 (or with respect to the thickness direction of the birefringent medium layer 135). For example, the helical axes 138 of the helical structures 137 may have an acute angle or obtuse angle with respect to the first surface 135-1 and/or the second surface 135-2 of the birefringent medium layer 135. In some embodiments, the LC directors of the LC molecule 132 may be substantially orthogonal to the helical axes 138 (i.e., the tilt angle may be substantially zero degree). In some embodiments, the LC directors of the LC molecule 132 may be tilted with respect to the helical axes 138 at an acute angle. The birefringent medium layer 135 (or the PVH 100 including the birefringent medium layer 135) may have a vertical periodicity (or pitch) $P_v$. A slant angle α of the PVH 100 including the birefringent medium layer 135 may be defined as α=90°−β, where β=arctan ($P_v/P_x$). In some embodiments, the PVH 100 including the birefringent medium layer 135 shown in FIG. 1C with a tilt angle 45°<α<90°, may function as a reflective PVH.

FIG. 1D illustrates a portion of a schematic 3D orientational pattern of LC molecules 152 included in a birefringent medium layer 155, according to another embodiment of the present discourse. As shown in FIG. 1D, the birefringent medium layer 155 may include a first surface 155-1 and a second surface 155-2 facing the first surface 155-1. Similar to the LC molecules 112 located in close proximity to or at a surface of the birefringent medium layer 115 shown in FIG. 1B and FIGS. 1E-1G, the LC molecules 152 located in close proximity to or at a surface (at least one of the first surface 155-1 or the second surface 155-2) of the birefringent medium layer 155 may be configured with LC directors continuously rotating in a predetermined rotation direction (e.g., clockwise) along a predetermined in-plane direction (e.g., an x-axis direction) at the surface or in a plane parallel with the surface. The continuous rotation may exhibit a periodic in-plane rotation pattern with an in-plane pitch $P_{in}$ (which is $P_x$ in this example). In some embodiments, the in-plane pitch $P_{in}$ may be uniform (e.g., same) or may vary in the predetermined in-plane direction (e.g., the x-axis direction). FIGS. 1E-1G also show the periodic in-plane rotation pattern of the orientations of the LC directors of the LC molecules 152 located in close proximity to or at the surface (e.g., 155-1 or 155-2) of the birefringent medium layer 155.

Referring back to FIG. 1D, in the volume of the birefringent medium layer 155, the LC molecules 152 may be arranged in a plurality of series of slanted and periodic refractive index planes (or Bragg planes) 154, similar to the configuration shown in FIG. 1B. The birefringent medium layer 155 (or the PVH 100 including the birefringent medium layer 155) may also have a vertical periodicity (or pitch) $P_v$ in a thickness direction of the birefringent medium layer 155. A slant angle α of the PVH 100 including the birefringent medium layer 155 may be defined as α=90°−β, where β=arctan ($P_v/P_x$). In some embodiments, the PVH 100 including the birefringent medium layer 155 shown in FIG. 1D with a slant angle of 0°<α<45° may function as a transmissive PVH.

The periodic in-plane rotation pattern of the directors of the LC molecules located in close proximity to or at a surface of the birefringent medium layer (or the periodic local optic axis orientations of the birefringent medium layer at a surface of the birefringent medium layer) shown in FIGS. 1E-1G is for illustrative purposes only, which is not intended to limit the scope of the present disclosure. Although not shown, the directors of the LC molecules located in close proximity to or at a surface of the birefringent medium layer (or the local optic axis orientations of the birefringent medium layer at a surface of the birefringent medium layer) may be configured to have an in-plane orientation pattern with a varying pitch in at least one in-plane direction, e.g., radial directions.

In some embodiments, the PVH 100 may be configured to primarily (or substantially) diffract a circularly polarized light (or an elliptically polarized light) having a predetermined handedness, and primarily (or substantially) transmit (e.g., with negligible diffraction) a circularly polarized light (or an elliptically polarized light) having a handedness that is opposite to the predetermined handedness. It is understood that the PVH 100 may transmit the circularly polarized light (or the elliptically polarized light) having the predetermined handedness, with a much smaller light transmittance than the circularly polarized light (or the elliptically polarized light) having the handedness that is opposite to the predetermined handedness. The PVH 100 may diffract the circularly polarized light (or the elliptically polarized light) having the handedness that is opposite to the predetermined handedness, with a much smaller diffraction efficiency than the circularly polarized light (or the elliptically polarized light) having the predetermined handedness. An unpolarized light or a linearly polarized light may be decomposed into two circularly polarized components (e.g., a first component and a second component) with opposite handednesses. Thus, the first component may be primarily diffracted by the PVH 100, and the second component may be primarily transmitted (e.g., with negligible diffraction) by the PVH 100. The PVH 100 may be configured to primarily forwardly or backwardly diffract the circularly polarized light (or the elliptically polarized light) having the predetermined handedness. When the PVH 100 is configured to primarily forwardly diffract the circularly polarized light (or the elliptically polarized light) having the predetermined handedness, the PVH 100 may be referred to as a transmissive PVH 100. When the PVH 100 is configured to primarily backwardly diffract the circularly polarized light (or the elliptically polarized light) having the predetermined handedness, the PVH 100 may be referred to as a reflective PVH 100.

Figure 2B:
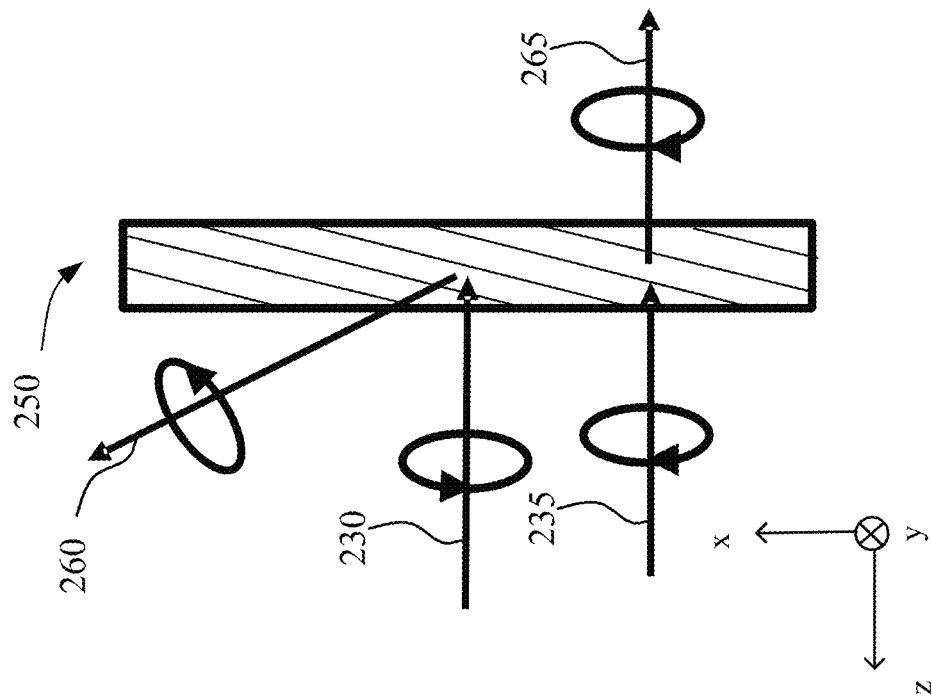
FIG. 2B illustrates diffraction orders of a reflective PVH, according to an embodiment of the present disclosure.
Figure 2A:
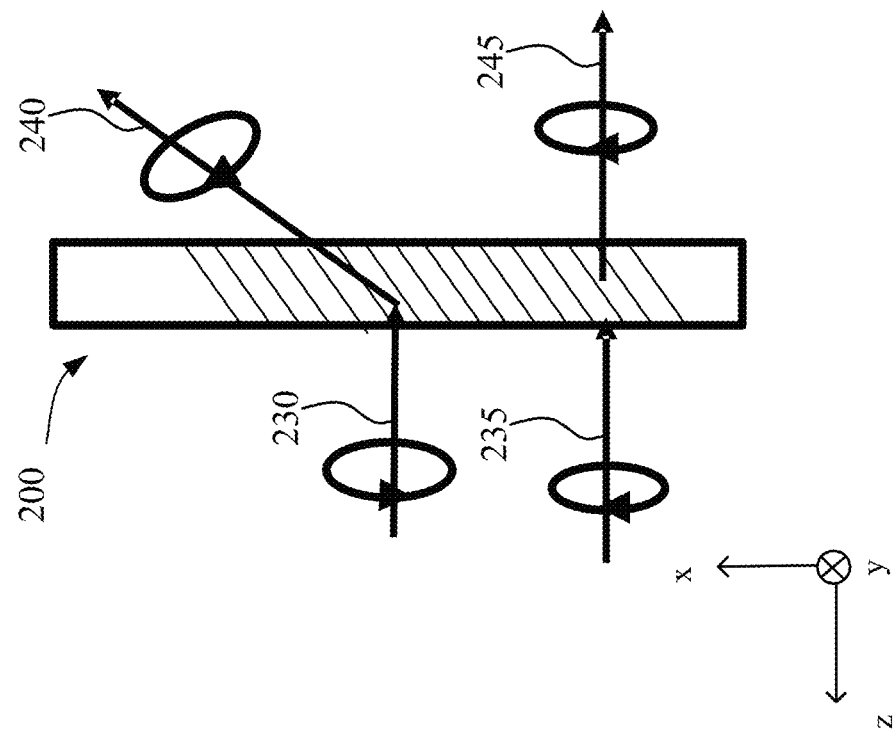
FIG. 2A illustrates diffraction orders of a transmissive PVH, according to an embodiment of the present disclosure.

FIG. 2A illustrates diffraction orders of a transmissive PVH 200, according to an embodiment of the present disclosure. The transmissive PVH 200 may be configured to primarily forwardly diffract a circularly polarized light beam (or an elliptically polarized light beam) having a predetermined handedness (e.g., a handedness that is the same as the handedness of the rotation of the LC directors at the LC director plane or the handedness of the helical structures of the PVH 200) to a diffracted light beam (e.g., the first order diffracted light beam). The transmissive PVH 200 may primarily transmit (e.g., with negligible diffraction) a circularly polarized light beam having a handedness that is opposite to the predetermined handedness (e.g., a handedness that is opposite to the handedness of the rotation of the LC directors at the LC director plane or the handedness of the helical structures of the PVH 200) to a transmitted light beam (the $0^{th}$ order). In some embodiments, the diffracted light beam output from the PVH 200 may be a circularly polarized light beam with a handedness reversed by the transmissive PVH 200. In some embodiments, the transmitted light beam may be a circularly polarized light beam with a handedness substantially maintained by the transmissive PVH 200. Thus, the transmissive PVH 200 may provide a polarization conversion to a light beam in addition to diffraction. For discussion purposes, FIG. 2A shows the PVH 200 is a right-handed transmissive PVH, which is configured to primarily forwardly diffract an RHCP light beam 230 as an LHCP light beam 240, and primarily transmit (e.g., with negligible diffraction) an LHCP light beam 235 to the $0^{th}$ order as an LHCP light beam 245. In some embodiments, the diffracted light beam may be an elliptically polarized light beam or a linearly polarized light beam. In some embodiments, the transmitted light beam may be an elliptically polarized light beam or a linearly polarized light beam.

FIG. 2B illustrates diffraction orders of a reflective PVH 250, according to an embodiment of the present disclosure. The reflective PVH 250 may be configured to primarily backwardly diffract a circularly polarized light beam (or an elliptically polarized light beam) having a predetermined handedness (e.g., a handedness that is the same as the handedness of the helical structures in the PVH 250) to a diffracted light beam (e.g., the first order diffracted light beam), and primarily transmit (e.g., with negligible diffraction) a circularly polarized light beam having a handedness that is opposite to the predetermined handedness (e.g., a handedness that is opposite to the handedness of the helical structures in the PVH) to a transmitted light beam (the $0^{th}$ order). In some embodiments, the diffracted light beam may be a circularly polarized light beam with a handedness substantially maintained by the reflective PVH 250. In some embodiments, the transmitted light beam may be a circularly polarized light beam with a handedness substantially maintained by the reflective PVH 250. For discussion purposes, FIG. 2B shows that the reflective PVH 250 is a right-handed reflective PVH, which is configured to primarily backwardly diffract an RHCP light beam 230 as an RHCP light beam 260, and primarily transmit (e.g., with negligible diffraction) an LHCP light beam 235 to the $0^{th}$ order as an LHCP light beam 265. In some embodiments, the reflective PVH 250 may change the polarization of the diffracted light beam and/or transmitted light beam. In some embodiments, diffracted light beam may be an elliptically polarized light beam or a linearly polarized light beam. In some embodiments, the transmitted light beam may be an elliptically polarized light beam or a linearly polarized light beam.

Figure 3A:
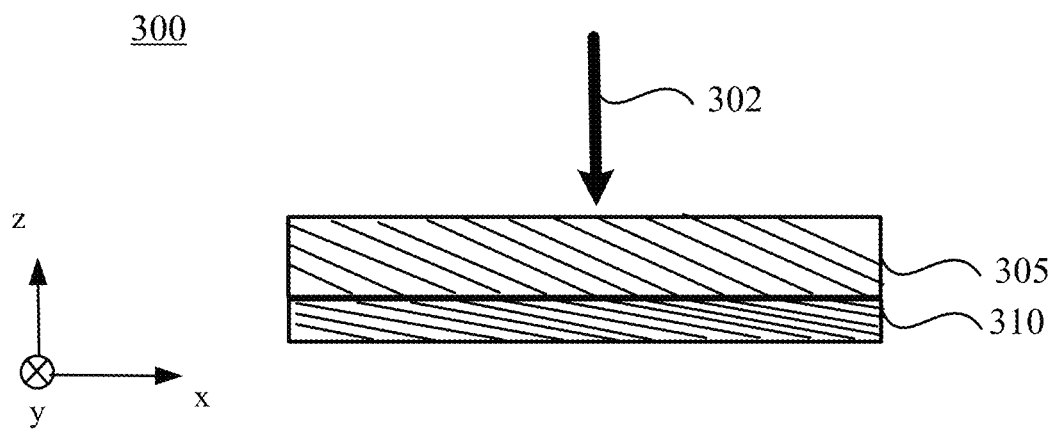
FIG. 3A illustrates a schematic diagram of an optical device for suppressing a rainbow effect, according to an embodiment of the present disclosure.

FIG. 3A illustrates a schematic diagram of an optical device (or optical element) 300 for suppressing a rainbow effect (or suppressing diffraction artifacts), according to an embodiment of the present disclosure. The optical device 300 may include a plurality of birefringent medium layers. For example, in some embodiments, the optical device 300 may be a multi-layer PVH. As shown in FIG. 3A, the optical device 300 may include a plurality of PVHs stacked together, e.g., a first PVH 305 and a second PVH 310. In some embodiments, at least one (e.g., each) of the first PVH 305 and the second PVH 310 may include a birefringent film (or a birefringent medium layer). In some embodiments, the birefringent film may include polymerized (or cross-linked) liquid crystals ("LCs"), polymer-stabilized LCs, photopolymers (e.g., amorphous polymers, liquid crystal ("LC") polymers, etc.), or any combination thereof. The LCs may include nematic LCs, twist-bend LCs, chiral nematic LCs, smectic LCs, or any combination thereof. Optically anisotropic molecules of the birefringent film may be arranged in a suitable 3D orientation pattern (such as that shown in FIG. 1B, FIG. 1C, or FIG. 1D) having a vertical pitch $P_v$ (e.g., the pitch in the thickness direction) and an in-plane pitch $P_{in}$ (e.g., the pitch in a direction in the x-y plane). The Bragg planes within a volume of the first PVH 305 and the second PVH 310 are schematically indicated by inclined lines within the respective PVH.

In the embodiment shown in FIG. 3A, the first PVH 305 may be configured to have a relatively large thickness (which may be referred to as a primary PVH layer 305), and the second PVH 310 may be configured to have a relatively small thicknesses (which may be referred to as a secondary PVH layer 310). The thickness of the secondary PVH layer 310 may be significantly smaller than the thickness of the primary PVH layer 305. For example, the thickness of the secondary PVH layer 310 may be less than a predetermined percentage of the thickness of the primary PVH layer 305. A ratio between the thickness of the secondary PVH layer 310 and the thickness of the primary PVH layer 305 may be less than a predetermined percentage, for example, 5%, 10%, 15%, 20%, 25%, 30%, 35%, 40%, 45%, or 50%. In some embodiments, the in-plane pitches $P_{in}$ of the primary PVH layer 305 and the secondary PVH layer 310 may be configured to be substantially the same, and the vertical pitch $P_v$ of the secondary PVH layer 310 (or a second vertical pitch) may be configured to be smaller than the vertical pitch $P_v$ of the primary PVH layer 305 (or a first vertical pitch). A ratio between the second vertical pitch and the first vertical pitch may be within a suitable range or be a suitable number, e.g., any sub-range or any number within the range of 0.2-0.8, as discussed above. In one embodiment, the second vertical pitch may be about half of the first vertical pitch. The slant angle α of a PVH is defined as α=90°−β, where β=arctan ($P_v/P_{in}$). The slant angle α of the primary PVH layer 305 may be configured to be smaller than the slant angle α of the secondary PVH layer 310.

In some embodiments, both the primary PVH layer 305 and the secondary PVH layer 310 may include the same type of PVH, e.g., reflective PVH or transmissive PVH. In some embodiments, the primary PVH layer 305 and the secondary PVH layer 310 may include different types of PVHs. For example, one of the primary PVH layer 305 and the secondary PVH layer 310 may include a reflective PVH, and the other may include a transmissive PVH. In some embodiments, the primary PVH layer 305 and the secondary PVH layer 310 may be configured to have the same polarization selectivity. For example, the primary PVH layer 305 and the secondary PVH layer 310 may be configured to have diffract a polarized light having a first handedness, and transmit a polarized light having a second handedness that is opposite to the first handedness with negligible diffraction.

When a light 302 (e.g., a visible polychromatic light from a real world environment) is incident onto the primary PVH layer 305, the primary PVH layer 305 may be configured to diffract at least a portion of the light 302 into different diffraction orders. For example, when the visible polychromatic light 302 from the real world environment is an unpolarized light (or a linearly polarized light) that can be decomposed into two circularly polarized components with opposite handednesses, the primary PVH layer 305 may be configured to substantially diffract one circularly polarized component with the first handedness into different diffraction orders, and substantially transmit the other circularly polarized component with the second handedness. When the visible polychromatic light 302 from the real world environment is a circularly polarized light having the first handedness, the primary PVH layer 305 may be configured to substantially diffract the circularly polarized light having the first handedness into different diffraction orders. As the diffraction angle is wavelength dependent, the primary PVH layer 305 may diffract the visible polychromatic light 302 with a rainbow effect, causing a multi-colored glare in a real-world image viewed through the primary PVH layer 305. The secondary PVH layer 310 may be configured to suppress undesirable diffraction orders of the visible polychromatic light 302 caused by the primary PVH layer 305, such that the rainbow effect caused by the primary PVH layer 305 may be reduced. For example, a lower diffraction order may have a weaker (or less perceivable) rainbow effect, while a higher diffraction order may have a stronger (or more perceivable) rainbow effect. The secondary PVH layer 310 may be configured to suppress high diffraction orders of the visible polychromatic light 302 caused by the primary PVH layer 305, e.g., diffraction orders higher than a predetermined diffraction order.

For example, the primary PVH layer 305 may be configured to at least partially diffract the visible polychromatic light 302 from the real world environment as a first light. The first light may include a first number of perceivable diffraction orders. The secondary PVH layer 310 may be configured to receive the first light from the primary PVH layer 305, and at least partially diffract the first light as a second light. The second light may include a second number of perceivable diffraction orders. The secondary PVH layer 310 may be configured to suppress undesirable diffraction orders caused by the primary PVH layer 305, such as diffraction orders higher than a predetermined diffraction order, e.g., higher than the first diffraction order (+$1^{st}$ diffraction order and/or −$1^{st}$ diffraction order). For example, the second number of perceivable diffraction orders may be smaller than the first number of perceivable diffraction orders. Thus, the rainbow effect caused by the primary PVH layer 305 may be reduced by the secondary PVH layer 310. In other words, the rainbow effect caused by a combination of the primary PVH layer 305 and the secondary PVH layer 310 may be weaker (or less perceivable) than the rainbow effect caused by the primary PVH layer 305 only.

In some embodiments, each of the primary PVH layer 305 and the secondary PVH layer 310 may include a birefringent medium having a respective birefringence and a respective chirality. The vertical pitch $P_v$ of the PVH may be determined by the chirality of the birefringent medium. In some embodiments, the chirality of the birefringent medium may be an induced chirality. For example, the birefringent medium may include a host birefringent material and a chiral dopant doped into the host birefringent material at a predetermined concentration. The chirality may be introduced by the chiral dopant doped into the host birefringent material, e.g., chiral dopant doped into nematic LCs, or chiral reactive mesogens ("RMs") doped into achiral RMs. RMs may be also referred to as a polymerizable mesogenic or liquid-crystalline compound, or polymerizable LCs. For simplicity, in the following description, the term "liquid crystal(s)" or "LC(s)" may encompass both mesogenic and LC materials. When the chirality of the birefringent medium is introduced by the chiral dopant doped into the host birefringent material, the vertical pitch $P_v$ of the PVH may be determined by a helical twist power ("HTP") of the chiral dopant and the concentration of the chiral dopant doped into the host birefringent material. In some embodiments, the chirality of the birefringent medium may be an intrinsic chirality. For example, the birefringent medium may include a birefringent material having an intrinsic molecular chirality, and chiral dopant may not be included. In some embodiments, the birefringent material may include chiral liquid crystal molecules, or molecules having one or more chiral functional groups. The vertical pitch $P_v$ of the PVH may be determined by the intrinsic molecular chirality of the birefringent material.

In some embodiments, the primary PVH layer 305 may include a first birefringent medium having a first birefringence and a first chirality, and the secondary PVH layer 310 may include a second birefringent medium having a second birefringence and a second chirality. The first chirality may be configured to be different from the second chirality, resulting in a difference in the vertical pitches of the primary PVH layer 305 and the secondary PVH layer 310. In some embodiments, the first chirality of the primary PVH layer 305 may be configured to be smaller than the second chirality of the secondary PVH layer 310, such that the vertical pitch $P_v$ of the secondary PVH layer 310 (or a second vertical pitch) is smaller than the vertical pitch $P_v$ of the primary PVH layer 305 (or a first vertical pitch). A ratio between the second vertical pitch and the first vertical pitch may be within a suitable range or be a suitable number, e.g., any sub-range or any number within the range of 0.2-0.8, as discussed above. In one embodiment, the second vertical pitch may be about half of the first vertical pitch. The first birefringence of the primary PVH layer 305 may be different from or substantially the same as the second birefringence of the secondary PVH layer 310.

Although the first PVH layer 305 and the second PVH layer 310 are shown as having a flat shape for illustrative purposes, the first PVH layer 305 and/or the second PVH layer 310 may have a curved shape. For illustrative purposes, FIG. 3A shows that each of the first PVH layer 305 and the second PVH layer 310 has a uniform thickness. Although not shown, in some embodiments, the first PVH layer 305 and/or the second PVH layer 310 may have a varying thickness, e.g., a thickness that varies in the x-y plane, such as along at least one of the x-axis direction or the y-axis direction. When each of the first PVH layer 305 and the second PVH layer 310 has a varying thickness, the first PVH layer 305 may be configured to have a relatively large local thickness and the second PVH layer 310 may be configured to have a relatively small local thicknesses at corresponding local points of the PVH layers. For example, at a corresponding local point, the thickness of the secondary PVH layer 310 may be significantly smaller than the thickness of the primary PVH layer 305. A ratio between the thickness of the secondary PVH layer 310 and the thickness of the primary PVH layer 305 may be less than a predetermined percentage, for example, 5%, 10%, 15%, 20%, 25%, 30%, 35%, 40%, 45%, or 50%.

For illustrative purposes, FIG. 3A shows that the optical device 300 includes two PVHs 305 and 310 stacked together. In some embodiments, the optical device 300 may include more than two (e.g., three, four, or five, etc.) PVHs stacked together. In some embodiments, the plurality of PVHs in the optical device 300 may include at least one primary PVH layer and at least one secondary PVH. The at least one primary PVH layer may be configured to diffract a visible polychromatic light from the real world environment with a rainbow effect, and the at least one secondary PVH layer may be configured to suppress undesirable diffraction orders of a visible light caused by the at least one primary PVH layer, such that the rainbow effect caused by the at least one primary PVH layer may be reduced.

Figure 3B:
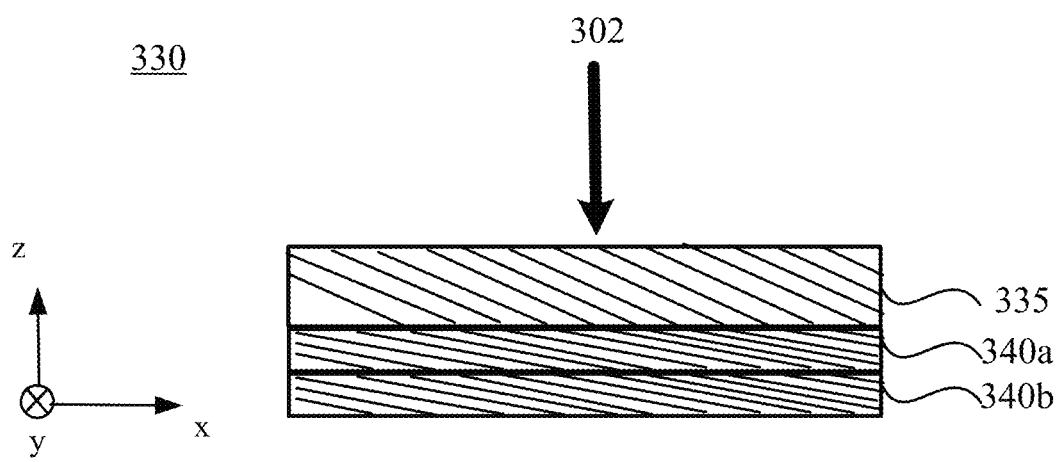
FIG. 3B illustrates a schematic diagram of an optical device for suppressing a rainbow effect, according to another embodiment of the present disclosure.

FIG. 3B illustrates a schematic diagram of an optical device (or optical element) 330 for suppressing a rainbow effect, according to another embodiment of the present disclosure. The optical device 330 may be a multi-layer PVH. The optical device 330 shown in FIG. 3B may include elements that are the same as or similar to those included in the optical device 300 shown in FIG. 3A. Detailed descriptions of the same or similar elements may refer to the above descriptions rendered in connection with FIG. 3A. As shown in FIG. 3B, the optical device 330 may include plurality of PVHs stacked together. The plurality of PVHs may include a primary PVH layer and a plurality of secondary PVH layers. For discussion purposes, FIG. 3B shows that the optical device 330 may include a primary PVH layer 335 and two secondary PVH layers 340a and 340b (e.g., a first secondary PVH layer 340a and a second secondary PVH layer 340b). In some embodiments, the optical device 330 may include more than two secondary PVH layers. The primary PVH layer 335 and the secondary PVH layers 340a and 340b may be arranged in a suitable order. For discussion purposes, the secondary PVH layers 340a and 340b may be stacked together, and the primary PVH layer 335 may be disposed at the stack of the secondary PVH layers 340a and 340b. For example, the secondary PVH layer 340a may be disposed between the secondary PVH layer 340b and the primary PVH layer 335. Although not shown, in some embodiments, the primary PVH layer 335 and two secondary PVH layers 340a and 340b may be arranged in other suitable orders. For example, the primary PVH layer 335 may be disposed between the two secondary PVH layers 340a and 340b. Although one primary PVH layer 335 is shown for illustrative purposes, in some embodiments, the optical device 330 may include a plurality of primary PVH layers.

The primary PVH layer 335 shown in FIG. 3B may be configured to have a relatively large thickness, and each of the secondary PVH layers 340a and 340b may be configured to have a relatively small thickness. The thickness of the secondary PVH layer 340a or 340b may be significantly smaller than the thickness of the primary PVH layer 335. A ratio between the thickness of the secondary PVH layer 340a or 340b and the thickness of the primary PVH layer 335 may be less than a predetermined percentage, for example, 5%, 10%, 15%, 20%, 25%, 30%, 35%, 40%, 45%, or 50%. In some embodiments, the in-plane pitches $P_{in}$ of the primary PVH layer 335 and the secondary PVH layers 340a and 340b may be configured to be substantially the same.

In some embodiments, the vertical pitches $P_v$ of the secondary PVH layer 340a and the secondary PVH layer 340b (a second vertical pitch and a third vertical pitch) may be substantially the same. In some embodiments, the vertical pitch $P_v$ of the secondary PVH layer 340a and the secondary PVH layer 340b may be smaller than the vertical pitch of the primary PVH layer 335. The ratio between the vertical pitch of the secondary PVH layer 340a (or 340b) and the vertical pitch of the primary PVH layer 335 may be within a suitable range or be a suitable number, e.g., any sub-range or any number within the range of 0.2-0.8, as described above. In one embodiment, the vertical pitch $P_v$ of the secondary PVH layer 340a or 340b may be configured to be about half of the vertical pitch $P_v$ of the primary PVH layer 335.

In some embodiments, the vertical pitches of the secondary PVH layer 340a and the vertical pitch of the secondary PVH layer 340b may be different. For example, in some embodiments, the vertical pitch (third vertical pitch) of the secondary PVH layer 340b may be smaller than (e.g., about half of) the vertical pitch (second vertical pitch) of the secondary PVH layer 340a. A ratio between the vertical pitch of the secondary PVH layer 340b and the vertical pitch of the secondary PVH layer 340a may be any suitable sub-range or number within the range of 0.2-0.8, as discussed above. In one embodiment, the ratio between the vertical pitch of the secondary PVH layer 340b and the vertical pitch of the secondary PVH layer 340a may be 0.5. That is, the vertical pitch of the secondary PVH layer 340b may be about half of the vertical pitch of the secondary PVH layer 340a.

The primary PVH layer 335 may be configured to diffract a visible polychromatic light 302 from the real world environment with a rainbow effect, and the secondary PVH layers 340a and 340b may be configured to suppress undesirable diffraction orders of the visible polychromatic light 302 caused by the primary PVH layer 335, such that the rainbow effect caused by the primary PVH layer 335 may be reduced.

For example, the primary PVH layer 335 may be configured to at least partially diffract the visible polychromatic light 302 from the real world environment as a first light. The first light may include a first number of perceivable diffraction orders. The secondary PVH layer 340a may be configured to receive the first light from the primary PVH layer 335, and at least partially diffract the first light as a second light. The second light may include a second number of perceivable diffraction orders. The secondary PVH layer 340b may be configured to receive the second light from the secondary PVH layer 340a, and at least partially diffract the second light as a third light. The third light may include a third number of perceivable diffraction orders. The secondary PVH layers 340a and 340b may be configured to suppress undesirable diffraction orders caused by the primary PVH layer 335, such as diffraction orders higher than a predetermined diffraction order, e.g., higher than the first diffraction order (+1st diffraction order and/or $-1^{st}$ diffraction order). For example, the second number of perceivable diffraction orders may be smaller than the first number of perceivable diffraction orders. The third number of perceivable diffraction orders may be smaller than the second number of perceivable diffraction orders. Thus, the rainbow effect caused by the primary PVH layer 335 may be reduced by the secondary PVH layers 340a and 340b. In other words, the rainbow effect caused by a combination of the primary PVH layer 335 and the secondary PVH layers 340a and 340b may be weaker (or less perceivable) than the rainbow effect caused by the primary PVH layer 335 only.

Figure 3C:
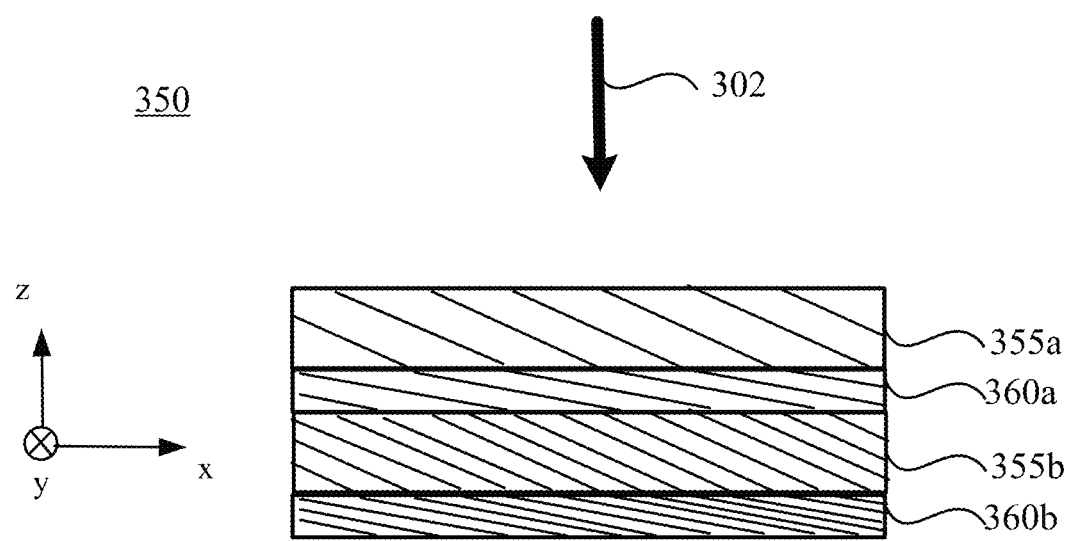
FIG. 3C illustrates a schematic diagram of an optical device for suppressing a rainbow effect, according to another embodiment of the present disclosure.

FIG. 3C illustrates a schematic diagram of an optical device (or optical element) 350 for suppressing a rainbow effect, according to another embodiment of the present disclosure. The optical device 350 may be a multi-layer PVH. The optical device 350 shown in FIG. 3C may include elements that are the same as or similar to those included in the optical device 300 shown in FIG. 3A, and/or the optical device 330 shown in FIG. 3B. Detailed descriptions of the same or similar elements may refer to the above descriptions rendered in connection with FIGS. 3A and 3B. As shown in FIG. 3C, the optical device 350 may include a plurality of PVHs stacked together. The plurality of PVHs may include a plurality of primary PVH layers and a plurality of secondary PVH layers. In some embodiments, each primary PVH layer may be configured to diffract a visible polychromatic light 302 from the real world environment with a rainbow effect, and one or more secondary PVH layers may be paired with the respective primary PVH layer to suppress undesirable diffraction orders caused by the respective primary PVH layer, such that the rainbow effect caused by the respective primary PVH layer may be reduced.

For discussion purposes, FIG. 3C shows that the optical device 350 may include two primary PVH layers 355a and 355b (e.g., a first primary PVH layer 335a and a second primary PVH layer 335b), and two secondary PVH layers 360a and 360b (e.g., a first secondary PVH layer 360a and a second secondary PVH layer 360b). In some embodiments, the optical device 350 may include more than two primary PVH layers, and/or more than two secondary PVH layers. The primary PVH layers 355a and 355b and secondary PVH layers 360a and 360b may be arranged in a suitable order. For discussion purposes, FIG. 3C shows that the primary PVH layers and the secondary PVH layers may be alternately arranged. For example, the secondary PVH layer 360a may be disposed between the primary PVH layer 355a and the primary PVH layer 355b, and the primary PVH layer 355b may be disposed between the secondary PVH layer 360a and the secondary PVH layer 360b. Although not shown, in some embodiments, the primary PVH layers 355a and 355b and the secondary PVH layers 360a and 360b may be arranged in other suitable orders. For example, all the primary PVH layers may be stacked together, all the secondary PVH layers may be stacked together, and the stack of the primary PVH layers may be stacked with the stack of the secondary PVH layers.

In some embodiments, the primary PVH layer 355a may be configured to have a relatively large thickness, and the secondary PVH layer 360a may be configured to have a relatively small thicknesses. The thickness of the secondary PVH layer 360a may be significantly smaller than the thickness of the primary PVH layer 355a. A ratio between the thickness of the secondary PVH layer 360a and the thickness of the primary PVH layer 355a may be less than a predetermined percentage, for example, 5%, 10%, 15%, 20%, 25%, 30%, 35%, 40%, 45%, or 50%. In some embodiments, the in-plane pitches $P_{in}$ of the primary PVH layer 355a and the secondary PVH layer 360a may be configured to be substantially the same. In some embodiments, the vertical pitch $P_v$ of the secondary PVH layer 360a may be configured to be smaller than (e.g., about half) of the vertical pitch $P_v$ of the primary PVH layer 355a. A ratio between the vertical pitch of the secondary PVH layer 360a and the vertical pitch of the primary PVH layer 355a may be in any suitable sub-range or be any suitable number within the range of 0.2-0.8, as discussed above.

In some embodiments, the primary PVH layer 355b may be configured to have a relatively large thickness, and the secondary PVH layer 360b may be configured to have a relatively small thicknesses. The thickness of the secondary PVH layer 360b may be significantly smaller than the thickness of the primary PVH layer 355b. A ratio between the thickness of the secondary PVH layer 360b and the thickness of the primary PVH layer 355b may be less than a predetermined percentage, for example, 5%, 10%, 15%, 20%, 25%, 30%, 35%, 40%, 45%, or 50%. In some embodiments, the in-plane pitches $P_{in}$ of the primary PVH layer 355b and the secondary PVH layer 360b may be configured to be substantially the same. In some embodiments, the vertical pitch $P_v$ of the secondary PVH layer 360b may be configured to be smaller than (e.g., about half) of the vertical pitch $P_v$ of the primary PVH layer 355b. A ratio between the vertical pitch of the secondary PVH layer 360b and the vertical pitch of the primary PVH layer 355b may be in any suitable sub-range or be any suitable number within the range of 0.2-0.8, as discussed above.

The in-plane pitches $P_{in}$ of the primary PVH layer 355a and the secondary PVH layer 360a may be substantially the same as or different from the in-plane pitches $P_{in}$ of the primary PVH layer 355b and the secondary PVH layer 360b. The vertical pitch $P_v$ of the primary PVH layer 355a may be substantially the same as or different from the vertical pitch $P_v$ of the primary PVH layer 355b. The vertical pitch $P_v$ of the secondary PVH layer 360a may be substantially the same as or different from the vertical pitch $P_v$ of the secondary PVH layer 360b. The thickness of the primary PVH layer 355a may be substantially the same as or different from the primary PVH layer 355b. The thickness of the secondary PVH layer 360a may be substantially the same as or different from the secondary PVH layer 360b. In some embodiments, a thickness of at least one of the primary PVH layers 355a, 355b, or at least one of the secondary PVH layers 360a, 360b, may vary in the x-y plane, such as along at least one of the x-axis direction or the y-axis direction.

In the embodiment shown in FIG. 3C, when the visible polychromatic light 302 from the real world environment is incident onto the primary PVH layer 355a, the primary PVH layer 355a may be configured to diffract the visible polychromatic light 302 with a rainbow effect. The secondary PVH layer 360a, the primary PVH layer 355b, and the secondary PVH layer 360b may be configured to suppress undesirable diffraction orders of the visible polychromatic light 302 caused by the primary PVH layer 355a, such that the rainbow effect caused by the primary PVH layer 355a may be reduced. For example, the primary PVH layer 355a may be configured to at least partially diffract the visible polychromatic light 302 from the real world environment as a first light. The first light may include a first number of perceivable diffraction orders. The secondary PVH layer 340a may be configured to receive the first light from the primary PVH layer 355a, and at least partially diffract the first light as a second light. The second light may include a second number of perceivable diffraction orders. The primary PVH layer 355b may be configured to receive the second light from the secondary PVH layer 360a, and at least partially diffract the second light as a third light. The third light may include a third number of perceivable diffraction orders. The secondary PVH layer 360b may be configured to receive the third light from the primary PVH layer 355b, and at least partially diffract the third light as a fourth light. The fourth light may include a fourth number of perceivable diffraction orders. The secondary PVH layers 360a and 360b may be configured to suppress undesirable diffraction orders caused by the primary PVH layers 355a and 355b, such as diffraction orders higher than a predetermined diffraction order, e.g., higher than the first diffraction order (+1st diffraction order and/or $-1^{st}$ diffraction order). For example, the second number of perceivable diffraction orders may be smaller than the first number of perceivable diffraction orders. The third number of perceivable diffraction orders may be smaller than the second number of perceivable diffraction orders. The fourth number of perceivable diffraction orders may be smaller than the third number of perceivable diffraction orders. Thus, the rainbow effect caused by the primary PVH layers 355a and 355b may be reduced by the secondary PVH layers 360a and 360b. In other words, the combination of the primary PVH layers 355a and 355b and the secondary PVH layers 360a and 360b may generate a weaker (or less perceivable) rainbow effect than the primary PVH layer 355a only or the combination of the primary PVH layers 355a and 355b.

In some embodiments, for the optical device 350 shown in FIG. 3C with four PVH layers, the PVH layer 355a may be the primary PVH layer (a first PVH layer having a first vertical pitch), and the other PVH layers 360a, 355b, and 360b may be secondary PVH layers (a second, third, and fourth PVH layer having a second, third, and fourth vertical pitch, respectively) configured to reduce the diffraction by the primary PVH layer, e.g., suppress undesirable diffraction orders of a light output from the primary PVH layer. The vertical pitches of the PVH layers 360a, 355b, and 360b may be substantially the same. For example, the same vertical pitch of the PVH layers 306a, 355b, and 360b may be about 20%-80% of the vertical pitch of the primary PVH layer 355a. In some embodiments, the same vertical pitch of the PVH layers 306a, 355b, and 360b may be about half of the vertical pitch of the primary PVH layer 355a. In some embodiments, the second vertical pitch of the second PVH layer 360a may be about half of the first vertical pitch of the primary PVH layer 355a, the third vertical pitch of the third PVH layer 355b may be about half of the second vertical pitch of the second PVH layer 360a, and the fourth vertical pitch of the fourth PVH layer 360b may be about half of the third vertical pitch.

Figure 4A:
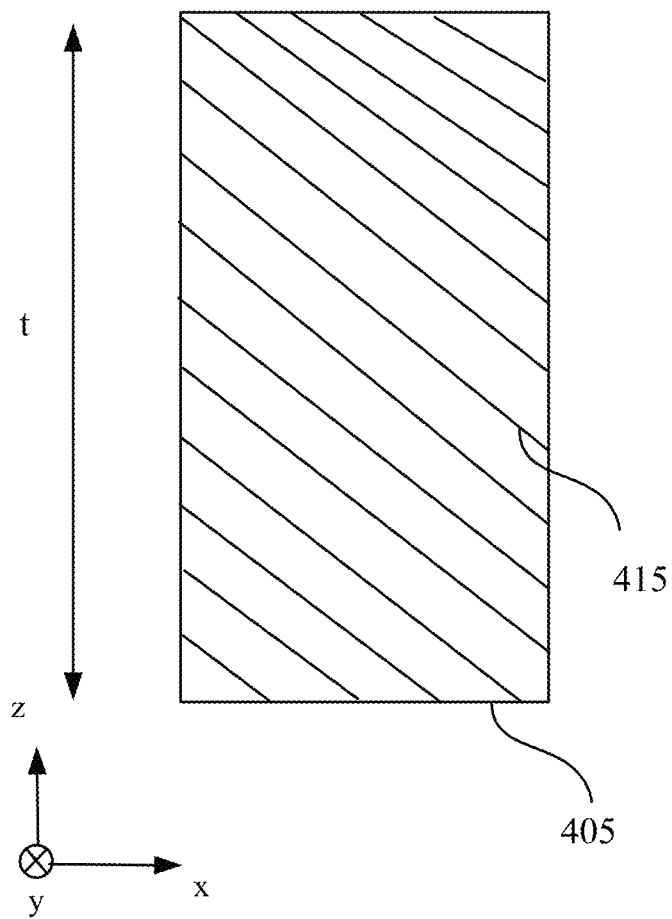
FIG. 4A illustrates a schematic diagram of a conventional single-layer PVH.
Figure 4B:
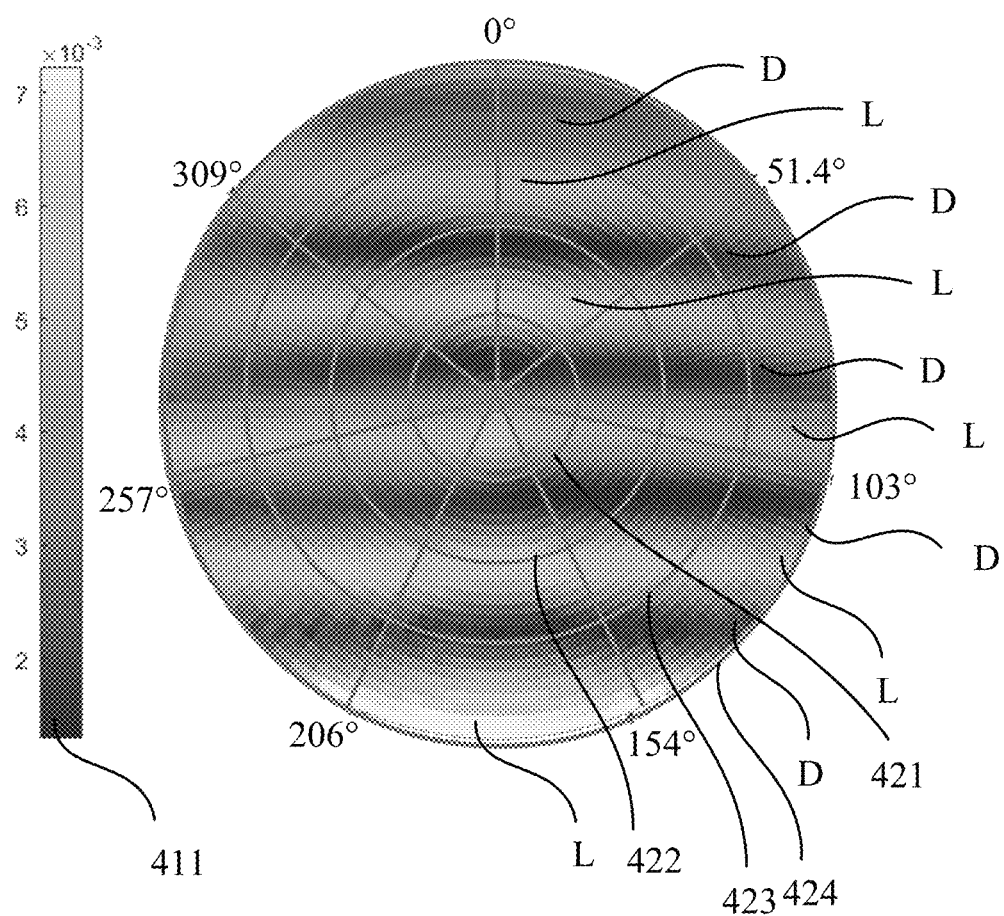
FIG. 4B illustrates simulation results showing a relationship between viewing angle and diffraction efficiency for the conventional single-layer PVH shown in FIG. 4A.
Figure 4C:
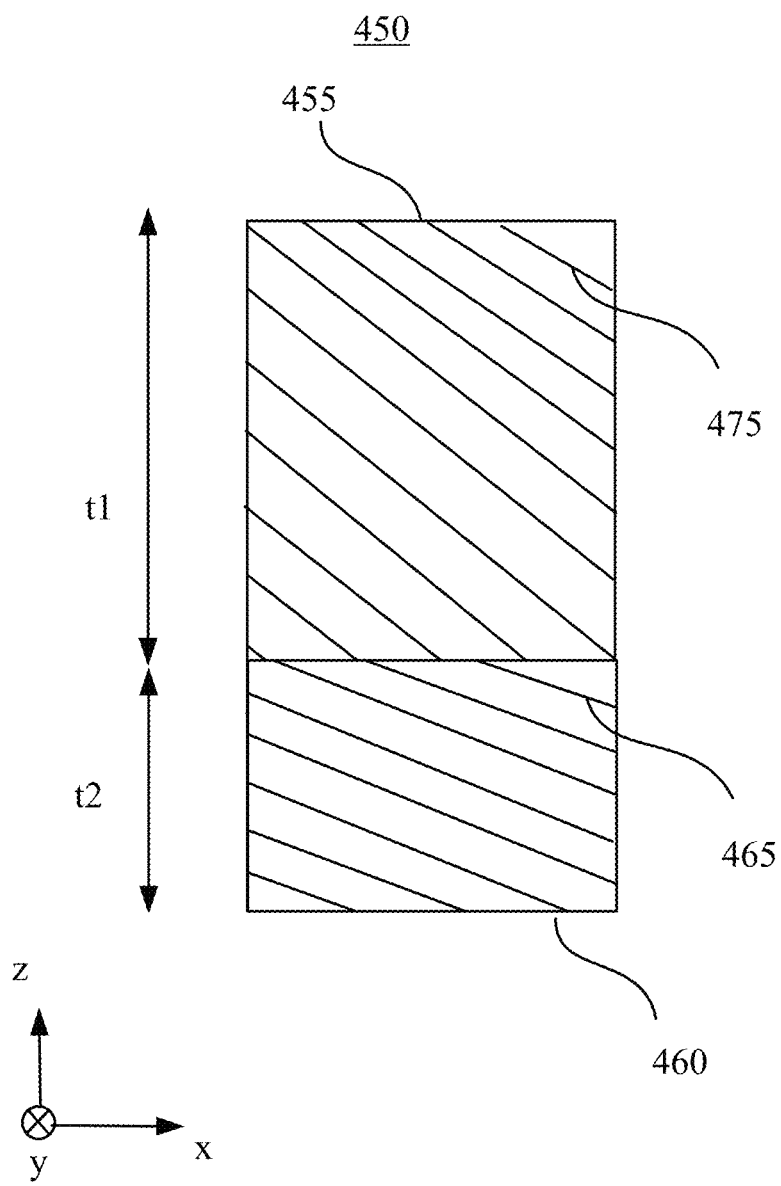
FIG. 4C illustrates a schematic diagram of a multi-layer PVH, according to an embodiment of the present disclosure.

FIG. 4A illustrates a schematic diagram of a conventional single-layer PVH 400, and FIG. 4B illustrates simulation results showing a relationship between viewing angles and diffraction efficiency of the conventional single-layer PVH 400 shown in FIG. 4A. FIG. 4C illustrates a schematic diagram of a multi-layer PVH 450, according to an embodiment of the present disclosure, and FIG. 4D illustrates simulation results showing a relationship between viewing angles and diffraction efficiency of the multi-layer PVH 450 shown in FIG. 4C, according to an embodiment of the present disclosure.

As shown in FIG. 4A, the conventional single-layer PVH 400 includes a single PVH layer 405 with a thickness t=4.7 μm, a vertical pitch $P_v$=282 nm, and an in-plane pitch $P_{in}$=937 nm. As shown in FIG. 4C, the multi-layer PVH 450 according to an embodiment of the present disclosure includes a first PVH layer 455 with a thickness t1=4.7 μm, a vertical pitch $P_v$=282 nm, and an in-plane pitch $P_{in}$=937 nm, and a second PVH layer 460 with a thickness t2=0.06 μm, a vertical pitch $P_v$=145 nm, and an in-plane pitch $P_{in}$=937 nm. That is, the in-plane pitches $P_{in}$ of the first PVH layer 455 and the second PVH layer 460 may be the same, and the vertical pitch $P_v$ the second PVH layer 460 may be about (slightly less than) half of the vertical pitch $P_v$ the first PVH layer 455. The thickness, the vertical pitch, and the in-plane pitch of the first PVH layer 455 in the multi-layer PVH 450 are similar to the thickness, the vertical pitch, and the in-plane pitch of the single PVH layer 405 in the conventional single-layer PVH 400, respectively. For discussion purposes, the single-layer PVH 400 and the multi-layer PVH 450 are transmissive PVHs. FIG. 4A shows that the conventional single-layer PVH 400 includes a plurality of parallel Bragg planes 415. FIG. 4C shows that the first PVH layer 455 includes a plurality of parallel Bragg planes 475 and the second PVH layer 460 includes a plurality of parallel Bragg planes 465, which may not be parallel with the Bragg planes 475.

Figure 4D:
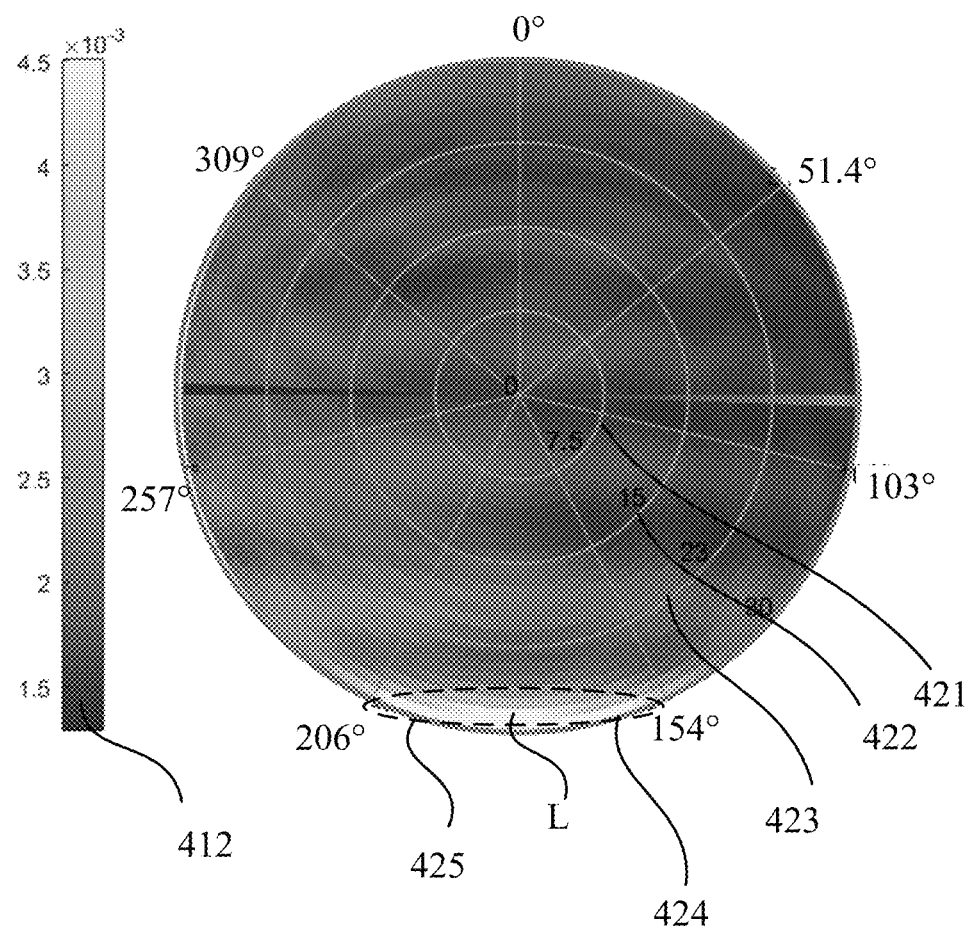
FIG. 4D illustrates simulation results showing a relationship between viewing angle and diffraction efficiency for the multi-layer PVH shown in FIG. 4C, according to an embodiment of the present disclosure.

FIGS. 4B and 4D show average transmissive diffraction efficiency plotted as a function of viewing angles for the conventional single-layer PVH 400 shown in FIG. 4A and the multi-layer PVH 450 of the present disclosure shown in FIG. 4C, respectively. In FIG. 4B and FIG. 4D, a gray scale bar 411 or 412 (from darker gray to lighter gray) is shown to represent the average transmissive diffraction efficiency of the conventional single-layer PVH 400 or the multi-layer PVH 450 of the present disclosure over a predetermined range of incidence angles of a white light (with a predetermined visible wavelength range). On the gray scale bar 411 or 412, the darker gray denotes a lower average transmissive diffraction efficiency, and the lighter gray denotes a higher average transmissive diffraction efficiency. The efficiency increases from the darker gray of the gray scale bar 411 or 412 to the lighter gray of the gray scale bar 411 or 412. A higher average transmissive diffraction efficiency (corresponding to a lighter gray) may indicate a stronger rainbow effect. The center of the circular plot shown in FIG. 4B and FIG. 4D represents a zero-degree field of view ("FOV"), and the four concentric circles 421, 422, 423, and 424 starting from the center represent 15° FOV, 30° FOV, 45° FOV, and 60° FOV. A radial direction starting from the center of the circular plot represents a viewing angle direction. For illustrative purposes, seven viewing angles directions (e.g., 0°, 51.4°, 103°, 154°, 206°, 257°, and 309°) are marked in FIGS. 4B and 4D.

In FIG. 4B, the circular shaped plot shows the distribution of the average transmission efficiency at different incidence angles. The plot shows alternating lighter gray strips (labeled with "L") and darker gray strips (labeled with "D") distributed in the vertical direction. Referring to FIG. 4B, the average transmissive diffraction efficiency of the conventional single-layer PVH 400 varies between about 0.7% and about 0.2% in most areas within the circle 424 (e.g., the 60° FOV). Referring to FIG. 4D, the average transmissive diffraction efficiency of the multi-layer PVH 450 is substantially uniform in most areas within the circle 424 (e.g., the 60° FOV), varying between about 0.2% and about 0.15%. As shown in FIG. 4D, the entire circular plot (or circle 424) is substantially covered by the darker gray, except for a dashed region 425, which is covered by the lighter gray. This indicates that the average transmissive diffraction efficiency of the multi-layer PVH 450 is much more uniform than that of the conventional single-layer PVH 400 shown in FIG. 4B. Comparing FIG. 4B and FIG. 4D, in most areas within the circle 424 (e.g., the 60° FOV), the variation of the average transmissive diffraction efficiency of the multi-layer PVH 450 (e.g., about 0.05%) is significantly reduced as compared to the variation of the average transmissive diffraction efficiency of the conventional single-layer PVH 400 (e.g., 5%). In addition, in most areas within the circle 424 (e.g., the 60° FOV), the highest average transmissive diffraction efficiency of the multi-layer PVH 450 (e.g., 0.2%) is significantly reduced as compared to the highest average transmissive diffraction efficiency of the single-layer PVH 400 (e.g., 0.7%). FIG. 4D indicates that in the multi-layer PVH 450, the rainbow effects can be significantly reduced.

Figure 4E:
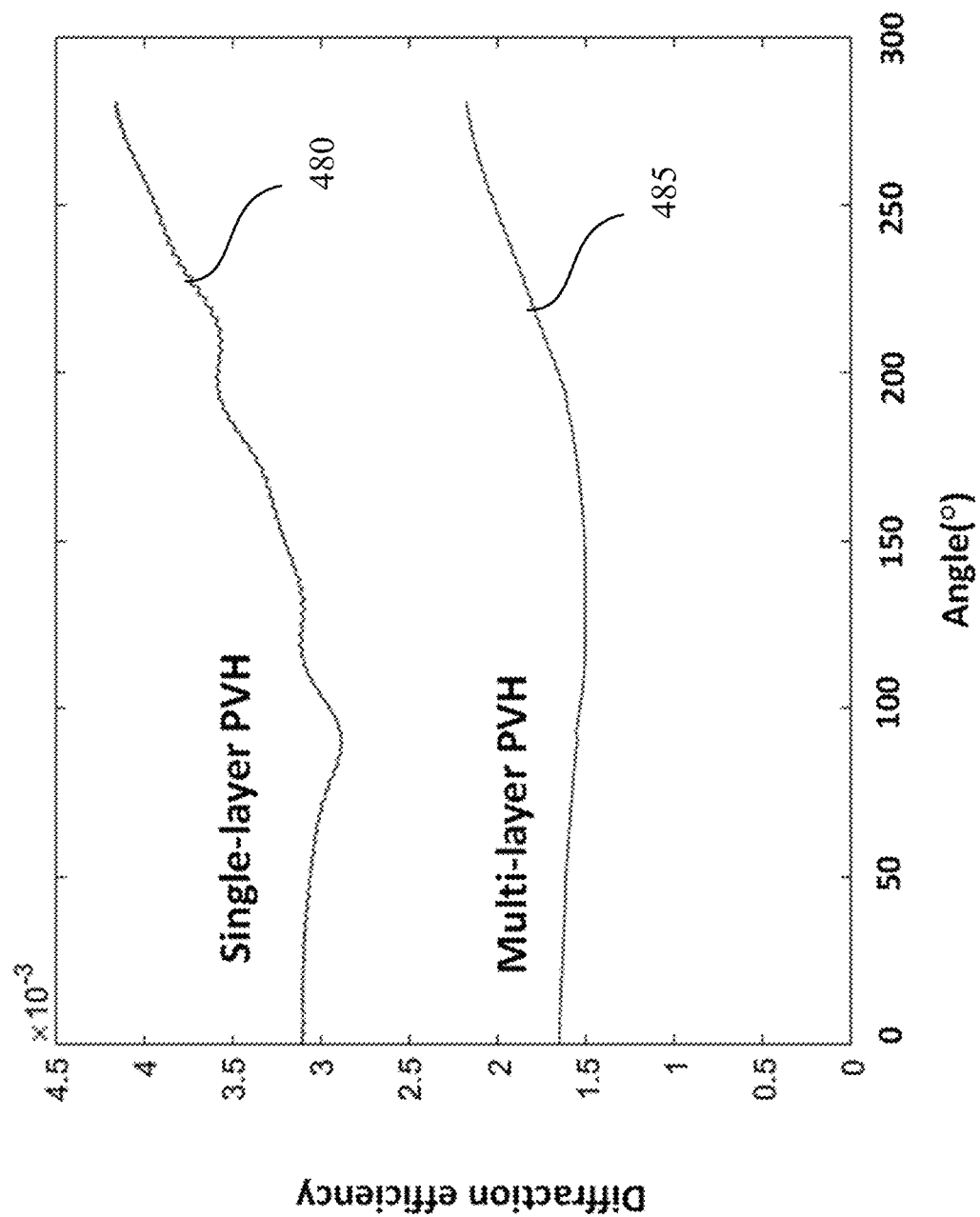
FIG. 4E illustrates simulation results showing relationships between viewing angle and diffraction efficiency for the single-layer PVH shown in FIG. 4A and the multi-layer PVH shown in FIG. 4B.

FIG. 4E illustrates simulation results showing relationships between the viewing angle and the diffraction efficiency for the conventional single-layer PVH 400 shown in FIG. 4A and the multi-layer PVH 450 of the present disclosure shown in FIG. 4C. As shown in FIG. 4E, the horizontal axis represents the viewing angle (or viewing angle direction), and the vertical axis represents the average transmissive diffraction efficiency over the predetermined range of incidence angles and the predetermined visible wavelength range of the incident light. Curves 480 and 485 show the average transmissive diffraction efficiency of the conventional single-layer PVH 400 shown in FIG. 4A and the multi-layer PVH 450 of the present disclosure shown in FIG. 4C, respectively. As the viewing angle direction varies from 0° to about 280°, the average transmissive diffraction efficiency of the multi-layer PVH 450 of the present disclosure is much lower than the average transmissive diffraction efficiency of the conventional single-layer PVH 400. For example, the average transmissive diffraction efficiency of the multi-layer PVH 450 of the present disclosure is about half of the average transmissive diffraction efficiency of the conventional single-layer PVH 400. Thus, the rainbow effect caused by the multi-layer PVH 450 of the present disclosure may be reduced to about half of the conventional single-layer PVH 400, for a white incident light with a substantially same wavelength range and same incidence angle range.

Figure 5A:
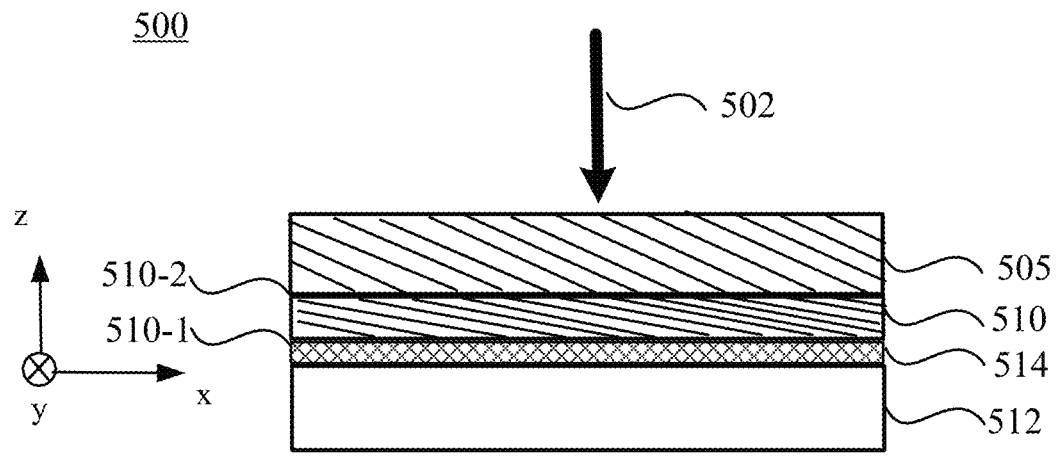
FIG. 5A illustrates a schematic diagram of an optical device for suppressing a rainbow effect, according to another embodiment of the present disclosure.

FIG. 5A illustrates a schematic diagram of an optical device (or optical element) 500 including multiple layers for suppressing a rainbow effect, according to another embodiment of the present disclosure. The optical device 500 may be a multi-layer PVH. The optical device 500 may be a passive optical device. The optical device 500 shown in FIG. 5A may include elements that are the same as or similar to those included in the optical device 300 shown in FIG. 3A, the optical device 330 shown in FIG. 3B, and/or the optical device 350 shown in FIG. 3C. Detailed descriptions of the same or similar elements may refer to the above descriptions rendered in connection with FIGS. 3A-3C. As shown in FIG. 5A, the optical device 500 may include a substrate 512, an alignment structure 514 disposed on the substrate 512, and a stack of PVHs disposed on the alignment structure 514.

The stack of PVHs may be any disclosed stack of PVHs, such as that shown in FIG. 3A, FIG. 3B, FIG. 3C, or a combination thereof. The stack of PVHs may include at least one primary PVH layer and at least one secondary PVH layer. For illustrative purposes, FIG. 5A shows that the stack of PVHs includes a first PVH (or a primary PVH layer) 505 and a second PVH (or a secondary PVH layer) 510, which may be the same as or similar to the primary PVH layer 305 and the secondary PVH layer 310 shown in FIG. 3A, respectively. For example, as shown in FIG. 5A, the primary PVH layer 505 may be configured to have a relatively large thickness, and the secondary PVH layer 510 may be configured to have a relatively small thickness. The thickness of the secondary PVH layer 510 may be significantly smaller than the thickness of the primary PVH layer 505. A ratio between the thickness of the secondary PVH layer 510 and the thickness of the primary PVH layer 505 may be less than a predetermined percentage, for example, 5%, 10%, 15%, 20%, 25%, 30%, 35%, 40%, 45%, or 50%.

In some embodiments, the in-plane pitches $P_{in}$ of the primary PVH layer 505 and the secondary PVH layer 510 may be configured to be substantially the same, and the vertical pitch $P_v$ of the secondary PVH layer 510 may be configured to be about half of the vertical pitch $P_v$ of the primary PVH layer 505. The slant angle $\alpha$ of a PVH is defined as $\alpha = 90° - \beta$, where $\beta = \arctan(P_v/P_{in})$. The slant angle $\alpha$ of the primary PVH layer 505 may be configured to be smaller than the slant angle $\alpha$ of the secondary PVH layer 510. The primary PVH layer 505 may diffract a visible polychromatic light 502 from a real world environment. The diffraction by the primary PVH layer 505 may have a rainbow effect, causing a multicolored glare in a real-world image viewed by a user through the primary PVH layer 505. The secondary PVH layer 510 may be configured to suppress undesirable diffraction orders of the visible light 502 generated by the diffraction of the primary PVH layer 505, such that the rainbow effect caused by the primary PVH layer 505 may be reduced or suppressed. For example, the secondary PVH layer 510 may be configured to suppress high diffraction orders of the visible light 502 generated by the diffraction of the primary PVH layer 505, e.g., diffraction orders higher than a predetermined diffraction order. In some embodiments, each of the primary PVH layer 505 and the secondary PVH layer 510 may include a birefringent film that includes polymerized (or cross-linked) LCs, polymer-stabilized LCs, or a combination thereof. The LCs may include nematic LCs, twist-bend LCs, chiral nematic LCs, smectic LCs, or a combination thereof. Optically anisotropic molecules of the birefringent film may be arranged in a suitable 3D orientation pattern, such as that shown in FIG. 1B or FIG. 1C. Although the primary PVH layer 505 and the secondary PVH layer 510 are shown as having flat shapes for illustrative purposes, the primary PVH layer 505 and/or the secondary PVH layer 510 may have curved shapes.

The substrate 512 may be configured to provide support and/or protection to various layers, films, and/or structures disposed at (e.g., on or between) the substrate 512. In some embodiments, the substrate 512 may be optically transparent (e.g., having a light transmittance of at least about 60% or more) in at least a visible spectrum (e.g., wavelength ranging from about 580 nm to about 700 nm). In some embodiments, the substrate 512 may also be transparent in at least a portion of the infrared ("IR") spectrum (e.g., wavelength ranging from about 700 nm to about 1 mm). In some embodiments, the substrate 512 may include a suitable material that is substantially transparent to light beams of the above-listed wavelength ranges, such as, a glass, a plastic, a sapphire, a polymer, a semiconductor, or a combination thereof, etc. The substrate 512 may be rigid, semi-rigid, flexible, or semi-flexible. In some embodiments, the substrate 512 may have one or more surfaces in a flat, a convex, a concave, an asphere, or a freeform shape. In some embodiments, the substrate 512 may be a part of another optical element or device, or a part of another opto-electrical element or device. For example, the substrate 512 may be a solid optical lens or a part of a solid optical lens, a light guide (or waveguide), or a part of a functional device (e.g., a display screen). In some embodiments, the substrate 512 may be a conventional lens, e.g., a glass lens. Although one substrate 512 is shown in FIG. 5A, in some embodiments, the optical device 500 may include two substrates 512 sandwiching the primary PVH layer 505 and the secondary PVH layer 510. In some embodiments, each substrate 512 may be disposed with an alignment structure 514.

The alignment structure 514 may be any suitable alignment structure. For example, the alignment structure 514 may include a polyimide layer, a photo-alignment material ("PAM") layer, a plurality of nanostructures or microstructures, an alignment network, or a combination thereof. For example, in some embodiments, the alignment structure 514 may include a PAM layer. In some embodiments, the alignment structure 514 may include a polymer layer with anisotropic nano-imprints. In some embodiments, the alignment structure 514 may include a polymer layer with anisotropic nano-imprints. In some embodiments, the alignment structure 514 may include a plurality of microstructures or nanostructures, disposed with or without additional alignment materials (e.g., polyimides). In some embodiments, the alignment structure 514 may include a ferroelectric or ferromagnetic material configured to provide a surface alignment in a presence of a magnetic field or an electric field.

The secondary PVH layer 510 may have a first surface 510-1 and a second surface 510-2 facing the first surface 510-1. In some embodiments, the first surface 510-1 may also be an interface between the secondary PVH layer 510 and the alignment structure 514, and the second surface 510-2 may also be an interface between the primary PVH layer 505 and the secondary PVH layer 510. The primary PVH layer 505 may be disposed at the second surface 510-2 of the secondary PVH layer 510. In some embodiments, the alignment structure 514 may be configured to provide a surface alignment (e.g., a planar surface alignment) to the optically anisotropic molecules of the secondary PVH layer 510, and at least partially align the optically anisotropic molecules of the secondary PVH layer 510 in a spatially varying alignment pattern, e.g., a periodic alignment pattern. For example, the optically anisotropic molecules located in close proximity to (including those at) the interface between the secondary PVH layer 510 and the alignment structure 514 (e.g., the first surface 510-1 of the secondary PVH layer 510) may be aligned by the alignment structure 514, such that the directors of the optically anisotropic molecules may rotate continuously and periodically in a predetermined direction. The directors of the optically anisotropic molecules within the volume of the secondary PVH layer 510 that are disposed over the optically anisotropic molecules located in close proximity to or at the interface between the secondary PVH layer 510 and the alignment structure 514 may twist in a helical fashion along a direction of the helical axes.

In some embodiments, the secondary PVH layer 510 may be configured to provide a surface alignment (e.g., a planar surface alignment) to the optically anisotropic molecules of the primary PVH layer 505. For example, the secondary PVH layer 510 may at least partially align the optically anisotropic molecules of the primary PVH layer 505 in a spatially varying alignment pattern, e.g., a periodic alignment pattern. For example, the optically anisotropic molecules located in close proximity to (including those at) the interface between the primary PVH layer 505 and the secondary PVH layer 510 (e.g., the second surface 510-2 of the secondary PVH layer 510) may be aligned by the secondary PVH layer 510, such that the directors of the optically anisotropic molecules of the primary PVH layer 505 may rotate continuously and periodically in a predetermined direction. The directors of the optically anisotropic molecules within the volume of the primary PVH layer 505 that are disposed over the optically anisotropic molecules located in close proximity to or at the interface between the primary PVH layer 505 and the secondary PVH layer 510 may twist in a helical fashion along a direction of the helical axes.

In some embodiments, the alignment structure 514 may be a first alignment structure configured to provide a first spatially varying alignment pattern, e.g., a first periodic alignment pattern with a uniform first in-plane pitch. The optical device 500 may include a second alignment structure disposed between the primary PVH layer 505 and the secondary PVH layer 510. The second alignment structure may be configured to provide a second spatially varying alignment pattern, e.g., a second periodic alignment pattern with a uniform second in-plane pitch, to the primary PVH layer 505. In some embodiments, the first spatially varying alignment pattern provided by the first alignment structure 514 may be substantially the same as the second spatially varying alignment pattern provided by the second alignment structure.

In some embodiments, the substrate 512 and/or the alignment structure 514 may be used to fabricate, store, or transport the optical device 500. In some embodiments, the substrate 512 and/or the alignment structure 514 may be detachable or removable from other portions of the optical device 500 after the other portions of the optical device 500 are fabricated or transported to another place or device. For example, the substrate 512 may be used in fabrication, transportation, and/or storage to support the alignment structure 514 and the stack of PVHs (including, e.g., the primary PVH layer 505 and the secondary PVH layer 510) provided on the substrate 512, and may be separated or removed from the alignment structure 514 and the PVHs (e.g., the primary PVH layer 505 and the secondary PVH layer 510) when the fabrication of the optical device 500 is completed, or when the optical device 500 is to be implemented in another optical device or an optical system. The alignment structure 514 may be used in fabrication, transportation, and/or storage to support the stack of PVHs (including, e.g., the primary PVH layer 505 and the secondary PVH layer 510) provided on the alignment structure 514, and may be separated or removed from the stack of PVHs (e.g., the primary PVH layer 505 and the secondary PVH layer 510) when the fabrication of the optical device 500 is completed, or when the optical device 500 is to be implemented in another optical device or an optical system.

Figure 5B:
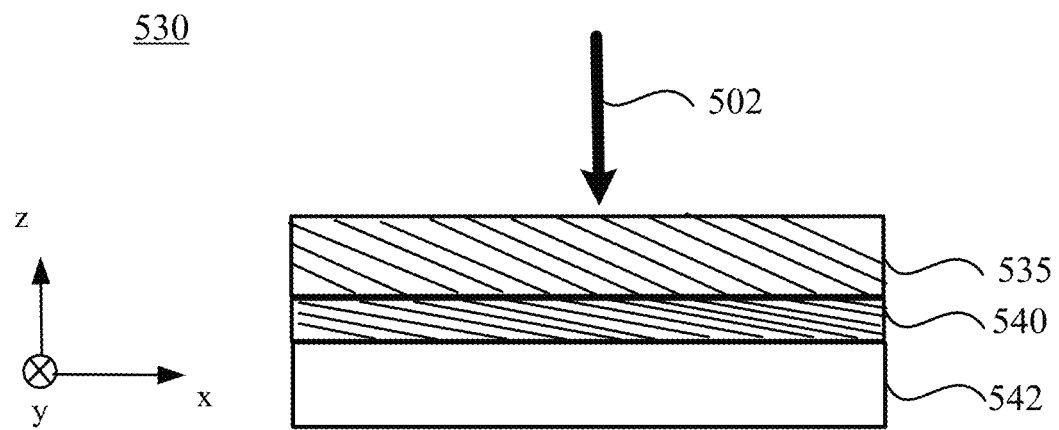
FIG. 5B illustrates a schematic diagram of an optical device for suppressing a rainbow effect, according to another embodiment of the present disclosure.

FIG. 5B illustrates a schematic diagram of an optical device (or optical element) 530 including multiple layers for suppressing a rainbow effect, according to another embodiment of the present disclosure. The optical device 530 may be a multi-layer PVH. The optical device 530 may be a passive optical device. The optical device 530 shown in FIG. 5B may include elements that are the same as or similar to those included in the optical device 300 shown in FIG. 3A, the optical device 330 shown in FIG. 3B, the optical device 350 shown in FIG. 3C, and/or the optical device 500 shown in FIG. 5A. Detailed descriptions of the same or similar elements may refer to the above descriptions rendered in connection with FIGS. 3A-3C and FIG. 5A. As shown in FIG. 5B, the optical device 530 may include a substrate 542 and a stack of PVHs disposed on the substrate 542. An alignment structure may be omitted in the optical device 530.

The stack of PVHs may be any disclosed stack of PVHs, such as that shown in FIG. 3A, FIG. 3B, or FIG. 3C. The stack of PVHs may include at least one primary PVH layer and at least one secondary PVH layer. For illustrative purposes, FIG. 5B shows the stack of PVHs includes a first PVH (or a primary PVH layer) 535 and a second PVH (or a secondary PVH layer) 540, which may be the same or similar to the primary PVH layer 305 and secondary PVH layer 310 shown in FIG. 3A. For example, as shown in FIG. 5B, the primary PVH layer 535 may be configured to have a relatively large thickness, and the secondary PVH layer 540 may be configured to have a relatively small thickness. The thickness of the secondary PVH layer 540 may be significantly smaller than the thickness of the primary PVH layer 535. A ratio between the thickness of the secondary PVH layer 540 and the thickness of the primary PVH layer 535 may be less than a predetermined percentage, for example, about 5%, 10%, 15%, 20%, 25%, 30%, 35%, 40%, 45%, or 50%.

In some embodiments, the in-plane pitches $P_{in}$ of the primary PVH layer 535 and the secondary PVH layer 540 may be configured to be substantially the same, and the vertical pitch $P_v$ of the secondary PVH layer 540 may be configured to be about half of the vertical pitch $P_v$ of the primary PVH layer 535. The slant angle α of a PVH is defined as $α=90°-β$, where $β=\arctan(P_v/P_{in})$. The slant angle α of the primary PVH layer 535 may be configured to be smaller than the slant angle α of the secondary PVH layer 540. The primary PVH layer 535 may diffract the visible polychromatic light 502 from a real world environment. The diffraction by the primary PVH layer 535 may have a rainbow effect, causing a multicolored glare in a real-world image viewed by a user through the primary PVH layer 535. The secondary PVH layer 540 may be configured to suppress undesirable diffraction orders of the visible light 502 caused by the diffraction of the primary PVH layer 535, such that the rainbow effect caused by the primary PVH layer 535 may be reduced. For example, the secondary PVH layer 540 may be configured to suppress high diffraction orders of the visible light 502 caused by the diffraction of primary PVH layer 535, e.g., diffraction orders higher than a predetermined diffraction order. In some embodiments, each of the primary PVH layer 535 and the secondary PVH layer 540 may include a birefringent film that includes photopolymers (e.g., amorphous polymers, liquid crystal ("LC") polymers, etc.). Optically anisotropic molecules of the birefringent film may be arranged in a suitable 3D orientation pattern, such as that shown in FIG. 1D. Although the primary PVH layer 535 and the secondary PVH layer 540 are shown as having flat shapes for illustrative purposes, the primary PVH layer 535 and/or the secondary PVH layer 540 may have curved shapes.

For illustrative purposes, FIG. 5B shows that the secondary PVH layer 540 may be disposed between the primary PVH layer 535 and the substrate 542. The substrate 542 may be similar to the substrate 512 shown in FIG. 5A. In some embodiments, the substrate 542 may be used to fabricate, store, or transport the optical device 530. In some embodiments, the substrate 542 may be detachable or removable from other portions of the optical device 530 after the other portions of the optical device 530 are fabricated or transported to another place or device. For example, the substrate 542 may be used in fabrication, transportation, and/or storage to support the stack of PVHs (including, e.g., the primary PVH layer 535 and the secondary PVH layer 540) provided on the substrate 542, and may be separated or removed from the PVHs (e.g., the primary PVH layer 535 and the secondary PVH layer 540) when the fabrication of the optical device 530 is completed, or when the optical device 530 is to be implemented in another optical device or an optical system.

Figure 5C:
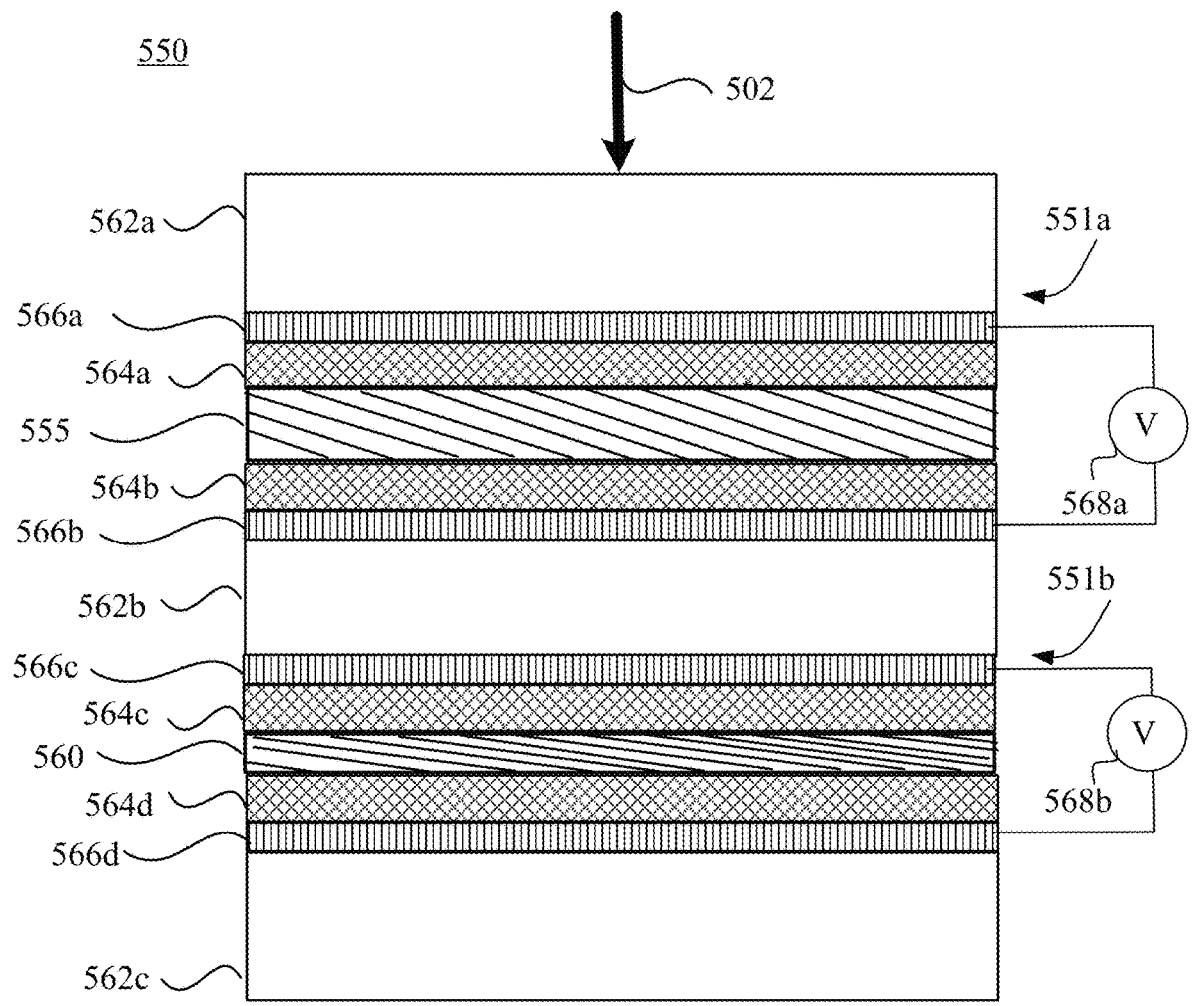
FIG. 5C illustrates a schematic diagram of an optical device for suppressing a rainbow effect, according to another embodiment of the present disclosure.

FIG. 5C illustrates a schematic diagram of an optical device (or optical element) 550 including multiple layers for suppressing a rainbow effect, according to another embodiment of the present disclosure. The optical device 550 may be a multi-layer PVH. The optical device 550 may be an active optical device. The optical device 550 shown in FIG. 5C may include elements that are the same as or similar to those included in the optical device 300 shown in FIG. 3A, the optical device 330 shown in FIG. 3B, the optical device 350 shown in FIG. 3C, the optical device 500 shown in FIG. 5A, and/or the optical device 530 shown in FIG. 5B. Detailed descriptions of the same or similar elements may refer to the above descriptions rendered in connection with FIGS. 3A-3C and FIGS. 5A and 5B.

As shown in FIG. 5C, the optical device 550 may include a plurality of LC cells stacked together, e.g., a first LC cell 551a and a second LC cell 551b. In some embodiments, each LC cell 551a or 551b may include two substrates, and a PVH layer disposed between the two substrates. At least one of the two substrates may be provided with one or more conductive electrode layers and an alignment structure. For example, as shown in FIG. 5C, the first LC cell 551a may include two substrates 562a and 562b, and a first PVH (or a primary PVH layer) 555 disposed between the two substrates 562a and 562b. The substrate 562a may be disposed with a conductive electrode layer 566a and an alignment structure 564a. The substrate 562b may have a first surface facing the primary PVH layer 555 and a second surface opposing the first surface. The first surface of the substrate 562b may be disposed with a conductive electrode layer 566b and an alignment structure 564b. The conductive electrode layer 566a or 566b may be transmissive and/or reflective at least in the same spectrum band as the substrate 562a or 562b. The conductive electrode layer 566a or 566b may be a planar continuous electrode layer or a patterned electrode layer. The conductive electrode layers 566a and 566b may be electrically coupled with a power source 568a to apply a driving voltage to the primary PVH layer 555. In some embodiments, the conductive electrode layers 566a and 566b may be disposed at the same substrate 562a or 562b.

The alignment structure 564a or 564b may be similar to or the same as the alignment structure 514 shown in FIG. 5A. The alignment structures 564a and 564b disposed at the substrates 562a and 562b may be configured to provide parallel surface alignments or anti-parallel surface alignments. In some embodiments, the alignment structures 564a and 564b may be configured to provide hybrid surface alignments. For example, one of the alignment structures 564a and 564b may be configured to provide a planar alignment (or an alignment with a small pretilt angle), and the other may be configured to provide a homeotropic alignment. In some embodiments, one of the alignment structures 564a and 564b may be omitted.

The second LC cell 551b may include elements that are the same as or similar to those included in the first LC cell 551a. For example, the second LC cell 551b may include two substrates 562b and 562c, and a second PVH (or a secondary PVH layer) 560 disposed between the two substrates 562b and 562c. The substrate 562c may be disposed with a conductive electrode layer 566d and an alignment structure 564d. The second surface of the substrate 562b may be disposed with a conductive electrode layer 566c and an alignment structure 564c. The conductive electrode layer 566c or 566d may be similar to the conductive electrode layer 566a or 566b in the first LC cell 551a. The conductive electrode layers 566c and 566d may be electrically coupled with a power source 568b to apply a driving voltage to the secondary PVH layer 560. Although the primary PVH layer 555 and the secondary PVH layer 560 are shown as having flat shapes for illustrative purposes, the primary PVH layer 555 and/or the secondary PVH layer 560 may have curved shapes.

In some embodiments, each of the primary PVH layer 555 and the secondary PVH layer 560 may include a birefringent film (or medium layer) that includes active LCs, in which LC molecules may be reorientable by an external field, e.g., an external field. At a voltage-off state (or when a driving voltage applied to the primary PVH layer 555 or the secondary PVH layer 560 is lower than a first predetermined voltage, e.g., a threshold voltage to reorient the LC molecules), the LC molecules of the birefringent film may be arranged in a suitable 3D orientation pattern, such as that shown in FIG. 1B or FIG. 1C. The primary PVH layer 555 may be configured to have a relatively large thickness, and the secondary PVH layer 560 may be configured to have a relatively small thickness. The thickness of the secondary PVH layer 560 may be significantly smaller than the thickness of the primary PVH layer 555. A ratio between the thickness of the secondary PVH layer 560 and the thickness of the primary PVH layer 555 may be less than a predetermined percentage, for example, about 5%, 10%, 15%, 20%, 25%, 30%, 35%, 40%, 45%, or 50%.

In some embodiments, initial in-plane pitches $P_{in}$ of the primary PVH layer 555 and the secondary PVH layer 560 may be configured to be substantially the same. An initial vertical pitch $P_v$ of the secondary PVH layer 560 may be configured to be about half of an initial vertical pitch $P_v$ of the primary PVH layer 555. The slant angle $\alpha$ of a PVH is defined as $\alpha=90°-\beta$, where $\beta=\arctan(P_v/P_{in})$. An initial slant angle $\alpha$ of the primary PVH layer 555 may be configured to be smaller than an initial slant angle $\alpha$ of the secondary PVH layer 560. At the voltage-off state, the primary PVH layer 555 may diffract a visible polychromatic light 502 from a real world environment. The diffraction may have a rainbow effect, causing a multicolored glare in a real-world image viewed by a user through the primary PVH layer 555. The secondary PVH layer 560 may be configured to suppress undesirable diffraction orders of the visible light 502 caused by the diffraction of the primary PVH layer 555, such that the rainbow effect caused by the diffraction of the primary PVH layer 555 may be reduced. For example, the secondary PVH layer 560 may be configured to suppress high diffraction orders of the visible light 502 caused by the diffraction of the primary PVH layer 555, e.g., diffraction orders higher than a predetermined diffraction order.

At a voltage-on state, when a driving voltage higher than the first predetermined voltage is supplied to the primary PVH layer 555 or the secondary PVH layer 560, the in-plane pitch $P_{in}$ and/or the vertical pitch $P_v$ of the primary PVH layer 555 or the secondary PVH layer 560 may vary with the driving voltage. In some embodiments, the driving voltage provided by the power source 568a to the primary PVH layer 555 and the driving voltage provided by the power source 568b to the secondary PVH layer 560 may be individually controllable, e.g., by a controller (not shown in FIG. 5C), such that at the voltage-on state, the in-plane pitches $P_{in}$ of the primary PVH layer 555 and the secondary PVH layer 560 may be configured to be substantially the same, and/or the vertical pitch $P_v$ of the secondary PVH layer 560 may be configured to be about half of the vertical pitch $P_v$ of the primary PVH layer 555. In some embodiments, the driving voltage provided by the power source 568b to the secondary PVH layer 560 may be adjusted by the controller according to the driving voltage provided by the power source 568a to the primary PVH layer 555. For example, when the driving voltage provided by the power source 568a is supplied to the primary PVH layer 555, the in-plane pitch $P_{in}$ and/or the vertical pitch $P_v$ of the primary PVH layer 555 may vary with the driving voltage. The driving voltage provided by the power source 568b to the secondary PVH layer 560 may be adjusted by the controller to adjust the in-plane pitch $P_{in}$ of the secondary PVH layer 560 to be substantially the same as the in-plane pitches $P_{in}$ of the primary PVH layer 555, and/or adjust the vertical pitch $P_v$ of the secondary PVH layer 560 to be about half of the vertical pitch $P_v$ of the primary PVH layer 555. Thus, at the voltage-on state, when the primary PVH layer 555 diffracts the visible polychromatic light 502 from the real world environment, which causes the rainbow effect, the secondary PVH layer 560 may be configured to suppress undesirable diffraction orders of the visible light 502 caused by diffraction of the primary PVH layer 555, such that the rainbow effect caused by the diffraction of the primary PVH layer 555 may be reduced. For example, the primary PVH layer 555 may be configured to diffract the visible polychromatic light 502 from a real world environment as a first light including a first number of diffraction orders. In some embodiments, the secondary PVH layer 560 may be configured to diffract the first light received from the primary PVH layer 555 as a second light including a second number of diffraction orders. In some embodiments, the first number of diffraction orders is greater than the second number of diffraction orders.

Although two PVH layers 555 and 560 (each being a birefringent medium layer) are shown in FIG. 5C for illustrative purposes, the multi-layer PVH 550 may include additional PVH layers, such as a third PVH layer, a fourth PVH layer, etc. The additional PVH layers may include a primary PVH layer or a secondary PVH layer. The third PVH layer may include a third birefringent medium layer with orientations of directors of third optically anisotropic molecules spatially varying with a third in-plane pitch and a third vertical pitch. The fourth PVH layer may include a fourth birefringent medium layer with orientations of directors of fourth optically anisotropic molecules spatially varying with a fourth in-plane pitch and a fourth vertical pitch. The third in-plane pitch may be substantially the same as the fourth in-plane pitch, and the fourth vertical pitch may be about half of the third vertical pitch. A ratio between a thickness of the fourth birefringent medium layer and a thickness of the third birefringent medium layer may be less than a predetermined percentage. The third in-plane pitch may be substantially the same as or different from the first in-plane pitch, and the third vertical pitch may be substantially the same as or different from the first vertical pitch.

Multi-layer PVHs disclosed herein have various applications in a number of technical fields. Some exemplary applications in augmented reality ("AR"), virtual reality ("VR"), and mixed reality ("MR") fields or some combinations thereof will be explained below. Near-eye displays ("NEDs") have been widely used in a wide variety of applications, such as aviation, engineering, scientific research, medical devices, computer games, videos, sports, training, and simulations. NEDs can function as a VR device, an AR device, and/or an MR device. When functioning as AR and/or MR devices, NEDs are at least partially transparent from the perspective of a user, enabling the user to view a surrounding real world environment. Such NEDs are also referred to as optically see-through NEDs. When functioning as VR devices, NEDs are opaque such that the user is substantially immersed in the VR imagery provided via the NEDs. An NED may be switchable between functioning as an optically see-through device and functioning as a VR device.

Pupil-replication (or pupil-expansion) light guide display systems with diffractive coupling structures have been implemented in NEDs, which can potentially offer eyeglasses form factors, a moderately large field of view ("FOV"), a high transmittance, and a large eyebox. A pupil-replication light guide display system may include a display element (e.g., an electronic display) configured to generate an image light, and a light guide (or a waveguide) configured to guide the image light to an eyebox provided by the light guide display system. Diffraction gratings may be coupled with the light guide as in-coupling and out-coupling diffractive elements. The light guide may also function as an AR and/or MR combiner to combine the image light and a light from the real world environment, such that virtual images generated by the display element may be superimposed with real-world images or see-through images. In a pupil-replication light guide display system, the light guide coupled with the in-coupling and out-coupling diffractive elements may expand the exit pupil along a light propagating direction of a light propagating inside the light guide.

Figure 6:
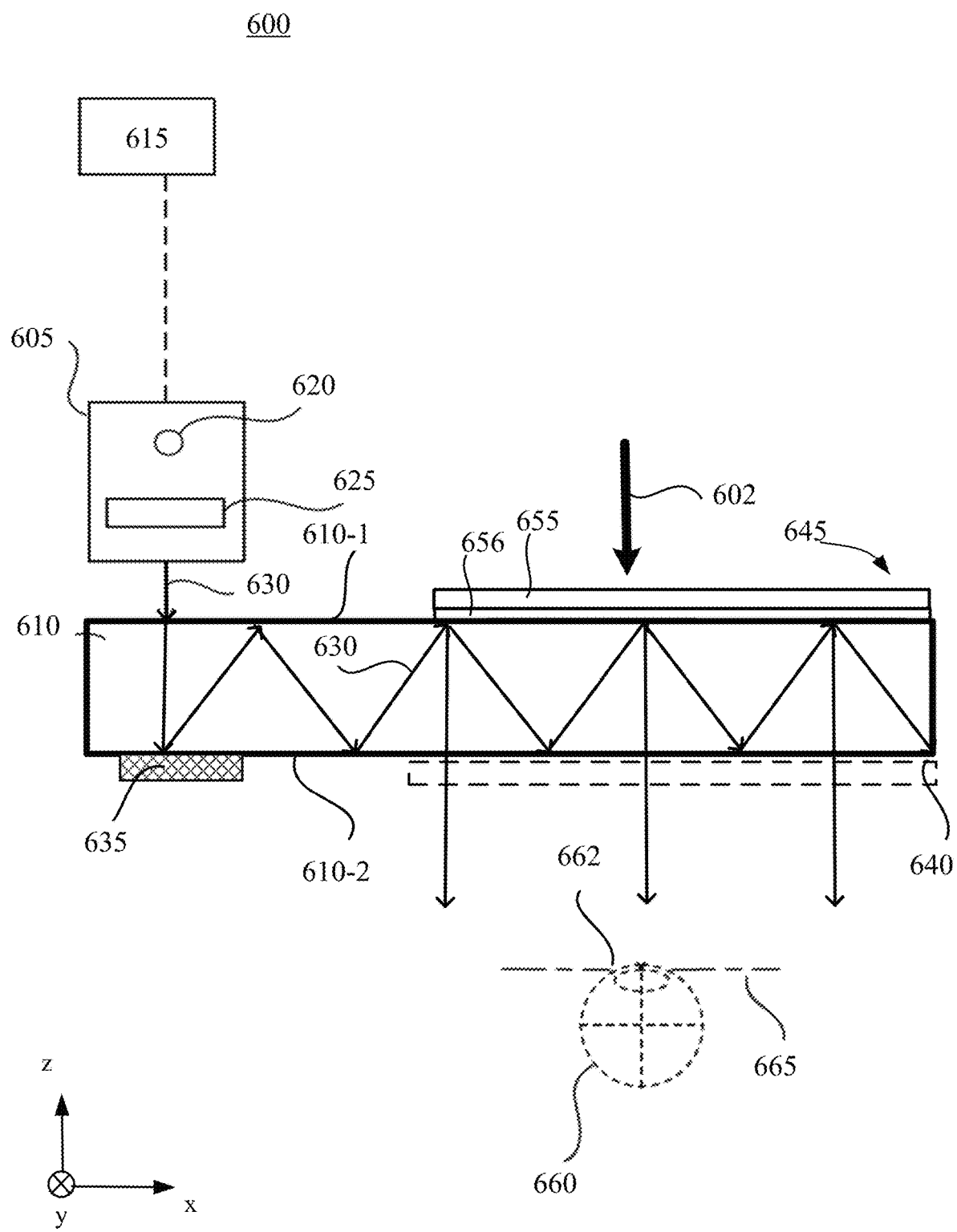
FIG. 6 illustrates a schematic diagram of a light guide display system, according to an embodiment of the present disclosure.

FIG. 6 illustrates a schematic diagram of a light guide (or waveguide) display system 600, according to an embodiment of the present disclosure. The light guide display system 600 may provide pupil-replication (or pupil-expansion). The light guide display system 600 may be implemented in NEDs for VR, AR, and/or MR applications. The light guide display system 600 may include one or more disclosed multi-layer PVHs. As shown in FIG. 6, the light guide display system 600 may include a light source assembly 605, a light guide 610, and a controller 615. The controller 615 may be configured to perform various controls, adjustments, or other functions or processes described herein. The light source assembly 605 may include a light source 620 and an light conditioning system 625. In some embodiments, the light source 620 may be a light source configured to generate a coherent or partially coherent light. The light source 620 may include, e.g., a laser diode, a vertical cavity surface emitting laser, a light emitting diode, or a combination thereof. In some embodiments, the light source 620 may be a display panel, such as a liquid crystal display ("LCD") panel, an liquid-crystal-on-silicon ("LCoS") display panel, an organic light-emitting diode ("OLED") display panel, a micro light-emitting diode ("micro-LED") display panel, a digital light processing ("DLP") display panel, a laser scanning display panel, or a combination thereof. In some embodiments, the light source 620 may be a self-emissive panel, such as an OLED display panel or a micro-LED display panel. In some embodiments, the light source 620 may be a display panel that is illuminated by an external source, such as an LCD panel, an LCoS display panel, or a DLP display panel. Examples of an external source may include a laser, an LED, an OLED, or a combination thereof. The light conditioning system 625 may include one or more optical components configured to condition the light from the light source 620. For example, the controller 615 may control the light conditioning system 625 to condition the light from the light source 620, which may include, e.g., transmitting, attenuating, expanding, collimating, and/or adjusting orientation of the light.

The light source assembly 605 may generate an image light 630 and output the image light 630 to an in-coupling element 635 disposed at a first portion of the light guide 610. The light guide 610 may expand and direct the image light 630 to an eye 660 positioned in an eye-box 665 of the light guide display system 600. An exit pupil 662 may be a location where the eye 660 is positioned in the eye-box 165. The light guide 610 may receive the image light 630 at the in-coupling element 635 located at the first portion of the light guide 610. The image light 630 may propagate (e.g., through total internal reflection ("TIR")) inside the light guide 610 toward an out-coupling element 645 located at a second portion of the light guide 610. The first portion and the second portion may be located at different portions of the light guide 610. The out-coupling element 645 may be configured to couple the image light 630 out of the light guide 610 toward the eye 660. In some embodiments, the in-coupling element 635 may couple the image light 630 into a TIR path inside the light guide 610. The image light 630 may propagate inside the light guide 610 through TIR along the TIR path.

The light guide 610 may include a first surface or side 610-1 facing the real-world environment and an opposing second surface or side 610-2 facing the eye 660. In some embodiments, as shown in FIG. 6, the in-coupling element 635 may be disposed at the second surface 610-2 of the light guide 610. In some embodiments, the in-coupling element 635 may be integrally formed as a part of the light guide 610 at the second surface 610-2. In some embodiments, the in-coupling element 635 may be separately formed, and may be disposed at (e.g., affixed to) the second surface 610-2 of the light guide 610. In some embodiments, the in-coupling element 635 may be disposed at the first surface 610-1 of the light guide 610. In some embodiments, the in-coupling element 635 may be integrally formed as a part of the light guide 610 at the first surface 610-1. In some embodiments, the in-coupling element 635 may be separately formed and disposed at (e.g., affixed to) the first surface 610-1 of the light guide 610. In some embodiments, the in-coupling element 635 may include one or more diffraction gratings, one or more cascaded reflectors, one or more prismatic surface elements, and/or an array of holographic reflectors, or any combination thereof. In some embodiments, the in-coupling element 635 may include one or more diffraction gratings, such as a surface relief grating, a volume hologram, a polarization selective grating, a polarization volume hologram, a metasurface grating, another type of diffractive element, or any combination thereof. A period of the diffraction grating may be configured to enable total internal reflection ("TIR") of the image light 630 within the light guide 610. As a result, the image light 630 may propagate internally within the light guide 610 through TIR. In some embodiments, the in-coupling element 635 may include a PVH disclosed herein.

The out-coupling element 645 may be disposed at the first surface 610-1 or the second surface 610-2 of the light guide 610. For example, as shown in FIG. 6, the out-coupling element 645 may be disposed at the first surface 610-1 of the light guide 610. In some embodiments, the out-coupling element 645 may be integrally formed as a part of the light guide 610, for example, at the first surface 610-1. In some embodiments, the out-coupling element 645 may be separately formed and dispose at (e.g., affixed to) the first surface 610-1 of the light guide 610. In some embodiments, the out-coupling element 645 may be disposed at the second surface 610-2 of the light guide 610. For example, in some embodiments, the out-coupling element 645 may be integrally formed as a part of the light guide 610 at the second surface 610-2. In some embodiments, the out-coupling element 645 may be separately formed and disposed at (e.g., affixed to) the second surface 610-2 of the light guide 610. In some embodiments, the out-coupling element 645 may include one or more diffraction gratings, one or more cascaded reflectors, one or more prismatic surface elements, and/or an array of holographic reflectors, or any combination thereof. In some embodiments, the out-coupling element 645 may include one or more diffraction gratings, such as a surface relief grating, a volume hologram, a polarization selective grating, a polarization volume hologram ("PVH"), a metasurface grating, another type of diffractive element, or any combination thereof. A period of the diffraction grating may be configured to cause the incident image light 630 to exit the light guide 610, i.e., redirecting the image light 630 so that the TIR no longer occurs. In other words, the diffraction grating of the out-coupling element 645 may couple the image light 630 that has been propagated inside the light guide 610 through TIR out of the light guide 610 via diffraction. In some embodiments, the out-coupling element 645 may also be referred to as an out-coupling grating 645.

In some embodiments, the out-coupling element 645 may include a multi-layer PVH disclosed herein, such as the multi-layer PVH 300 shown in FIG. 3A, the multi-layer PVH 330 shown in FIG. 5B, the multi-layer PVH 350 shown in FIG. 3C, the multi-layer PVH 500 shown in FIG. 5A, the multi-layer PVH 530 shown in FIG. 5B, or the multi-layer PVH 550 shown in FIG. 5C. In some embodiments, the light guide 610 may function as a substrate of the multi-layer PVH disclosed herein. For illustrative purposes, FIG. 6 shows that the out-coupling element 645 may include a disclosed multi-layer PVH that includes a primary PVH layer 655 and a secondary PVH layer 656 stacked together. In the embodiment shown in FIG. 6, the out-coupling element 645 is disposed on the first surface 610-1 of the light guide 610, and the secondary PVH layer 656 is disposed between the primary PVH layer 655 and the light guide 610. Although not shown, in some embodiments, the primary PVH layer 655 may be disposed between the secondary PVH layer 656 and the light guide 610. For example, when the out-coupling element 645 is disposed on the second surface 610-2 of the light guide 610, the primary PVH layer 655 may be disposed between the secondary PVH layer 656 and the light guide 610. When the light guide 610 coupled with the in-coupling element 635 and the out-coupling element 645 functions as an AR or MR combiner, the light guide 610 may combine the image light 630 representing a virtual image and a visible polychromatic light 602 from the real world environment, such that the virtual image generated by the light source assembly 605 may be superimposed with real-world images or see-through images. The out-coupling element 645 including a multi-layer PVH disclosed herein may be configured to diffract the visible polychromatic light 602 with a reduced rainbow effect, such that that the image quality of the see-through views may be significantly improved.

As discussed above, a conventional light guide display system may diffract a visible polychromatic light coming from a real world environment due to the diffractive structures, causing a rainbow effect in a see-through view especially when the user wearing the NED looks at a bright light source from certain angles. Such see-through artifacts may degrade the image quality of the see-through views. In the present disclosure, through using a multi-layer PVH disclosed herein as the out-coupling element 645, the rainbow effect caused by the diffraction of the visible polychromatic light 702 in the see-through views may be significantly reduced, such that that the image quality of the see-through views may be significantly improved.

The light guide 610 may include one or more materials configured to facilitate the total internal reflection of the image light 630. The light guide 610 may include, for example, a plastic, a glass, and/or polymers. The light guide 610 may have a relatively small form factor. For example, the light guide 610 may be approximately 50 mm wide along the x-dimension, 30 mm long along the y-dimension, and 0.5-1 mm thick along the z-dimension. The controller 615 may be communicatively coupled with the light source assembly 605, and may control the operations of the light source assembly 605. In some embodiments, the light guide 610 may output the expanded image light 630 to the eye 660 with an increased or expanded field of view ("FOV"). For example, the expanded image light 630 may be provided to the eye 660 with a diagonal FOV (in x and y) of equal to or greater than 60 degrees and equal to or less than 150 degrees. The light guide 610 may be configured to provide an eye-box with a width of equal to or greater than 8 mm and equal to or less than 50 mm, and/or a height of equal to or greater than 6 mm and equal to or less than 60 mm. With the light guide display assembly 600, the physical display and electronics may be moved to a side of a front body of an NED, and a substantially fully unobstructed view of the real world environment may be achieved, which enhances the AR user experience.

In some embodiments, the light guide 610 may include additional elements configured to redirect, fold, and/or expand the pupil of the light source assembly 605. For example, as shown in FIG. 6, the light guide 610 may include a redirecting element 640 configured to redirect the received input image light 630 to the out-coupling element 645, such that the received input image light 630 is coupled out of the light guide 610 via the out-coupling element 645. In some embodiments, the redirecting element 640 may be arranged at a location of the light guide 610 opposing the location of the out-coupling element 645. In some embodiments, the redirecting element 640 may be disposed at the second surface 610-2 of the light guide 610. For example, in some embodiments, the redirecting element 640 may be integrally formed as a part of the light guide 610 at the second surface 610-2. In some embodiments, the redirecting element 640 may be separately formed and disposed at (e.g., affixed to) the second surface 610-2 of the light guide 610. In some embodiments, the redirecting element 640 may be disposed at the first surface 610-1 of the light guide 610. For example, in some embodiments, the redirecting element 640 may be integrally formed as a part of the light guide 610 at the first surface 610-1. In some embodiments, the redirecting element 640 may be separately formed and disposed at (e.g., affixed to) the first surface 610-1 of the light guide 610.

In some embodiments, the redirecting element 640 and the out-coupling element 645 may have a similar structure. In some embodiments, the redirecting element 640 may include one or more diffraction gratings, one or more cascaded reflectors, one or more prismatic surface elements, and/or an array of holographic reflectors, or any combination thereof. In some embodiments, the redirecting element 640 may include one or more diffraction gratings, such as a surface relief grating, a volume hologram, a polarization selective grating, a polarization volume hologram, a metasurface grating, another type of diffractive element, or any combination thereof. The redirecting element 640 may also be referred to as a folding grating 640 or a redirecting grating 640. In some embodiments, the redirecting element 640 may include a multi-layer PVH disclosed herein, such as the multi-layer PVH 300 shown in FIG. 3A, the multi-layer PVH 330 shown in FIG. 5B, the multi-layer PVH 350 shown in FIG. 3C, the multi-layer PVH 500 shown in FIG. 5A, the multi-layer PVH 530 shown in FIG. 5B, or the multi-layer PVH 550 shown in FIG. 5C. In some embodiments, the light guide 610 may function as a substrate of the multi-layer PVH disclosed herein. When the light guide 610 coupled with the in-coupling element 635 and the out-coupling element 645 functions as an AR or MR combiner, the light guide 610 may combine the image light 630 representing a virtual image and the light 602 from the real world environment, such that the virtual image generated by the light source assembly 605 may be superimposed with real-world images or see-through images. The redirecting element 640 including a multi-layer PVH disclosed herein may be configured to diffract the visible polychromatic light 602 received from the out-coupling element 645 with a reduced rainbow effect, such that that the image quality of the superimposed image may be significantly improved. In some embodiments, multiple functions, e.g., redirecting, folding, and/or expanding the pupil of the light generated by the light source assembly 605 may be combined into a single element, e.g. an out-coupling element.

In some embodiments, the light guide display system 600 may include a plurality of light guides 610 disposed in a stacked configuration (not shown in FIG. 6). At least one (e.g., each) of the plurality of light guides 610 may be coupled with or include one or more diffractive elements (e.g., in-coupling element, out-coupling element, and/or directing element), which may be configured to direct the image light 630 toward the eye 660. In some embodiments, the plurality of light guides 610 disposed in the stacked configuration may be configured to output an expanded polychromatic image light (e.g., a full-color image light). In some embodiments, the light guide display system 600 may include one or more light source assemblies 605 and/or one or more light guides 610. In some embodiments, at least one (e.g., each) of the light source assemblies 605 may be configured to emit a monochromatic image light of a specific wavelength band corresponding to a primary color (e.g., red, green, or blue) and a predetermined FOV (or a predetermined portion of an FOV). In some embodiments, the light guide display system 600 may include three different light guides 610 configured to deliver component color images (e.g., primary color images) by in-coupling and subsequently out-coupling, e.g., red, green, and blue lights, respectively, in any suitable order. In some embodiments, the light guide display assembly 600 may include two different light guides configured to deliver component color images (e.g., primary color images) by in-coupling and subsequently out-coupling, e.g., a combination of red and green lights, and a combination of green and blue lights, respectively, in any suitable order. In some embodiments, at least one (e.g., each) of the light source assemblies 605 may be configured to emit a polychromatic image light (e.g., a full-color image light). The relative positions of the eye 660 and the light source assembly 605 shown in FIG. 6 are for illustrative purposes, in some embodiments, the eye 660 and the light source assembly 605 may be disposed at the same side of the light guide 610.

Figure 7:
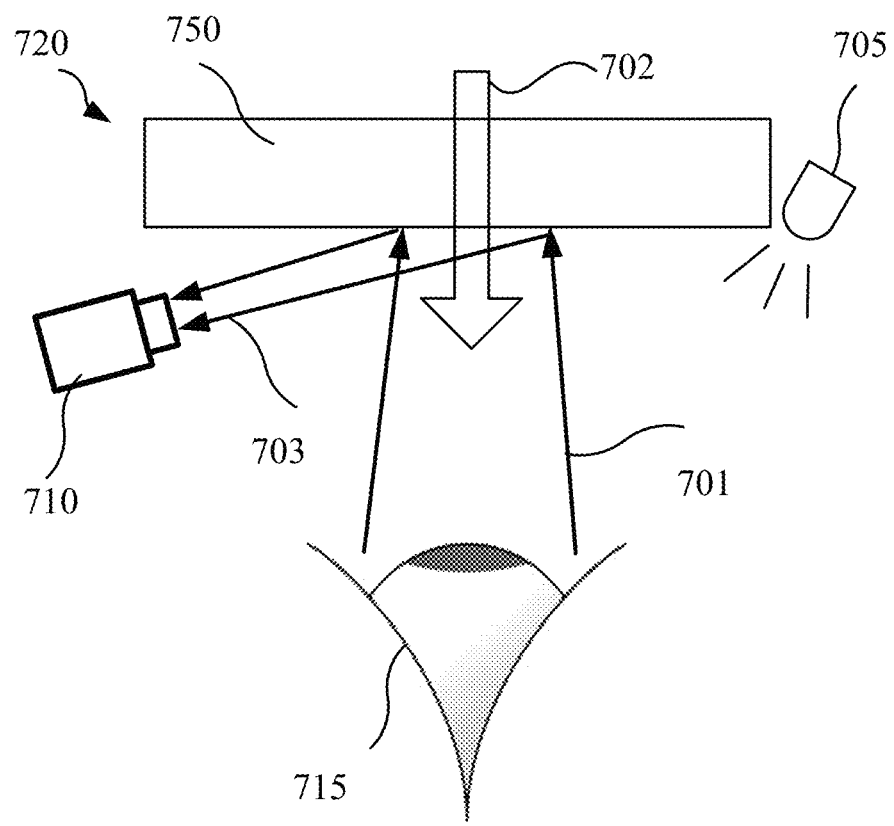
FIG. 7 illustrates a schematic diagram of an object-tracking system, according to an embodiment of the present disclosure.

FIG. 7 illustrates a schematic diagram of an object-tracking system 700, according to an embodiment of the present disclosure. In some embodiments, the object-tracking system 700 may be implemented in an NED. The object-tracking system 700 may generate images by utilizing lights emitted or reflected by a target or an object being tracked, such as the eye of a user. For discussion purpose, an eye-tracking system is used as an example of the object-tracking system in the following descriptions. The eye is used as an example of the object that is tracked. The eye-tracking system (or method) is described herein as an example of the object-tracking system (or method). It is understood that the object-tracking system 700 may be used to track a target or an object other than the eye of the user. In some embodiments, the eye-tracking system 700 may include a light source 705 configured to emit a light to illuminate one or two eyes 715 of a user. The light source 705 may be positioned out of a line of sight of the user (e.g., below the eye 715). FIG. 7 shows one eye 715 for illustrative purposes. It is understood that components for tracking the eye 715 may be replicated for tracking the other eye of the user, which are omitted in FIG. 7.

In some embodiments, the lights emitted by the light source 705 may include a narrow spectrum or a relatively broad spectrum, and one or more wavelengths of the lights may be in the infrared ("IR") spectrum, i.e., the spectrum of the light source 705 may be within, overlap, or encompass at least a portion of the IR spectrum. In some embodiments, the light source 705 may emit lights in the near infrared ("NIR") band or spectrum (about 750 nm to 1250 nm), or some other portion of the electromagnetic spectrum. NIR spectrum lights may be desirable in some applications because the NIR spectrum lights are not visible to the human eye and thus, do not distract the user wearing the NED during operations. The IR lights may be reflected by a pupil area, of the eye 715, the entire eye 715 of the user, an area near, such as above, below, left to, or right to, the eye 715 of the user, or an area including the eye 715 and the area near the eye 715, including the eye lid and/or the facial skins around the eye 715.

The eye-tracking system 700 may include a diffractive optical element 720 configured to direct the IR lights reflected by the eye 715 towards an optical sensor 710. The optical sensor 710 may be arranged facing the diffractive optical element 720. The optical sensor 710 may be configured to receive the IR lights directed by the diffractive optical element 720 and generate a signal or information based on the received lights for eye-tracking, such as an image of the eye 715. The optical sensor 710 may be sensible to lights having a wavelength within a spectrum that includes at least a portion of the IR spectrum. In some embodiments, the optical sensor 710 may be sensible to IR lights but not visible polychromatic lights. In some embodiments, the optical sensor 710 may include a camera, such as one or more of a charge-coupled device ("CCD") camera, a complementary metal-oxide-semiconductor ("CMOS") sensor, an N-type metal-oxide-semiconductor ("NMOS") sensor, a pixelated polarized camera, or any other suitable cameras.

In some embodiments, the optical sensor 710 may include a processor configured to process the IR lights, to generate an image of the eye 715, and/or to analyze the image of the eye 715 to obtain information that may be used for eye-tracking (e.g., eye-tracking information) and other operations, such as for determining what information to present to the user or the layout of the presentation of the information, etc. In some embodiments, the optical sensor 710 may also include a non-transitory computer-readable storage medium (e.g., a computer-readable memory) configured to store data, such as the generated images. In some embodiments, the non-transitory computer-readable storage medium may store codes or instructions that may be executable by the processor to perform various steps of any methods disclosed herein. In some embodiments, the processor and the non-transitory computer-readable medium may be provided separately from the optical sensor 710. For example, the eye-tracking system 700 may include a controller communicatively connected with the optical sensor 710 and configured to receive data from the optical sensor 710. The controller may include the processor and the non-transitory computer-readable storage medium. The controller may be configured to analyze the data (e.g., images of the eye 715) received from the optical sensor 710 to obtain information for eye-tracking or other purposes. In some embodiments, the eye-tracking system 700 may include other sensors, such as motion sensors, for acquiring sensor data relating to the eye for determining eye-tracking information. The eye-tracking information may be determined based on data acquired by the optical sensor 710, and/or the other sensors that may be included in the eye-tracking system 700.

In some embodiments, the diffractive optical element 720 may include a multi-layer PVH 750 disclosed herein, which may be an embodiment of the multi-layer PVH 300 shown in FIG. 3A, the multi-layer PVH 330 shown in FIG. 5B, the multi-layer PVH 350 shown in FIG. 3C, the multi-layer PVH 500 shown in FIG. 5A, the multi-layer PVH 530 shown in FIG. 5B, or the multi-layer PVH 550 shown in FIG. 5C. The multi-layer PVH 750 may be configured to diffract an IR light 701 reflected by the eye 715 (referred to as reflected light in the following descriptions) towards the optical sensor 710. For example, the reflected IR light 701 may be incident onto the multi-layer PVH 750 at various incidence angles, such as 0 degree (i.e., perpendicular to the surface of the multi-layer PVH 750), 30 degrees, 45 degrees, 60 degrees, 70 degrees, etc., and then diffracted by the multi-layer PVH 750 as a diffracted IR light 703 when the Bragg condition is satisfied. The optical sensor 710 may be positioned (e.g., aimed at a predetermined angle) to receive the diffracted IR light 703, and generate an image of the eye 715 based on the diffracted IR light 703. The multi-layer PVH 750 may also be configured to transmit a visible polychromatic light 702 from a real world environment toward the eye 715, such that the eye 715 of the user may perceive a virtual object generated by a display system superimposed on real-world images or see-through images. In some embodiments, the diffractive optical element 720 including the multi-layer PVH 750 is also referred to as an eye-tracking combiner, which may diffract the IR light 701 reflected by the eye 715 toward the optical sensor 710, and superimpose computer-generated images on the direct view of the real world environment. As discussed above, a conventional eye-tracking combiner may diffract a visible polychromatic light coming from a real world environment due to the diffractive structures, causing a rainbow effect in a see-through view, especially when the user wearing the NED looks at a bright light source from certain angles. Such see-through artifacts may degrade the image quality of the see-through views. In the present disclosure, the eye-tracking combiner (e.g., the diffractive optical element 720) including the multi-layer PVH 750 disclosed herein may be configured to reduce the rainbow effect when diffracting the visible polychromatic light 702, such that that the image quality of the see-through views may be significantly improved.

FIG. 6 and FIG. 7 illustrate two optical systems using a multi-layer PVH disclosed herein to suppress the rainbow effect when diffracting a visible polychromatic light from a real world environment. The two optical systems are for illustrative purposes and do not limit the scope of the present disclosure. The exemplary structures and mechanism for reducing the rainbow effect, e.g., in see-through images, may be applicable to any other optical system, which is not limited by the present disclosure.

Figure 8A:
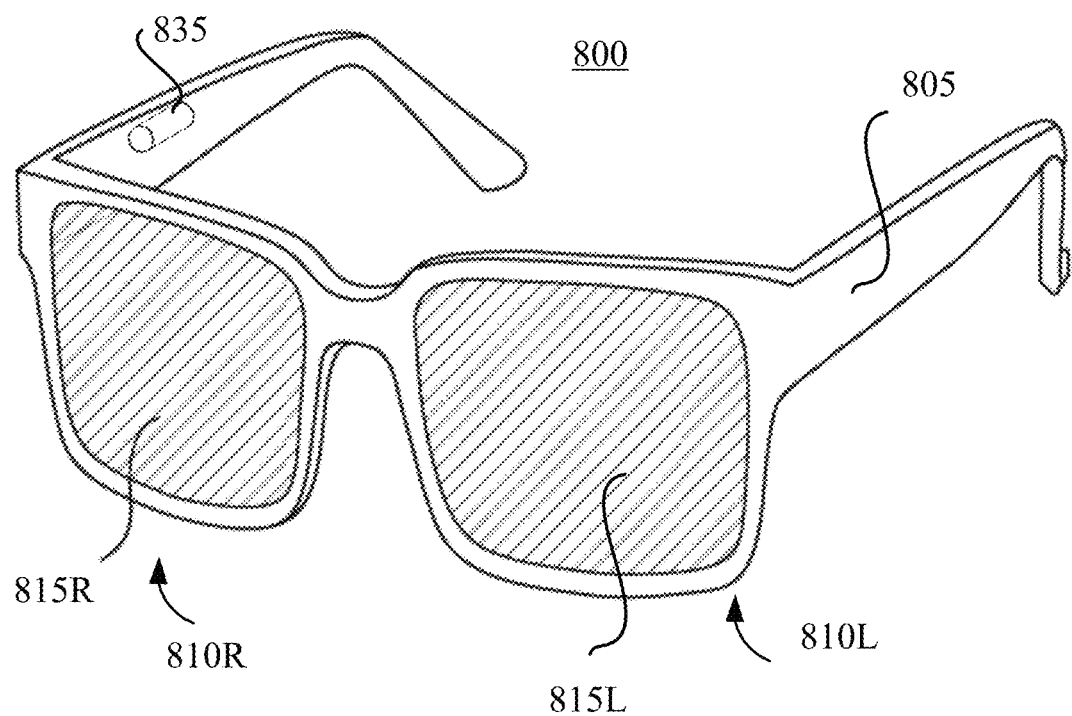
FIG. 8A illustrates a schematic diagram of a near-eye display ("NED"), according to an embodiment of the present disclosure.

FIG. 8A illustrates a schematic diagram of an optical system 800 according to an embodiment of the present disclosure. For illustrative purposes, a near-eye display ("NED") is used as an example of the optical system 800, in which one or more disclosed multi-layer PVHs may be implemented, such that rainbow effect in see-through views may be reduced when the NED 800 is used for AR and/or MR applications. For the convenience of discussion, the optical system 800 may also be referred to as the NED 800. In some embodiments, the NED 800 may be referred to as a head-mounted display ("HMD"). The NED 800 may present media content to a user, such as one or more images, videos, audios, or a combination thereof. In some embodiments, an audio may be presented to the user via an external device (e.g., a speaker and/or a headphone). The NED 800 may operate as a VR device, an AR device, an MR device, or a combination thereof. In some embodiments, when the NED 800 operates as an AR and/or MR device, a portion of the NED 800 may be at least partially transparent, and internal components of the NED 800 may be at least partially visible.

As shown in FIG. 8A, the NED 800 may include a frame 805 configured to be worn on a user's head, a left-eye display system 810L and a right-eye display system 810R mounted to the frame 805, and an eye-tracking system (not shown in FIG. 8A). In some embodiments, certain device(s) shown in FIG. 8A may be omitted. In some embodiments, additional devices or components not shown in FIG. 8A may also be included in the NED 800. The frame 805 may include a suitable type of mounting structure configured to mount the right display system 810R and the left display system 810L to a body part (e.g. a head) of the user (e.g., adjacent a user's eyes). The frame 805 may be coupled to one or more optical elements, which may be configured to display media to users. In some embodiments, the frame 805 may represent a frame of eye-wear glasses.

The right display system 810R and the left display system 810L may be configured to enable the user to view content presented by the NED 800 and/or to view images of real-world objects (e.g., each of the right display system 810R and the left display system 810L may include a see-through optical element). In some embodiments, the right display system 810R and the left display system 810L may include any suitable display assembly (not shown) configured to generate a light (e.g., an image light corresponding to a virtual image) and to direct the image light to an eye of the user. In some embodiments, the NED 800 may include a projection system. For illustrative purposes, FIG. 8A shows that the projection system may include a projector 835 coupled to the frame 805. For example, each of the left-eye display system 810L and the right-eye display systems 810R may include image display components configured to project computer-generated virtual images into a left display window 815L and a right display window 815R in the user's FOV.

Figure 8B:
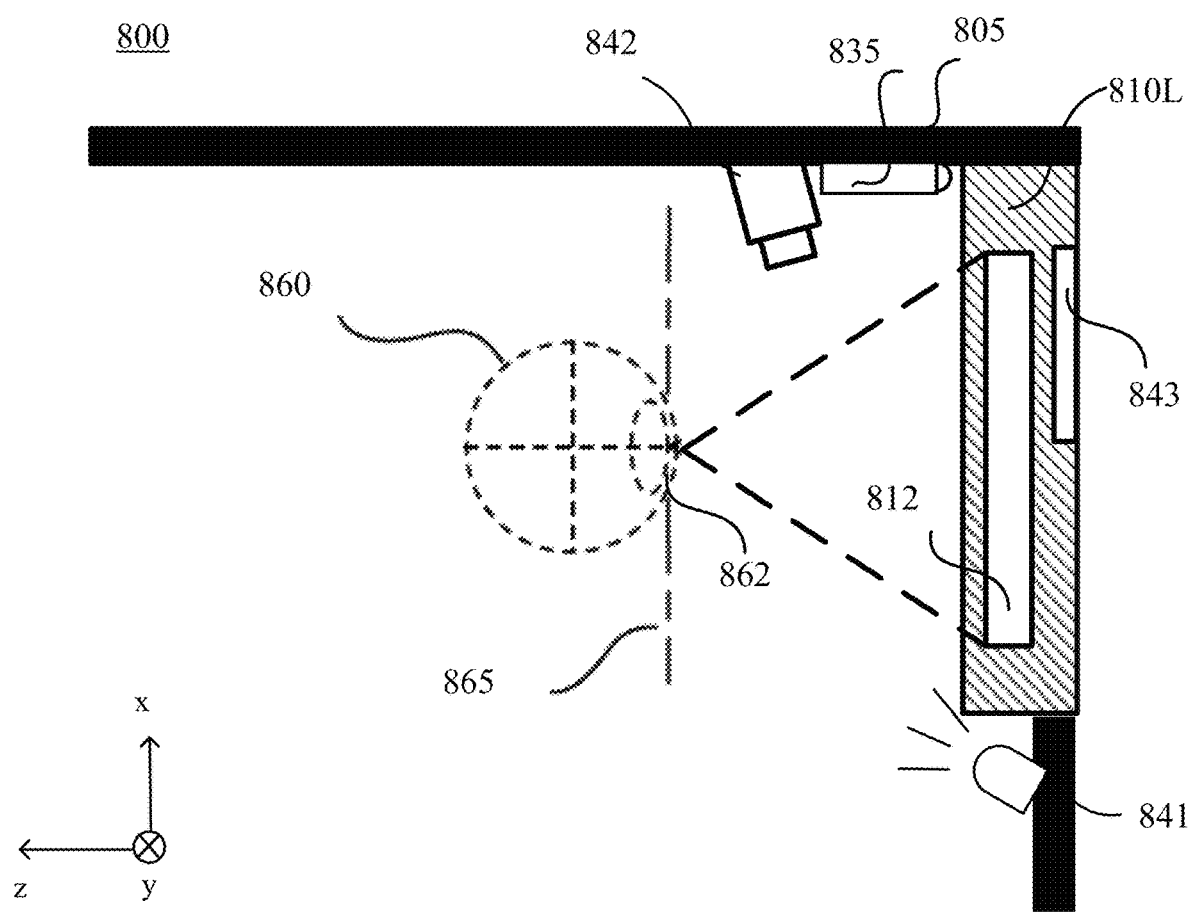
FIG. 8B illustrates a schematic cross sectional view of half of the NED shown in FIG. 8A, according to an embodiment of the present disclosure.

FIG. 8B is a cross-section view of half of the NED 800 shown in FIG. 8A in accordance with an embodiment of the present disclosure. For purposes of illustration, FIG. 8B shows the cross-sectional view associated with the left display system 810L. As shown in FIG. 8B, the left display system 810L may include a light guide display assembly 812 for an eye 860 of the user. The light guide display assembly 812 may be an embodiment of the light guide display system 600 shown in FIG. 6. That is, the light guide display assembly 812 may include one or more multi-layer PVHs disclosed herein, e.g., serving as or included in an out-coupling element (or an redirecting element if included) to reduce the rainbow effect in the see-through views. An exit pupil 862 may be a location where an eye 860 is positioned in an eye-box 865 when the user wears the NED 800. For purposes of illustration, FIG. 8B shows the cross section view associated with a single eye 860 and a single light guide display assembly 812. In some embodiments, another light guide display assembly that is separate from and similar to the light guide display assembly 812 shown in FIG. 8B may provide an image light to an eye-box located at an exit pupil of another eye of the user. In some embodiments, the light guide display assembly 812 may be a component of the NED 800. In some embodiments, the light guide display assembly 812 may be a component of some other NED or system that directs an image light to a particular location. As shown in FIG. 8B, the light guide display assembly 812 may be provided for one eye 860 of the user. The light guide display assembly 812 for one eye may be separated or partially separated from the light guide display assembly 812 for the other eye. In some embodiments, a single light guide display assembly 812 may be included for both eyes 860 of the user.

In some embodiments, the NED 800 may include one or more optical elements disposed between the light guide display assembly 812 and the eye 860. The optical elements may be configured to, e.g., correct aberrations in an image light output from the light guide display assembly 812, magnify an image light output from the light guide display assembly 812, or perform another type of optical adjustment of an image light output from the light guide display assembly 812. Examples of the one or more optical elements may include an aperture, a Fresnel lens, a convex lens, a concave lens, a filter, any other suitable optical element that affects an image light, or a combination thereof. In some embodiments, the light guide display assembly 812 may include a stack of light guide displays (e.g., each light guide display may include a light guide, a light source assembly, an in-coupling element, an out-coupling element, and a redirecting element if included). In some embodiments, the stacked light guide displays may include a polychromatic display (e.g., a red-green-blue ("RGB") display) formed by stacking light guide displays whose respective monochromatic light sources are configured to emit lights of different colors. For example, the stacked light guide displays may include a polychromatic display configured to project image lights onto multiple planes (e.g., multi-focus colored display). In some embodiments, the stacked light guide displays may include a monochromatic display configured to project image lights onto multiple planes (e.g., multi-focus monochromatic display). In some embodiments, the NED 800 may include an adaptive dimming element which may dynamically adjust the transmittance of lights reflected by real-world objects, thereby switching the NED 800 between a VR device and an AR device or between a VR device and a MR device. In some embodiments, along with switching between the AR/MR device and the VR device, the adaptive dimming element may be used in the AR and/MR device to mitigate differences in brightness of lights reflected by real-world objects and virtual image lights.

The eye-tracking system included in the NED 800 may be an optical system configured to provide eye-tracking information by utilizing light emitted or reflected by the eye 860 that is being tracked. The eye-tracking system may be similar to the eye-tracking system 700 shown in FIG. 7. For example, the eye-tracking system may include a light source 841 configured to emit a light to illuminate one or two eyes 860 of the user, an optical sensor 842, and an eye-tracking combiner 843 configured to guide the light reflected by the eye 860 toward the optical sensor 842 via diffraction. The optical sensor 842 may be arranged relative to the eye-tracking combiner 843 to receive the light diffracted by the eye-tracking combiner 843. The optical sensor 842 may be configured to generate a signal or an image based on the received light for eye-tracking. For example, an image of the eye 860 may be generated based on the light received from the eye-tracking combiner. The eye-tracking combiner 843 may include a multi-layer PVH disclosed herein with reduced rainbow effect.

Figure 9:
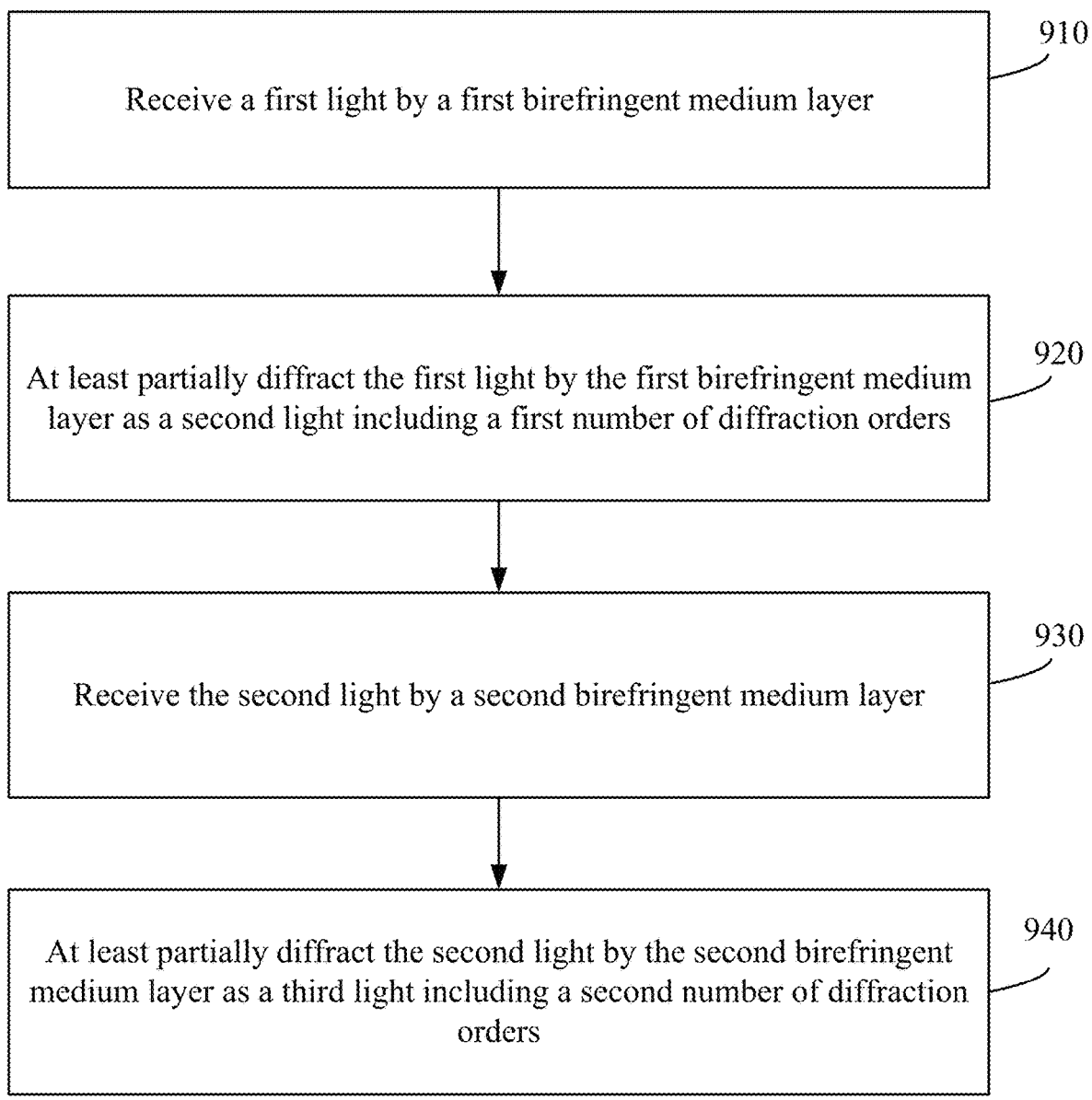
FIG. 9 is a flowchart illustrating a method, according to an embodiment of the present disclosure.

FIG. 9 is a flowchart illustrating a method 900 according to an embodiment of the present disclosure. The method 900 may be performed to reduce a rainbow effect (or diffraction artifacts) in see-though views. The method 900 may be performed to reduce the rainbow effect via suppressing high diffraction orders of a visible polychromatic light received from a real world environment. The method 900 may include receiving a first light by a first birefringent medium layer (Step 910). In some embodiments, the first light may be a visible polychromatic light from the real world environment. In some embodiments, the first birefringent medium layer may be a first PVH. Orientations of directors of first optically anisotropic molecules in the first birefringent medium layer may spatially vary with a first in-plane pitch and a first vertical pitch. The method 900 may also include, at least partially diffracting the first light by the first birefringent medium layer as a second light including a first number of diffraction orders (Step 920). In some embodiments, the second light may be a visible polychromatic light including a forwardly diffracted portion of the first light. In some embodiments, the second light may be a visible polychromatic light including a forwardly diffracted portion of the first light and a directly transmitted portion of the first light. The method 900 may also include receiving the second light by a second birefringent medium layer (Step 930). In some embodiments, the second birefringent medium layer may be a second PVH. Orientations of directors of second optically anisotropic molecules in the second birefringent medium layer may spatially vary with a second in-plane pitch and a second vertical pitch.

The first birefringent medium layer may be configured to have a relatively large thickness, and the second birefringent medium layer may be configured to have a relatively small thicknesses. The thickness of the second birefringent medium layer may be significantly smaller than the thickness of the first birefringent medium layer. A ratio between the thickness of the second birefringent medium layer and the thickness of the first birefringent medium layer may be less than a predetermined percentage, for example, about 5%, 10%, 15%, 20%, 25%, 30%, 35%, 40%, 45%, or 50%. The first in-plane pitch may be configured to be substantially the same as the second in-plane pitch, and the second vertical pitch may be configured to be about half of the first vertical pitch. The method 900 may also include at least partially diffracting the second light by the second birefringent medium layer as a third light including a second number of diffraction orders (Step 940). In some embodiments, the third light may be a visible polychromatic light including a forwardly diffracted portion of the second light. In some embodiments, the third light may be a visible polychromatic light including a forwardly diffracted portion of the second light and a directly transmitted portion of the second light. In some embodiments, the second number of diffraction orders included in the third light may be smaller than the first number of diffraction orders included in the second light. That is, the third light may include a smaller number of diffraction orders than the second light. In other words, the third light may include fewer diffraction orders than the second light. In some embodiments, the diffraction efficiency of the combination of the first and second birefringent medium layers may be smaller than the diffraction efficiency of the first birefringent medium layer only. The third light may propagate toward an eye-box of the optical device or system. In some embodiments, the method 900 may also include combining, by an optical combiner, an image light representing a virtual image and the third light as a combined light propagating toward the eye-box of the optical device or system. In some embodiments, the method 900 may also include diffracting, by the first birefringent medium layer and the second birefringent medium layer, an infrared light reflected by an object toward an optical sensor.

In some embodiments, the method 900 may also include receiving the third light by a third birefringent medium layer. In some embodiments, the third birefringent medium layer may be a third PVH. Orientations of directors of third optically anisotropic molecules in the third birefringent medium layer may spatially vary with a third in-plane pitch and a third vertical pitch. In some embodiments, the first birefringent medium may be configured to have a relatively large thickness, and the third birefringent medium layer may be configured to have a relatively small thicknesses. In some embodiments, the thickness of the third birefringent medium layer may be significantly smaller than the thickness of the first birefringent medium layer. A ratio between the thickness of the third birefringent medium layer and the thickness of the first birefringent medium layer may be less than a predetermined percentage, for example, about 5%, 10%, 15%, 20%, 25%, 30%, 35%, 40%, 45%, or 50%. In some embodiments, the first in-plane pitch may be configured to be substantially the same as the third in-plane pitch. In some embodiments, the third vertical pitch may be configured to be about half of the first vertical pitch. The third vertical pitch may be substantially the same as or different from the second vertical pitch. In some embodiments, the method 900 may also include at least partially diffracting the third light by the third birefringent medium layer as a fourth light including a third number of diffraction orders. In some embodiments, the fourth light may be a visible polychromatic light including a forwardly diffracted portion of the third light. In some embodiments, the fourth light may be a visible polychromatic light including a forwardly diffracted portion of the third light and a directly transmitted portion of the third light. The third number of diffraction orders included in the fourth light may be smaller than the second number of diffraction orders included in the third light. That is, the fourth light may include a smaller number of diffraction orders than the third light. In other words, the fourth light may include fewer diffraction orders than the third light. In some embodiments, the diffraction efficiency of the combination of the first to third birefringent medium layers may be smaller than the diffraction efficiency of the combination of the first and second birefringent medium layers only.

In some embodiments, the method 900 may also include receiving the fourth light by a fourth birefringent medium layer. In some embodiments, the fourth birefringent medium layer may be a fourth PVH. Orientations of directors of fourth optically anisotropic molecules in the fourth birefringent medium layer may spatially vary with a fourth in-plane pitch and a fourth vertical pitch. In some embodiments, the third birefringent medium may be configured to have a relatively large thickness, and the fourth birefringent medium layer may be configured to have a relatively small thicknesses. In some embodiments, the thickness of the fourth birefringent medium layer may be significantly smaller than the thickness of the third birefringent medium layer. A ratio between the thickness of the fourth birefringent medium layer and the thickness of the third birefringent medium layer may be less than a predetermined percentage, for example, about 5%, 10%, 15%, 20%, 25%, 30%, 35%, 40%, 45%, or 50%. In some embodiments, the fourth in-plane pitch may be configured to be substantially the same as the third in-plane pitch. In some embodiments, the fourth vertical pitch may be configured to be about half of the third vertical pitch. The third vertical pitch may be substantially the same as or different from the first vertical pitch. The third in-plane pitch may be substantially the same as or different from the first in-plane pitch. In some embodiments, the method 900 may also include, at least partially diffracting the fourth light by the fourth birefringent medium layer as a fifth light including a fourth number of diffraction orders. In some embodiments, the fifth light may be a visible polychromatic light including a forwardly diffracted portion of the fourth light. In some embodiments, the fifth light may be a visible polychromatic light including a forwardly diffracted portion of the third light and a directly transmitted portion of the fourth light. The fourth number of diffraction orders included in the fifth light may be smaller than the third number of diffraction orders included in the fourth light. That is, the fifth light may include a smaller number of diffraction orders than the fourth light. In other words, the fifth light may include fewer diffraction orders than the fourth light. In some embodiments, the diffraction efficiency of the combination of the first to fourth birefringent medium layers may be smaller than the diffraction efficiency of the combination of the first to third birefringent medium layers only.

The method 900 for reducing the rainbow effect, e.g., in see-through images, may be applicable to any polarization selective elements, which are not limited by the present disclosure. For example, the method 900 may include receiving a first light by a first polarization selective element. Orientations of optically anisotropic molecules or sub-wavelength structures in the first polarization selective element may spatially vary with a first in-plane pitch and a first vertical pitch. The method 900 may also include at least partially diffracting the first light by the first polarization selective element as a second light including a first number of diffraction orders. The method 900 may also include receiving the second light by a second polarization selective element. Orientations of optically anisotropic molecules or sub-wavelength structures in the second polarization selective element may spatially vary with a second in-plane pitch and a second vertical pitch. The thickness of the second polarization selective element may be significantly smaller than the thickness of the first polarization selective element. A ratio between the thickness of the second polarization selective element and the thickness of the first polarization selective element may be less than a predetermined percentage, for example, about 5%, 10%, 15%, 20%, 25%, 30%, 35%, 40%, 45%, or 50%. The first in-plane pitch may be configured to be substantially the same as the second in-plane pitch, and the second vertical pitch may be configured to be about half of the first vertical pitch. The method 900 may also include at least partially diffracting the second light by the second polarization selective element as a third light including a second number of diffraction orders. In some embodiments, the second number of diffraction orders included in the third light may be smaller than the first number of diffraction orders included in the second light. In some embodiments, the diffraction efficiency of the combination of the first and second polarization selective elements may be smaller than the diffraction efficiency of the first polarization selective element only.

The third light may propagate toward an eye-box of the optical device or system. In some embodiments, the method 900 may also include combining, by an optical combiner, an image light representing a virtual image and the third light as a combined light propagating toward the eye-box of the optical device or system. In some embodiments, the method 900 may also include diffracting, by the first polarization selective element and the second polarization selective element, an infrared light reflected by an object toward an optical sensor.

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical element, comprising:
   a first birefringent medium layer with orientations of directors of first optically anisotropic molecules spatially varying with a first in-plane pitch and a first vertical pitch, the first vertical pitch being a distance along a thickness direction of the first birefringent medium layer over which the directors rotate by a predetermined angle; and
   a second birefringent medium layer with orientations of directors of second optically anisotropic molecules spatially varying with a second in-plane pitch and a second vertical pitch, the second birefringent medium layer being optically coupled with the first birefringent medium layer, the second vertical pitch being a distance along a thickness direction of the second birefringent medium layer over which the directors rotate by the same predetermined angle,
   wherein the first in-plane pitch is substantially the same as the second in-plane pitch, and the second vertical pitch is smaller than the first vertical pitch, and
   wherein the first birefringent medium layer is configured to diffract an input light toward the second birefringent medium layer, and the second birefringent medium layer is configured to reduce a diffraction of the input light by the first birefringent medium layer.

2. The optical element of claim 1, wherein a ratio between the second vertical pitch and the first vertical pitch is within a range of 0.2-0.8.

3. The optical element of claim 2, wherein the ratio between the second vertical pitch and the first vertical pitch is about 0.5.

4. The optical element of claim 1, wherein a ratio between a thickness of the second birefringent medium layer and a thickness of the first birefringent medium layer is less than about 5%, 10%, 15%, 20%, 25%, 30%, 35%, 40%, 45%, or 50%.

5. The optical element of claim 1, wherein at least one of the first birefringent medium layer or the second birefringent medium layer has an optic axis configured with an orientation spatially varying in both an in-plane direction and an out-of-plane direction.

6. The optical element of claim 5, wherein at least one of the first birefringent medium layer or the second birefringent medium layer includes at least one of polymerized liquid crystals ("LCs"), polymer-stabilized LCs, a photopolymer, or active LCs.

7. The optical element of claim 5, wherein at least one of the first birefringent medium layer or the second birefringent medium layer includes at least one of nematic LCs, twist-bend LCs, chiral nematic LCs, or smectic LCs.

8. The optical element of claim 1, further comprising:
   a third birefringent medium layer with orientations of directors of third optically anisotropic molecules spatially varying with a third in-plane pitch and a third vertical pitch,
   wherein the third in-plane pitch is substantially the same as the first in-plane pitch, and the third vertical pitch is smaller than the first vertical pitch, and
   wherein the third vertical pitch is substantially the same as or different from the second vertical pitch.

9. The optical element of claim 1, further comprising:
   a third birefringent medium layer with orientations of directors of third optically anisotropic molecules spatially varying with a third in-plane pitch and a third vertical pitch; and
   a fourth birefringent medium layer with orientations of directors of fourth optically anisotropic molecules in the fourth birefringent medium layer spatially varying with a fourth in-plane pitch and a fourth vertical pitch,
   wherein the fourth in-plane pitch is substantially the same as the third in-plane pitch, and the fourth vertical pitch is smaller than the third vertical pitch.

10. The optical element of claim 9, wherein the third in-plane pitch is substantially the same as or different from the first in-plane pitch, and the third vertical pitch is substantially the same as or different from the first vertical pitch.

11. The optical element of claim 1, wherein:
   the first birefringent medium layer is configured to diffract a visible polychromatic light from a real world environment as a first light,
   the second birefringent medium layer is configured to diffract the first light output from the first birefringent medium layer as a second light, and
   a diffraction efficiency of a combination of the first birefringent medium layer and the second birefringent medium layer for the visible polychromatic light is smaller than a diffraction efficiency of the first birefringent medium layer for the visible polychromatic light.

12. The optical element of claim 1, further comprising:
   a light guide coupled to the first birefringent medium layer and the second birefringent medium layer, wherein the second birefringent medium layer is disposed between the first birefringent medium layer and the light guide, or the first birefringent medium layer is disposed between the second birefringent medium layer and the light guide.

13. The optical element of claim 12, wherein:
the light guide is configured to combine an image light representing a display image, and a visible polychromatic light coming from a real world environment and passing through the first birefringent medium layer and the second birefringent medium layer, as a combined light propagating toward an eye-box of the optical element.

14. A device, comprising:
a first polarization selective element having a first in-plane pitch and a first vertical pitch, and configured to diffract a light, wherein the first vertical pitch is a distance along a thickness direction of the first polarization selective element over which directors of first optically anisotropic molecules in the first polarization selective element rotate by a predetermined angle; and
a second polarization selective element optically coupled with the first polarization selective element, the second polarization selective element having a second in-plane pitch and a second vertical pitch, wherein the second vertical pitch is a distance along a thickness direction of the second polarization selective element over which directors of second optically anisotropic molecules in the second polarization selective element rotate by the same predetermined angle, and
wherein the first in-plane pitch is substantially the same as the second in-plane pitch, and the second vertical pitch is smaller than the first vertical pitch, and
wherein the first polarization selective element is configured to diffract an input light toward the second polarization selective element, and the second polarization selective element is configured to reduce a diffraction of the input light by the first polarization selective element.

15. The device of claim 14, wherein a ratio between the second vertical pitch and the first vertical pitch is within a range of 0.2-0.8.

16. The device of claim 15, wherein the ratio between the second vertical pitch and the first vertical pitch is about 0.5.

17. The device of claim 14, wherein a ratio between a thickness of the second polarization selective element and a thickness of the first polarization selective element is less than about 5%, 10%, 15%, 20%, 25%, 30%, 35%, 40%, 45%, or 50%.

18. The device of claim 14, wherein at least one of the first polarization selective element or the second polarization selective element includes at least one of sub-wavelength structures, a liquid crystal material, or a photo-refractive holographic material.

19. The device of claim 18, wherein at least one of the first polarization selective element or the second polarization selective element includes a birefringent material having an optic axis configured with an orientation spatially varying in both an in-plane direction and an out-of-plane direction.

20. The device of claim 14, further comprising:
a third polarization selective element having a third in-plane pitch and a third vertical pitch,
wherein the third in-plane pitch is substantially the same as the first in-plane pitch, and the third vertical pitch is smaller than the first vertical pitch.

* * * * *